US011176845B2

(12) United States Patent
Stankoulov

(10) Patent No.: US 11,176,845 B2
(45) Date of Patent: *Nov. 16, 2021

(54) ADAPTIVE ANALYSIS OF DRIVER BEHAVIOR

(71) Applicant: Abalta Technologies, Inc., San Diego, CA (US)

(72) Inventor: Pavel Stankoulov, San Diego, CA (US)

(73) Assignee: Abalta Technologies, Inc., San Diego, CA (US)

( * ) Notice: Subject to any disclaimer, the term of this patent is extended or adjusted under 35 U.S.C. 154(b) by 562 days.

This patent is subject to a terminal disclaimer.

(21) Appl. No.: 15/898,195

(22) Filed: Feb. 15, 2018

(65) Prior Publication Data

US 2018/0174485 A1    Jun. 21, 2018

Related U.S. Application Data

(63) Continuation-in-part of application No. 15/427,012, filed on Feb. 7, 2017, now Pat. No. 9,898,936, which is a continuation of application No. 13/711,608, filed on Dec. 11, 2012, now Pat. No. 9,569,984.

(51) Int. Cl.
*G09B 19/16* (2006.01)
(52) U.S. Cl.
CPC .................. *G09B 19/167* (2013.01)
(58) Field of Classification Search
CPC ................................................... G09B 19/167
See application file for complete search history.

(56) References Cited

U.S. PATENT DOCUMENTS

| 5,570,087 | A | 10/1996 | Lemelson |
| 6,161,071 | A | 12/2000 | Shuman et al. |
| 6,438,472 | B1 | 8/2002 | Tano et al. |
| 7,079,927 | B1 | 7/2006 | Tano et al. |
| 7,389,178 | B2 | 6/2008 | Raz et al. |
| 7,561,054 | B2 | 7/2009 | Raz et al. |
| 7,751,973 | B2 | 7/2010 | Ibrahim |
| 8,131,444 | B2 | 3/2012 | Urban et al. |

(Continued)

FOREIGN PATENT DOCUMENTS

| EP | 1498694 A2 | 1/2005 |
| EP | 2042833 A1 | 4/2009 |

*Primary Examiner* — Eddy Saint-Vil
(74) *Attorney, Agent, or Firm* — Genius Patent APC; Bruce Angus Hare

(57) ABSTRACT

An automated method of evaluating driver performance using adaptive models includes: receiving sensor data generated by a set of vehicle sensors associated with a vehicle; generating a set of predicted paths of the vehicle based at least partly on the received sensor data; retrieving map information from a map database, the map information including road links along the set of predicted paths of the vehicle; retrieving a set of evaluation curves associated with the road links, where inclusion in the set of evaluation curves is based on evaluation of dynamic models associated with the road links along the set of predicted paths; calculating mathematical differences between each evaluation curve and the received data and generating a driver score based on a calculated difference in area between the received data and each evaluation curve; and displaying a warning if at least one of the calculated mathematical differences exceeds a warning threshold.

20 Claims, 27 Drawing Sheets

(56) References Cited

U.S. PATENT DOCUMENTS

| | | |
|---|---|---|
| 8,140,358 B1 | 3/2012 | Ling et al. |
| 8,260,491 B2 | 9/2012 | Brighenti et al. |
| 8,269,617 B2 | 9/2012 | Cook et al. |
| 2008/0167820 A1 | 7/2008 | Oguchi et al. |
| 2008/0262670 A1* | 10/2008 | McClellan ....... G06Q 10/06398 701/31.4 |
| 2010/0087984 A1* | 4/2010 | Joseph ................. G09B 19/16 701/31.4 |
| 2011/0098922 A1* | 4/2011 | Ibrahim ................ G01C 21/32 701/532 |

* cited by examiner

ADAPTIVE ANALYSIS OF DRIVER BEHAVIOR

CROSS-REFERENCE TO RELATED APPLICATIONS

This application is a continuation-in-part of U.S. patent application Ser. No. 15/427,012, filed on Feb. 7, 2017. U.S. patent application Ser. No. 15/427,012 is a continuation of U.S. patent application Ser. No. 13/711,608, filed on Dec. 11, 2012.

BACKGROUND

Many entities may wish to improve performance by reducing and/or eliminating accidents, abuse, operating, maintenance, and/or replacement expenses, and/or other costs associated with operating one or more vehicles. The economic, environmental, and social value of such benefits is significant, especially for commercial fleets and overall driving safety.

There exists a large and growing market for vehicle monitoring systems and methods that facilitate the collection of information related to the contributing causes of vehicle incidents, such as accidents, and provide objective driver evaluation to determine the quality of driving practices. There is also a market for systems and methods for recording various operating parameters over time so as to provide a historical driver profile record to uncover deviations from suggested driving practices, which may further improve driving behavior.

Recent advances for such systems and methods include relying on global navigation satellite systems (GNSS) to track vehicle operation, as well as additional sensors such as gyroscopes, accelerometers, wheel speed pulse, etc. which allow various driving behaviors such as speeding and sudden acceleration to be determined. However, existing solutions don't analyze driver behavior in the context of a map, which provides a model of real world paths (e.g., roads). Furthermore, existing solutions are limited to discrete analysis and do not allow continuous evaluation of driver performance.

Furthermore, existing solutions are not able to dynamically update evaluation based on current conditions and/or analysis of multiple sources of measured data.

Thus there is a need for a driver behavior engine that accurately monitors various parameters to allow analysis of driving behaviors, and that provides adaptive contiguous evaluation elements for such driving behaviors.

BRIEF SUMMARY

Some embodiments may provide a system to monitor, record, and/or evaluate driver behaviors and/or performance. Such behaviors may include driving characteristics such as speed, acceleration, stopping, turning, gear shifting, and yaw rate. Various vehicle sensors may be used to determine the various driving characteristics. A warning module provided by some embodiments may be able to warn drivers about driving hazards, unsafe driving practices, and/or potential events.

Some embodiments may include vehicle-specific and/or driver-specific profiles that may affect various parameters. Some embodiments may determine optimal performance levels for various behaviors. Some embodiments may determine various thresholds for various behaviors.

Behavior curves may be utilized to evaluate driver performance in some embodiments. Driver behavior may be quantified as a set of measurable characteristics over distance and/or time. Behavior curves, which are graphs of the characteristics change, may be generated by some embodiments and may be used for mathematical analysis and comparison with reference curves. For example, behavior curves may specify speed values, acceleration, etc. over a path distance.

Some embodiments may operate in real-time, using a predicted path generated by a path prediction engine in order to extend behavior curves to the future. The curves may also be accompanied by corresponding probability values that reflect the confidence in the current measurements as well as the future prediction.

Based on map matched positions and selected profiles, the driver behavior engine may generate one or more sets of reference curves (e.g., optimal curves, safety curves, etc.).

Such optimal curves may define the best values expected from monitored driver characteristics. The optimal curves may typically be used to guide the driver to achieve the best performance possible under the current road characteristics. Such optimal curves are very useful for fuel efficiency and also may be used for other behavioral characteristics such as alertness.

The safety curves may define the bounds for which a safety alert is to be issued. If a given behavior curve crosses or exceeds a "safety curve" a warning event may be identified. There could be different safety curves with different severity levels. Because curves are used, the intersection area between the behavior curve and a given safety curve indicates how long the event has occurred and its severity. Based on the area calculations, a decision can be made whether to issue a warning and/or the intensity of the warning.

Some embodiments may utilize dynamic behavior curves. Such dynamic curves may be updated based on data received from vehicle-based driver behavior engines. Such dynamic curves may be generated by evaluating a set of available model curves (e.g., curves collected from actual vehicle usage). The set of available model curves may be filtered based on various attributes (e.g., temporal, traffic, etc.). The remaining models may be scored, aggregated, and combined to generate updated final models. Such updated models may then be distributed to the driver behavior engines.

The preceding Summary is intended to serve as a brief introduction to some embodiments of the invention. It is not meant to be an introduction or overview of all inventive subject matter disclosed in this document. The Detailed Description that follows and the Drawings (or "Figures" or "FIGS.") that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matter is not to be limited by the illustrative details in the Summary, Detailed Description and the Drawings, but rather is to be defined by the appended claims, because the claimed subject matter may be embodied in other specific forms without departing from the scope of the disclosure.

BRIEF DESCRIPTION OF THE DRAWINGS

The novel features of the invention are set forth in the appended claims. However, for purpose of explanation, several embodiments of the invention are set forth in the following drawings.

DETAILED DESCRIPTION

Figure 1:
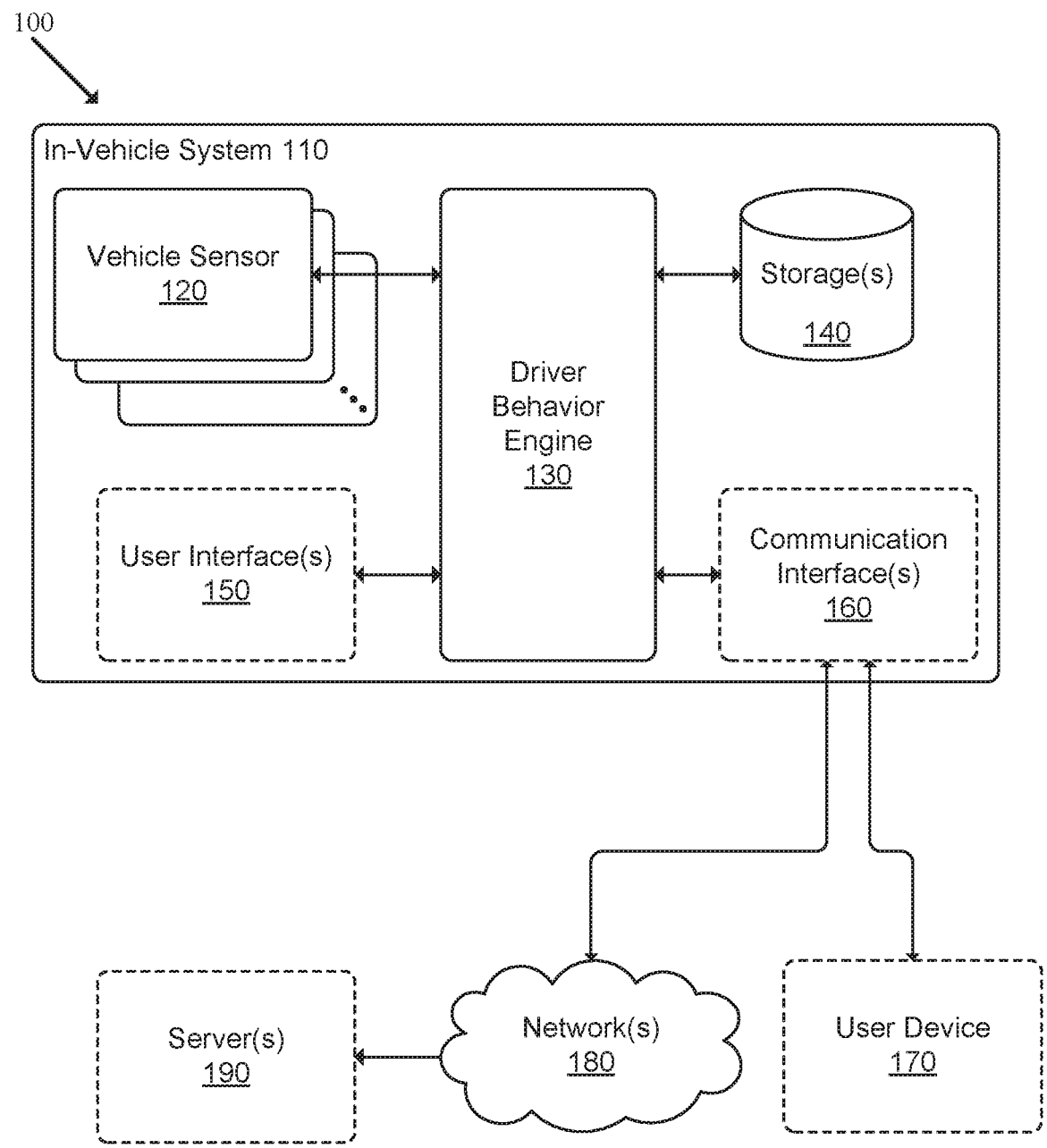
FIG. 1 illustrates a schematic block diagram of an exemplary system according to some embodiments of the invention.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Broadly, an embodiment of the present invention generally provides a system to monitor, record, and evaluate driver behavior. Such a system may use vehicle sensors to determine various driving characteristics such as speed, acceleration, stopping, turning, yaw rate, etc. The system may use map data and vehicle position information to create driver behavior curves that may be used to define various thresholds for various driving parameters. Some embodiments may use a warning module to generate warning events to drivers in various driving circumstances. Some embodiments may include methods to collect and store data, predict future driving paths, analyze driver behavior, and provide offline analysis.

A first exemplary embodiment provides an automated method of evaluating driver performance using adaptive models. The method comprising: receiving data generated by a set of vehicle sensors associated with a vehicle; retrieving map information from a map database, the map information including road links along a path of the vehicle; retrieving a set of evaluation curves associated with the road links, wherein inclusion in the set of evaluation curves is based at least partially on evaluation of dynamic models associated with the road links; calculating mathematical differences between each evaluation curve from the set of evaluation curves and the received data and generating a driver score based on a calculated difference in area between the received data and each evaluation curve in the set of evaluation curves.

A second exemplary embodiment provides an automated method of generating dynamic curve models. The method comprising: retrieving a set of model curves; filtering the set of model curves based on temporal grouping in order to identify a set of temporally grouped curves; and filtering the set of temporally grouped curves based on traffic in order to identify the set of evaluation curves.

A third exemplary embodiment provides an adaptive driver behavior system comprising: a plurality of connected vehicles able to communicate across at least one network; and a back-end server able to communicate with the plurality of connected vehicles across the at least one network, the back-end server comprising: a sharing module that retrieves dynamic reference curve models; a collection module that receives and authenticates data from the plurality of connected vehicles; an aggregation module that aggregates, weights, stores, and updates the dynamic reference curve models based on data received from the collection module; and a distribution module that distributes the updated dynamic reference curve models to at least one connected vehicle from the plurality of connected vehicles.

Several more detailed embodiments of the invention are described in the sections below. Section I provides an exemplary description of the driver behavior engine architecture. Section II describes a curve-based approach to driver reporting and/or analysis. Section III then describes path-based data and/or analysis. Next, Section IV describes probabilistic weighting of driving events in some embodiments. Section V then describes various methods of operation used to generate and modify profiles, collect and store data, predict driving paths, provide warnings to drivers, and provide offline analysis. Section VI includes examples of driver behavior curves for driver characteristics such as speed, safety, acceleration, yaw rate, and stopping. Section VII then describes a process used to define an application of some embodiments. Lastly, Section VIII describes a computer system which may implement some of the embodiments of the invention.

I. System Architecture

FIG. 1 illustrates a schematic block diagram of an exemplary system 100 according to some embodiments of the invention. Specifically, this figure shows various system elements and the communication pathways available to those elements. As shown, the system may include an in-vehicle system 110, a set of vehicle sensors 120, a driver behavior engine 130, a set of storages 140, a set of user interfaces 150, a set of communication interfaces 160, a user device 170, one or more networks 180 (e.g., local networks, wide-area networks, sets of networks, etc.), and one or more server(s) 190.

The in-vehicle subsystem 110 may be included in a car, truck, motorcycle, watercraft, aircraft, and/or any other appropriate vehicle that is able to be operated directly and/or remotely. The vehicle may be able to house various elements of the driver behavior engine 130. The system 100 may be able to communicate with multiple vehicles 110, either serially or in parallel. For instance, each of a set of fleet vehicles may independently communicate with the server 190 of some embodiments.

The set of vehicle sensors 120 may include GNSS sensors (such as global positioning system (GPS), global navigation satellite systems (GLONASS), Galileo, etc.), inertial sensors (i.e., gyroscopes, accelerometers, etc.), wheel speed sensors, differential speed sensors, radar sensors, outside temperature sensors, laser sensors, camera sensors, and/or any other appropriate sensors. The sensors may provide information related to the vehicle, such as speed, odometer readings, revolutions per minute (RPMs), pedal position (e.g., gas, brake, clutch, etc.), turn signal indications, fuel level, battery charge level, gear position, etc. The sensors may be able to communicate with the driver behavior engine 130 in various appropriate ways (e.g., using a serial bus such as a controller area network (CAN) bus, using wireless communication links, etc.). Although the sensors 120 are represented as physical elements with direct communication pathways to the driver behavior engine 130, one of ordinary skill in the art will recognize that systems of some embodiments may receive data associated with one or more sensors over an existing bus or other communication interface (and/or through one or more processing modules) without communicating directly with any, some, or all of the sensors.

The driver behavior engine may be able to communicate with the vehicle sensors 120, set of storages 140, set of user interfaces 150, set of communication interfaces 160, and/or other system components. The driver behavior engine may be able to analyze and/or record data regarding driving behavior.

The set of storages 140 may include various files (and/or databases) that relate to various vehicle characteristics, recorded data, map databases, and/or other parameters and/or information. For example, the set of storages may include information regarding a vehicle, user, and/or different applications (e.g., safety, fuel efficiency, teen driving, etc.) associated with the vehicle and/or user. The set of storages may include parameters that define which types of behavior curves to support and/or how to calculate various safety curves and/or optimal curves. For instance, optimal speed curves for an inexperienced teenage driver may be different than optimal speed curves for an experienced driver. Likewise optimal speed curves for a large sport utility vehicle (SUV) may be different than speed curves for a coupe. The set of storages may be able to communicate with the driver behavior engine 130 and/or other elements as appropriate.

The optional user interfaces 150 may be able to communicate with the driver behavior engine 130 and to provide various input/output features to a system user. The user interfaces 150 may be able to allow a user to interact with the driver behavior engine 130 in various appropriate ways (e.g., by displaying data, by receiving inputs through a touchscreen and/or keyboard, etc.). Each user interface 150 may include various appropriate elements (e.g., buttons, icons, etc.) that may allow a user to control and/or interact with the system. The optional user interface 150 may include non-visual indicators such as sound and/or be integrated with various in-vehicle indicators such as a vibrating seat, steering wheel controls, etc.

The optional set of communication interfaces 160 may be able to communicate with the driver behavior engine 130 (and/or other system elements), an optional user device 170, and/or the server 190, via network(s) 180. The set of communication interfaces 160 data and/or instructions to be sent among the server(s) 190, a user device 170, storages 140, driver behavior engine 130, and/or other system elements. The set of communication interfaces 160 may communicate and/or translate data using various appropriate methods and/or protocols.

The user device 170 may be able to communicate and/or otherwise interact with the system through communication interface 160. The user device 170 may be a mobile device, tablet, PC, and/or any other appropriate device. The user device may allow a user to download information from the system and/or upload information to the system, as appropriate.

The network(s) 180 may allow communication among the system 100 and various external resources (e.g., server(s) 190). The network(s) 180 may include one or more local networks, wireless networks, sets of networks (e.g., the Internet), etc. The server(s) 190 may process and/or store data received from and/or sent to the various system elements through the network(s) 180.

During operation, a vehicle user may invoke the system 100 (e.g., by activating an application, by powering on a vehicle, etc.). The driver behavior engine 130 may then download one or more driver and/or vehicle profiles from the storages 140. Such driver and/or vehicle profiles may be associated with one or more users of the system. During operation of the vehicle, the various sensors 120 may collect information related to the operation and/or performance of the vehicle. Such information may be passed to storage 140 and/or may otherwise be manipulated. The driver behavior engine 130 may continuously retrieve information related to the measured and/or predicted path(s) of the vehicle. Such information may be passed directly to the storage 140 and/or analyzed in various ways (e.g., by comparing such measured information to various thresholds to determine whether a warning should be issued). Such warnings and/or other feedback may be provided to an optional user interface 150. Alternatively, such information may be stored to storage(s) 140 without any indication to a driver or other user. In addition, such information may be transmitted to the server(s) 190 over the network(s) 180 such that the information may be stored and/or analyzed in real-time and/or offline.

One of ordinary skill in the art will recognize that the system 100 is exemplary in nature and may be implemented in various different ways without departing from the scope of the disclosure. For instance, various elements may be removed and/or various other elements may be included. In addition, multiple elements may be combined into a single element and/or a single element may be divided into multiple elements. Furthermore, various other communication pathways may be utilized and/or included.

Figure 2:
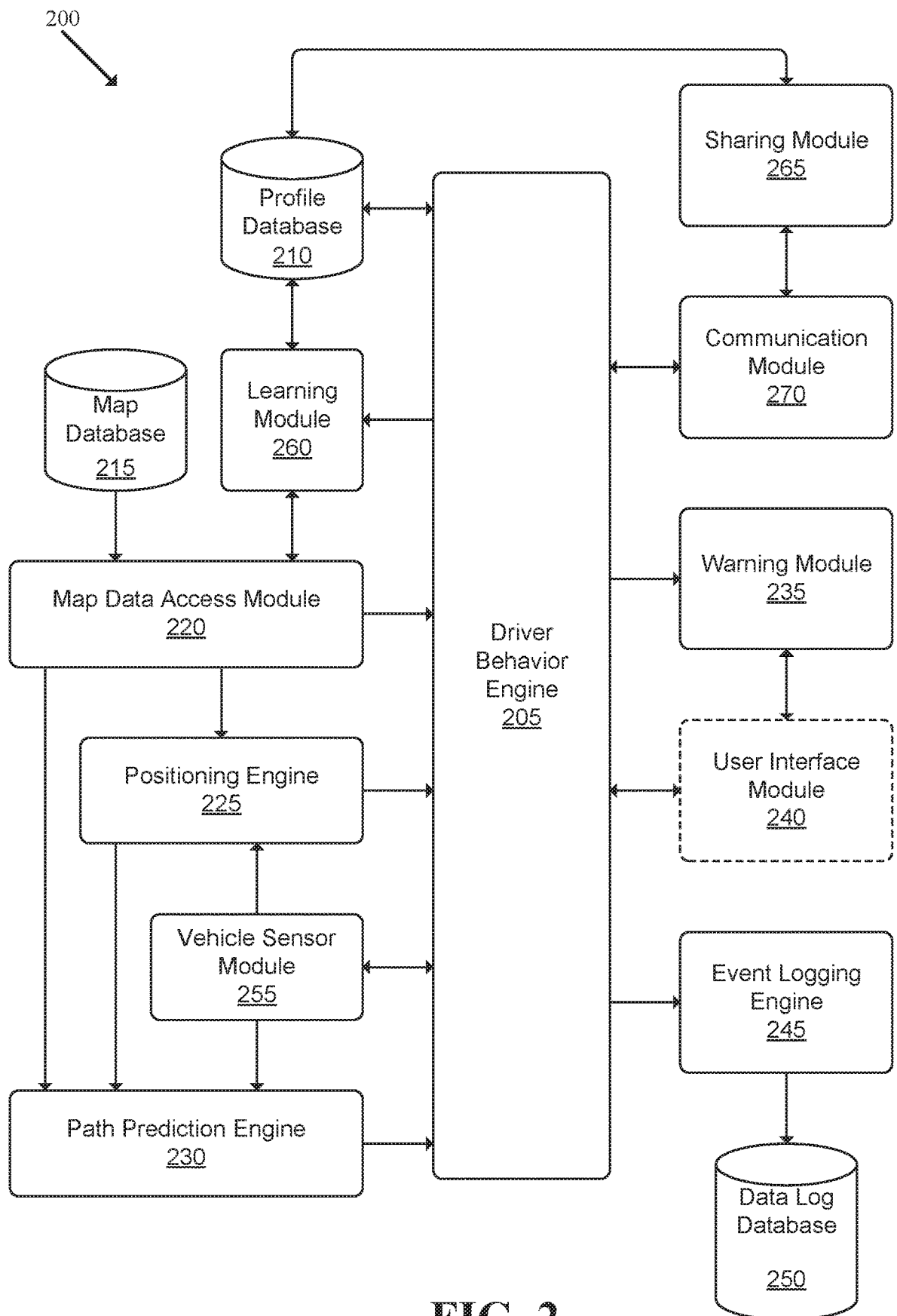
FIG. 2 illustrates a schematic block diagram of an in-vehicle architecture included in some embodiments of the system of FIG. 1.

FIG. 2 illustrates a schematic block diagram of an in-vehicle architecture 200 used by some embodiments of system 100. Specifically, this figure shows various sub-elements that may be included in the driver behavior engine 130. As shown, the in-vehicle architecture 200 may include a driver behavior engine 205, a profile database 210, a map database 215, a map data access module 220, a positioning engine 225, a path prediction engine 230, a warning module 235, an optional user interface module 240, an event logging engine 245, a data log database 250, a vehicle sensor module 255, a learning module 260, a sharing module 265, and a communication module 270.

As described above and below, the driver behavior engine 205 (also referred to as a "processor" or "controller") may include software and/or hardware elements that may perform driver analysis based on various data. The driver behavior engine may be able to communicate with vehicle sensor module 255, profile database 210, map data access module 220, positioning engine 225, path prediction engine 230, warning module 235, user interface module 240, and/or event logging engine 245.

The profile database 210 may include sets of files that store and/or define various vehicle and/or user characteristics. The profile database may include different profiles for different vehicles, different users, and/or different applications (e.g., safety, fuel efficiency, teen driving, etc.). The profile database may include parameters that define which behavior curves to support and/or how to calculate various safety curves and/or optimal curves. The profile database may be able to communicate with the driver behavior engine 205 and/or various other system elements. The profiles stored in database 210 may be updated by the driver behavior engine 205 based on vehicle sensor feedback.

The profile database 210 may include reference curve models associated with the map database 215 that are self-learned or downloaded from other systems via the sharing module 265. Dynamic reference curve models may be data structures that describe various reference curves associated with map segments. The models may be self-generated (e.g., via the learning module 260) or retrieved from external sources via the sharing module 265.

The map database 215 may store data related to roads and/or terrain, and may include information such as elevation, surface type, steepness, curve radius, etc. In addition, the map database 215 may store data related to various features (e.g., information regarding speed limits, traffic signals and/or signage, number of travel lanes, road classes, etc.) and/or attributes of the environment (e.g., traffic conditions, traffic patterns, construction notices, weather forecasts, etc.).

The map data access module 220 may provide efficient, database format independent access to the map database 215. The map data access module 220 may be able to retrieve information from the map database 215, and/or communicate with the driver behavior engine 205, the positioning engine 225, and/or the path prediction engine 230.

The positioning engine 225 may be able to receive information from the vehicle sensors 120 and the map data access module 220. The positioning engine 225 may process the received information to determine a position of the vehicle. The positioning engine 225 may be able to send such determined position information to the driver behavior engine 205, and/or the path prediction engine 230. The positioning engine 225 may include various software modules that are responsible for receiving vehicle positioning sensor information such as GPS, inertial sensors, etc. and matching the received information to a position on a road segment from the map database 215. The positioning engine 225 may return a set of candidate map segments, each with an associated probability. The positioning engine may be used to identify map segments associated with the vehicle travel path and construct a vehicle map path based at least partly on the identified map segments.

The path prediction engine 230 may be able to receive information from the vehicle sensor module 255, the map data access module 220, and the positioning engine 225. The path prediction engine 230 may be able to send information to the driver behavior engine 205. The path prediction engine 230 may process the received information in order to predict a set of driving paths of the vehicle ahead of the current vehicle position. Such path prediction will be described in more detail in Section III below.

The warning module 235 may be able to receive information from the driver behavior engine 205 and/or communicate with the user interface module 240. The warning module 235 may provide real-time warnings and/or guidance to drivers. The warning module may, for example, display information on a vehicle display, head-unit, instrument cluster, dashboard, and/or any other appropriate location. The warning module may be able to emit sounds and/or voice commands/warnings. The warning module may be able to provide other warning methods such as seat and/or steering wheel vibration, colored and/or flashing lights, written messages, and/or any other appropriate warning method. Such warnings may be based on various appropriate factors.

The user interface module 240 may be able to communicate with the driver behavior engine 205, and the warning module 235. The user interface module 240 may be able to provide information and/or warnings to a user and/or allow the user to interact with the driver behavior engine 205. The user interface module 240 may include various appropriate elements (e.g., buttons, icons, etc.) that may allow a user to control and/or interact with the system.

The event logging engine 245 may be able to receive information from the driver behavior engine 205 and send information to the data log database 250. The event logging engine 245 may continuously record received information. Such received information may include vehicle sensor information, map information, warning information, driver behavior information, environmental information, and/or other appropriate information.

The data log database 250 may be able to receive information from the event logging engine 245. The data log database 250 may store information received from the event logging engine 245 including warning events, driver characteristics, vehicle characteristics, etc.

The vehicle sensor module 255 may receive measured data from at least one vehicle sensor. A single vehicle sensor module may receive data from multiple vehicle sensors and multiple vehicle sensor types. The sensor types may include GNSS sensors (GPS, GLONASS, Galileo, Beidou, etc.), inertial sensors (i.e., gyro, accelerometers, etc.), radar sensors, laser sensors, camera sensors, and/or any other appropriate sensors. The sensors may provide various sensor information available from the vehicle, such as speed, odometer readings, revolutions per minute (RPMs), gas pedal position, differential speed pulse, brake pedal position, turn signal indications, fuel level, battery charge level, front shield wipers status, outside temperature, gear position, etc. The vehicle sensor module may be able to communicate with the driver behavior engine 205, the positioning engine 225, and/or the path prediction engine 230, as appropriate.

The learning module 260 may calculate dynamic reference curve models for a given map segment based on sensor data and/or other data received from the driver behavior engine 205. Any newly calculated models may be merged with one or more existing models in order to generate updated models that may be stored in the profiles database 210.

The sharing module 265 may retrieve dynamic reference curve models from other back-end systems and/or vehicles. The module may also share the updated models with other back-end systems and/or vehicles. The sharing module may use the communication module 270 to communicate with other systems or vehicles.

The communication module 270 may allow communication with other systems and/or devices across one or more networks, wired or wireless pathways, etc.

During operation, the vehicle sensor module 255 may send sensor information to the positioning engine 225, driver behavior engine 205 and/or the path prediction engine 230. The map data access module 220 may retrieve map information from the map database 215 and send efficient and database format-independent map information to the driver behavior engine 205, the positioning engine 225, and/or the path prediction engine 230. The positioning engine 225 may use information received from the vehicle positioning sensor(s) to match the vehicle position to a position on a road segment received from the map data access module 220.

The path prediction engine 230 may be used to predict the path of a vehicle ahead of a current position. The path prediction engine may use information received from the vehicle sensor module 255, the positioning engine 225 and the map data access module 220 to determine the most likely path a vehicle will take and calculate various probabilities of taking various different paths.

The driver behavior engine 205 may perform driver analyses based on current position information received from the positioning engine 225, predicted path information received from the path prediction engine 230, map database 215 information received from the map data access 220, and/or other vehicle sensor information received from vehicle sensor module 255. The driver behavior engine 205 may use profile information from the profile database 210 that define expected driver behavior, vehicle characteristics, and/or different types of applications. In addition, the driver behavior engine 205 may estimate driver behavior values (e.g., speed, acceleration, etc.) and assign probabilities to the associated estimated values.

The driver behavior engine 205 may build current driver behavior curves based on the current position, predicted path, and map database and then may compare the current curves to expected curves, taking into account the various path probabilities. The driver behavior engine may also update the various profiles and reference curve models based on the measured input from the sensor module 255 using the learning module 260, thus providing an adaptive, self-learning system. Such a system may be especially useful for application of energy efficient driving profiles.

The driver behavior engine 205 may generate driver behavior curves based on a vehicle's current position, a vehicle's predicted path, profile information, and/or map information, and/or may compare the behavior curves with expected curves taking into account various probabilities. The driver behavior engine may generate warning events and/or calculate a driver behavior score, as appropriate. The driver behavior engine may update profiles based on measureable input from the vehicle sensor module 255 and provide a self-learning system. The driver behavior engine 205 may send various driving data to the event logging engine 245, which, in turn, may send data to the data log database 250. Data stored in the data log database may be used for offline post processing and analysis.

The warning module 235 may receive information from the driver behavior engine 205 and may communicate with the user interface module 240. The warning module 235 may be configured to provide safety warnings, alerts, and/or guidance messages to drivers to improve their driving skills, provide and improve safety, monitor and improve fuel efficiency, teach and/or improve teen driving, etc.

One of ordinary skill in the art will recognize that the architecture 200 is exemplary in nature and may be implemented in various different ways without departing from the scope of the disclosure. For instance, the architecture may be implemented as an embedded system (i.e., some or all of the elements may be provided by a device such as a computer). As another example, various elements may be removed and/or various other elements may be included. In addition, multiple elements may be combined into a single element and/or a single element may be divided into multiple elements. Furthermore, various other communication pathways may be utilized and/or included.

Figure 3:
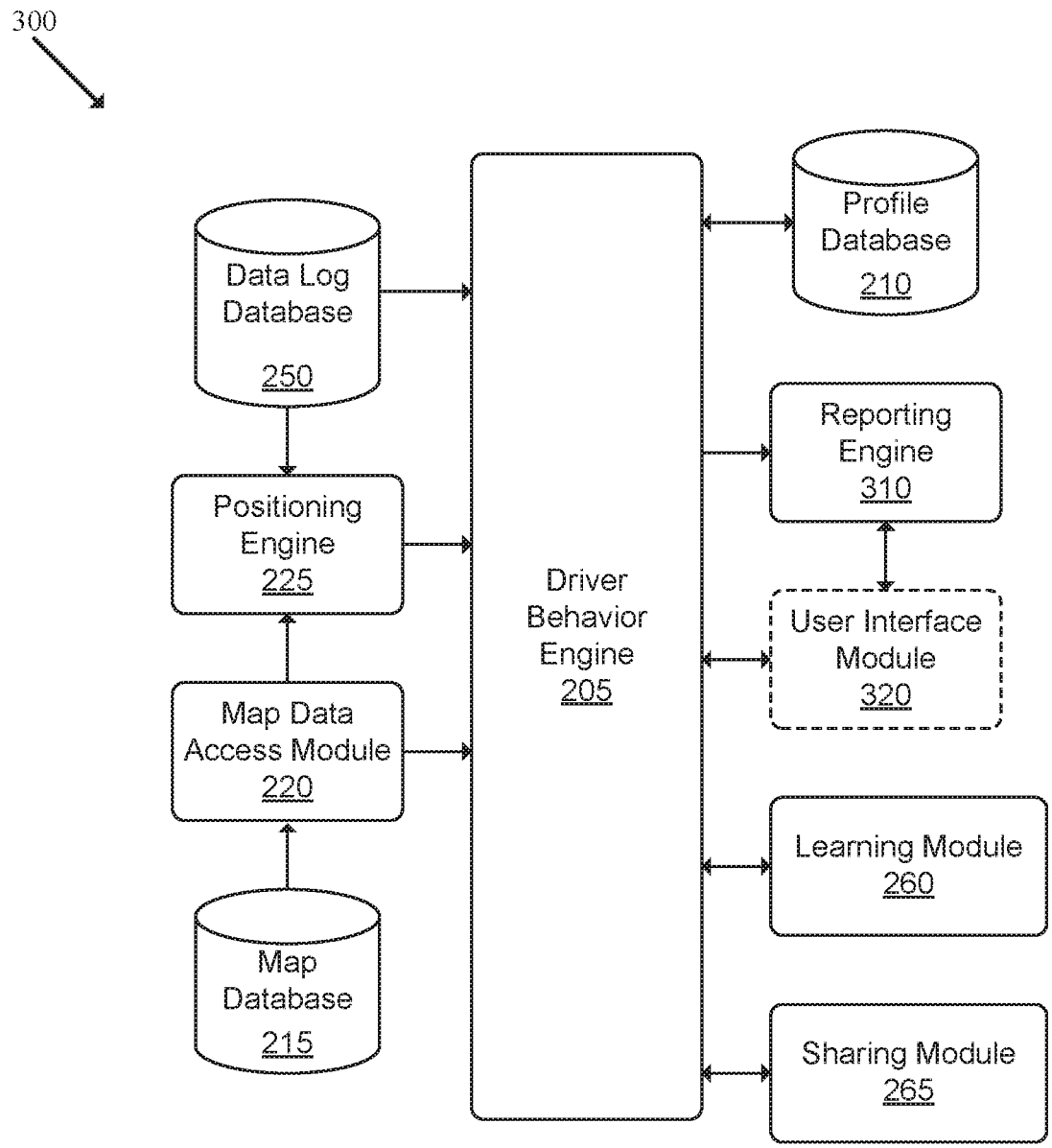
FIG. 3 illustrates a schematic block diagram of an offline architecture provided by some embodiments of the system of FIG. 1.

FIG. 3 illustrates a schematic block diagram of an offline architecture 300 provided by some embodiments of the system 100. Specifically, FIG. 3 shows various components and communication pathways that may allow the system to be operated independently of any vehicle. As shown, the offline architecture may include a driver behavior engine 205, a profile database 210, a map database 215, map data access module 220, a positioning engine 225, a data log database 250, a learning module 260, a sharing module 265, a reporting engine 310, and/or a user interface module 320.

The various system elements 205-265 may be similar to those elements described above in reference to FIG. 2. Such elements may be able to evaluate various data streams as if they were presented during in-vehicle operation.

The reporting engine 310 may be able to receive information from the driver behavior engine 205 and/or communicate with the user interface module 320. The reporting engine 310 may process various driving data, and generate reports based upon received data. Such reports may include descriptions of driving events, suggestions for improving driving behavior, etc.

The user interface module 320 may communicate with the driver behavior engine 205 and/or the reporting engine 310. The user interface module 320 may be able to allow a user to interact with the driver behavior engine 205. For instance, the user interface module 320 may receive reports from the reporting engine 310 and convert the reports to a user-readable format.

During operation, the driver behavior engine 205 may receive profile information from the profile database 210, map data from the map data access 220, positioning information from the positioning engine 225, and other vehicle sensor information from the data log database 250. The driver behavior engine 205 may use this information to construct optimal and critical curves, and compare the constructed curves with the drive curves from the vehicle.

The driver behavior engine 205 may use the optimal curves and critical curves to create warning or violation events, calculate a driving score. This information may be sent, along with various other data, to the reporting engine 310 for further processing. Information processed by the reporting engine may be converted to a user-readable form by the user interface module 320. For example, data in the reporting engine 310 can be generated into a written report by the user interface module 320. The user interface module 320 may also allow a user to input information into the driver behavior engine 205. Other embodiments may include user interface modules with computer screens, graphic data, etc.

Some embodiments of system 300 may be implemented using various web services and/or web-based user interfaces (UIs) such as may be provided using a browser. In some embodiments, third-party applications may be able to access some or all elements of the system 300 through an application programming interface (API) and/or other appropriate ways.

One of ordinary skill in the art will recognize that the architecture 300 is exemplary in nature and may be implemented in various different ways without departing from the scope of the disclosure. For instance, various elements may be removed and/or various other elements may be included. In addition, multiple elements may be combined into a single element and/or a single element may be divided into multiple elements. Furthermore, various other communication pathways may be utilized and/or included.

Figure 4:
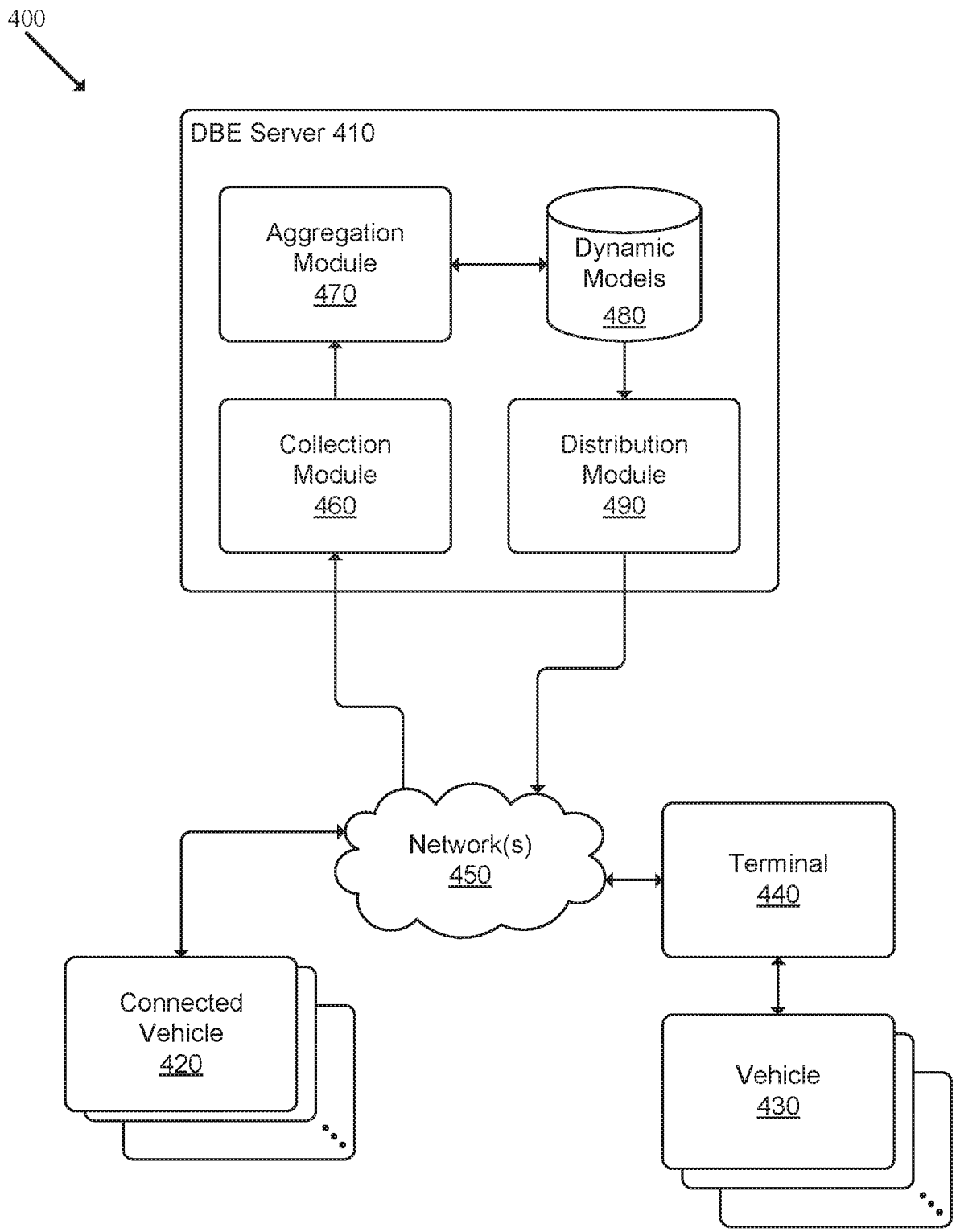
FIG. 4 illustrates a schematic block diagram of an exemplary adaptive system according to some embodiments of the invention.

FIG. 4 illustrates a schematic block diagram of an exemplary adaptive system 400 according to some embodiments of the invention. As shown, the system may include a driver behavior engine server 410, a number of connected vehicles 420, a number of unconnected vehicles 430, one or more networks 450, and a number of technician terminals 460.

Each connected vehicle 420 may be a vehicle including an in-vehicle system such as system 110 described above. The connected vehicles 420 may include a communication module 270 that may utilize an interface 160, as described above. The communication module may allow for communication between the vehicle and other system components. The communication module may be provided by the vehicle itself (e.g., using a cellular modem, Wi-Fi infrastructure, etc.) or may be provided by another resource (e.g., a smartphone, tablet, etc.).

Each unconnected vehicle 430 may include an in-vehicle system such as system 110 described above, but may not have any dedicated communication capabilities (and/or other pathways may be unavailable). Such unconnected vehicles 430 may be able to connect to the server 410 via a technician terminal 460 and network 450.

The connected 420 and unconnected 430 vehicles may include some or all of the other elements described above in reference to driver behavior engine 200 or 300. Some embodiments may include only the modules needed to collect data and send it to the server 410 for analysis.

Network 450 may include various local and/or distributed networks (e.g., Ethernet, cellular networks, Wi-Fi, Dedicated Short Range Communications (DSRC), the Internet, etc.) that may allow communication among the various system components.

Terminal 460 may be able to connect to the vehicles 430 using a physical connection. The terminal 460 may also be able to connect to the server 410 and/or other vehicles 420 via the network 450.

The server 410 may be similar to server 190 described above. The server 410 may be a back-end system that aggregates and/or shares vehicle data. The server may perform various driver behavior calculations during post-analysis. Such post-analysis may include generation of notifications based on driver performance relative to the various evaluation curves. The server 410 may include multiple instances and may be distributed across multiple geographic locations, data centers, database servers, etc.

As shown, the server 410 may include a collection module 460, an aggregation module 470, a dynamic model database 480, and a distribution module 490.

The sharing module 265 may retrieve dynamic models from the server 410 and/or upload calculated or example models. The sharing module 265 may utilize the communication module 270 to interface with the server 410.

The collection module 460 may receive and authenticate data from various vehicles. Valid data may be passed to the aggregation module 470.

The aggregation module 470 may aggregate, weight, store, and update dynamic models based on received vehicle data.

The database 480 may store received vehicle models (and/or other data). In addition, the database may store the latest dynamic models generated by the aggregation module 470.

The distribution module 490 may distribute updated dynamic models to appropriate vehicles. The module may include a content delivery network (CDN) or implement any other protocols for providing models to vehicles and/or otherwise interacting with the vehicles.

The server 410 may be able to communicate with various connected vehicles 420, terminals 460, etc. over the network 450.

One of ordinary skill in the art will recognize that the architecture 400 is exemplary in nature and may be implemented in various different ways without departing from the scope of the disclosure. For instance, various elements may be removed and/or various other elements may be included. In addition, multiple elements may be combined into a single element and/or a single element may be divided into multiple elements. Furthermore, various other communication pathways may be utilized and/or included.

Figure 5:
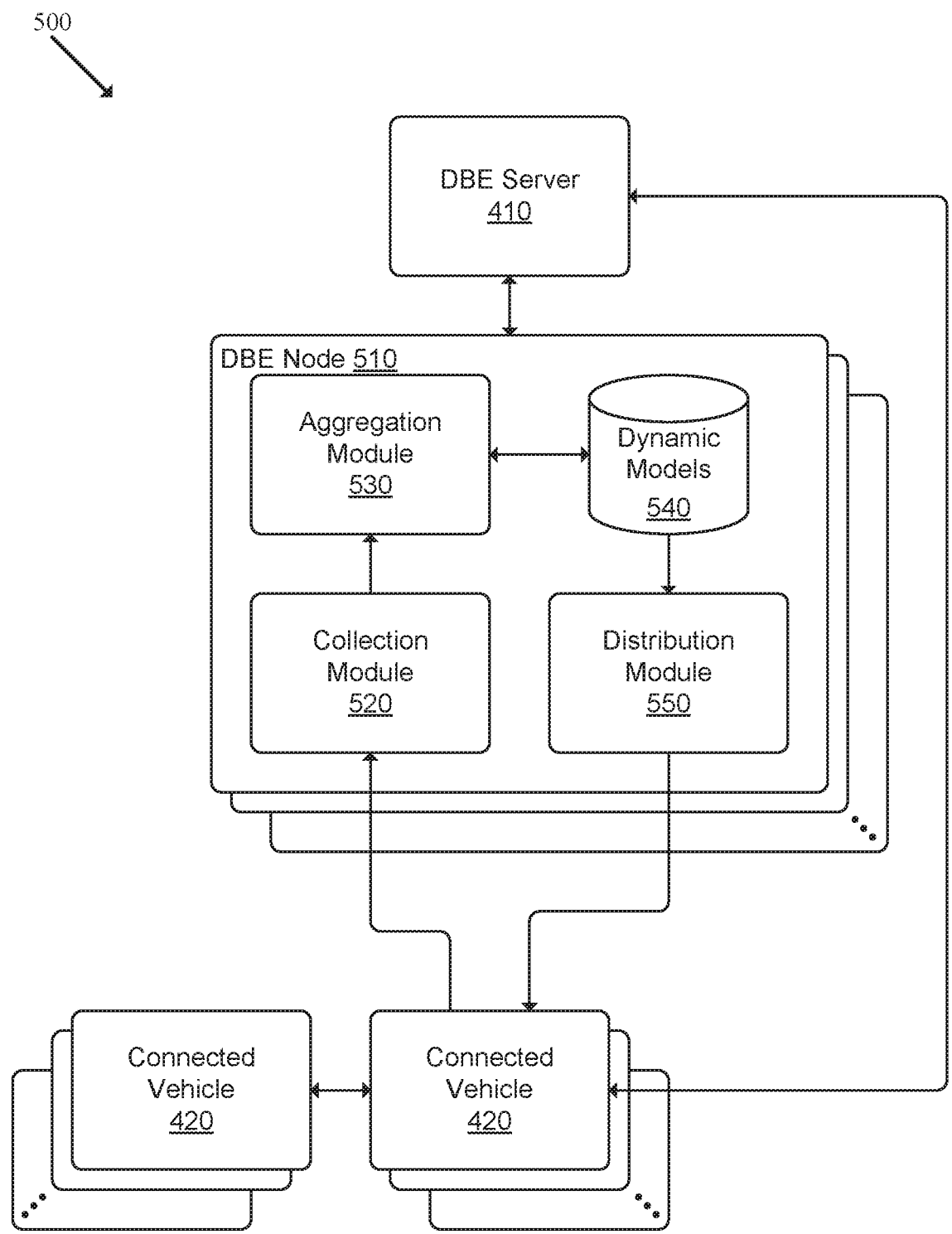
FIG. 5 illustrates a schematic block diagram of an exemplary adaptive system including roadside equipment according to some embodiments of the invention.

FIG. 5 illustrates a schematic block diagram of an exemplary adaptive system 500 including roadside equipment according to some embodiments of the invention. As shown, the system 500 may include the server 410, a number of nodes 510, and various connected vehicles 420.

In this implementation, the vehicles 420 may communicate with roadside equipment 510. Such communication may utilize a DSRC link. Such an implementation may be referred to as vehicle infrastructure integration (VII) or vehicle to infrastructure (V2I).

The roadside equipment 510 may run a server instantiation ("DBE Node") that includes local versions 520-550 of some or all of the various server elements 460-490 described above. The nodes may collect and process data from nearby vehicles. The nodes may, in turn, share the data with the server 410 for model aggregation.

The vehicles 420 may be able to communicated with the nodes 510 (when available) and/or the server 410 as described above.

In some cases, the node 510 may include the full capabilities of the server 410, but may only store and process local models (e.g., models associated with a geographic area around the node). In other cases, the node 510 may be a low powered (or otherwise limited) module that only collects data from the vehicles 420, uploads the collected data to the server 410, downloads and stores the latest models from the server, and provide the models to nearby vehicles 420.

Some embodiments may utilize vehicle-to-vehicle (V2V) communications that allow vehicles to communicate important safety and mobility information to one another using a DSRC network.

In the currently planned V2V infrastructure, the vehicles may exchange messages including vehicle information (e.g., vehicle speed, heading, braking status, etc.). V2V devices may use this information from other vehicles in order to determine if a warning to the driver of the vehicle is needed, where such a warning may help prevent a vehicle crash. In the case of the driver behavior engine of some embodiments, the information from the other vehicles may be used to dynamically adjust the reference curves for the current vehicle. For example, detecting sudden braking ahead, the driver behavior engine may adjust the speed and acceleration safety curves of the current vehicle.

Furthermore, the V2V messages may be extended with additional data structures that include dynamic reference models of the vehicles ahead of the current vehicle. These models could be useful for defining an energy efficient driving style. For example, the driver of the vehicle ahead could be driving optimally for the current road conditions and that model may be used by the following vehicles. Similarly, a safety reference curve model may be shared. This way, highly local and timely curves may be exchanged between the vehicles and improve the more static models already in use by the vehicle.

The V2V communication module 270 may be responsible for communicating with the other nearby vehicles. The module may receive or share vehicle sensor and driver behavior engine model information. The data may be managed through the sharing module 265.

The approaches described above each have advantages and disadvantages. For the best performance and results, all of these approaches may be combined where possible. For instance, the V2V communication may provide highly local and up-to-date information to the vehicles. When the vehicles are in the range of roadside infrastructure 510 the vehicles may exchange larger messages with more complete dynamic models relevant to the surrounding area using V2I communication. At any time, the models may be sent to or updated from the DBE Server 410, if a communication pathway is available. Eventually, when the cellular infrastructure supports such an approach, vehicle to cloud might be negate the need for other approaches. Until cellular coverage is everywhere and the communication latencies become low, augmenting the communication with V2V and V2I modes may be very beneficial.

One of ordinary skill in the art will recognize that the architecture 500 is exemplary in nature and may be implemented in various different ways without departing from the scope of the disclosure. For instance, various elements may be removed and/or various other elements may be included. In addition, multiple elements may be combined into a single element and/or a single element may be divided into multiple elements. Furthermore, various other communication pathways may be utilized and/or included.

Figure 6:
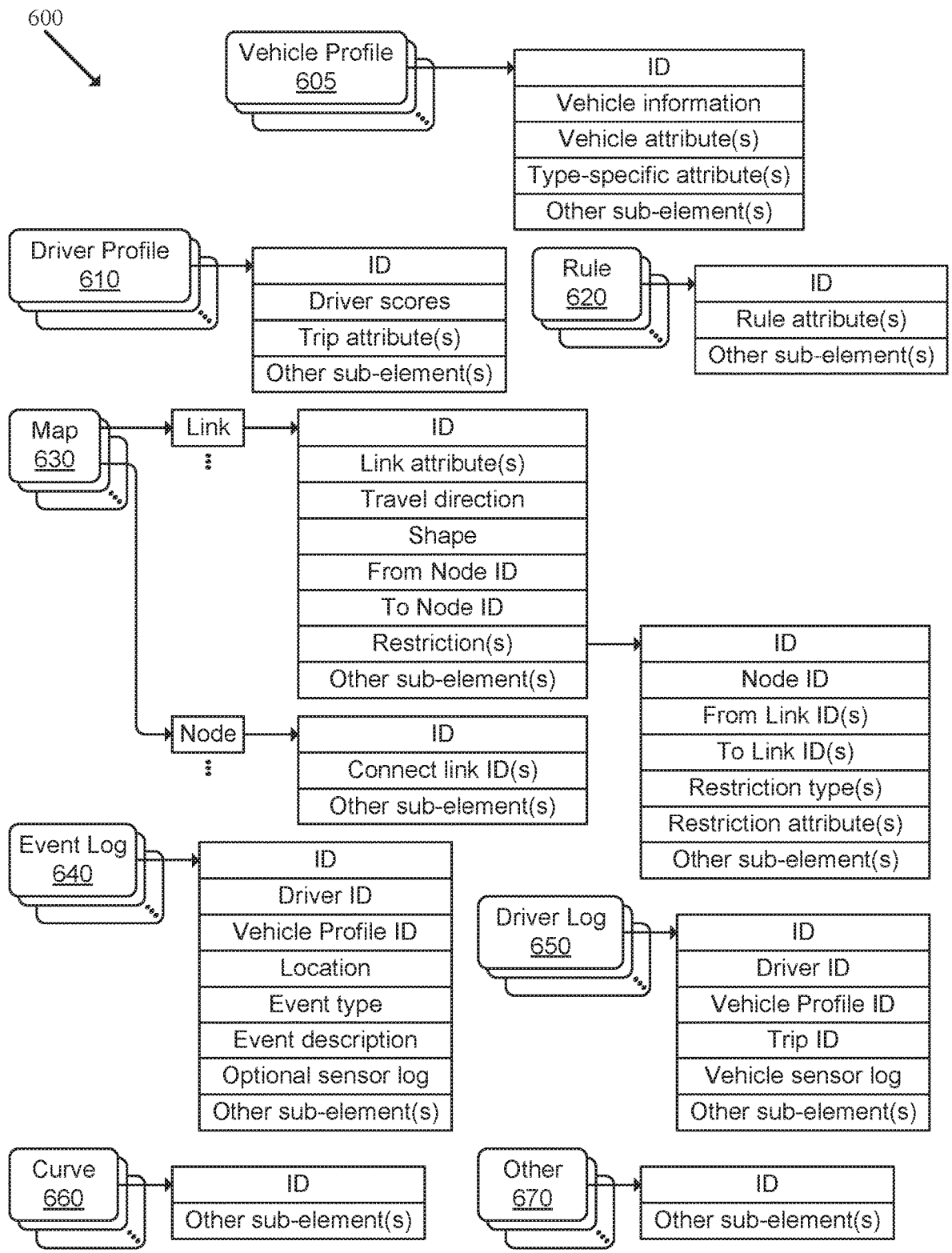
FIG. 6 illustrates a data structure diagram according to some embodiments of the invention.

FIG. 6 illustrates a data structure diagram 600 according to some embodiments of the invention. Specifically, this figure shows various data elements and sub-elements that may be generated, stored, accessed, and/or manipulated by some embodiments. As shown, the system data structure(s) may include vehicle profile data elements 605, driver profile data elements 610, rule data elements 620, map data elements 630, event log data elements 640, driver log data elements 650, curve data elements 660, and/or other data elements 670.

Each vehicle profile data element 605 may include a vehicle profile ID, vehicle information, vehicle attributes, type-specific attributes, and/or other sub-elements. Vehicle information may include, for instance, a vehicle's make, model, VIN, etc. Vehicle attributes may include, for instance, a vehicle's weight, cross-section, drive train efficiency, etc. Vehicle type-specific attributes may include, for instance, information such as an electric vehicle's maximum battery charge, a gross weight of a vehicle, etc.

Each driver profile data element 610 may include, for example, a driver profile ID, driver scores, trip attributes, and/or other sub-elements. Driver scores (or drive style factors) may include, for instance, various scores for different observable driving characteristics. For example, a driver may have different scores for braking, acceleration, safe turning, fuel efficient driving, etc. Trip attributes may include, for instance, such information as load weight, type of load (e.g., passengers, cargo, hazardous materials, etc.), and/or vehicle configuration (e.g., number/size of wheels, whether trailers are present, etc.).

Each rule data element 620 may include a rule ID, rule attributes, and/or other sub-elements, as appropriate. A rule may include various specific elements depending on the type of rule being implemented and any attributes that may be associated with the rule. A rule may be used to identify one or more driving events (and/or other appropriate performance criteria). For instance, in some embodiments a rule may include a threshold (which may be defined as a curve) and the rule may identify an event whenever sensed data (e.g., driving speed) exceeds the threshold. As another example, in some embodiments a rule may include multiple thresholds. Such a rule may include a first threshold (which may be defined as a curve) and a second threshold (which may be defined as an area or a length of time). When the first threshold is exceeded, the rule may identify a potential event, where the potential event may not be classified as an event until the second threshold is exceeded (e.g., when an amount of time exceeding the threshold has passed, when an area defined between a set of curves exceeds a threshold value, etc.).

Each map data element 630 may include link (or "segment") data (i.e., a stretch of road between two intersections where the link attributes remain the same), and/or node data (i.e., a connection point between road links). Link data may include, for instance, a link ID, link attributes (e.g., functional class, road type, posted speed limit, speed category, link length, etc.), link travel direction, link shape, from-node ID (i.e., identifier of a node at the beginning of the link), to-node ID (i.e., identifier of the node at the end of the link), driving restriction data (e.g., physical, logical, time restricted, etc.), and/or other sub-elements. Node data may include, for instance, a node ID, a set of connect-link IDs, and/or other sub-elements. Using this structure, node and link entities may be used to define a connected graph of a road network.

Each driving restriction data element may include, for instance, a restriction ID, node ID, from-link ID(s), to-link ID(s), restriction type(s), restriction attributes, and/or other sub-elements. Types of restrictions may include, for instance, turn restrictions, stop restrictions (e.g., traffic lights, stop signs, etc.), speed restrictions (e.g., posted speed limits, speeds for certain terrains and/or conditions, etc.), traffic restrictions, weather restrictions, school-zone restrictions, construction restrictions, etc. Restriction attributes may include, for instance, specific data regarding certain driving restrictions (e.g., time period of the restriction, duration of the restriction, etc.).

Each event log data element 640 may include an event log ID, driver ID, vehicle profile ID, location, event type, event description, an optional sensor log, and/or other sub-elements. The location data may include, for instance, latitude, longitude, current speed, a vehicle's heading, link ID, which side of the road and/or which lane a vehicle is traveling in, a vehicle's distance from the beginning of the link, etc. The event log may store information regarding various driving events (e.g., turning hazards, exceeding posted speed limits, etc.).

Each driver log data element 650 may include a driver log ID, driver ID, vehicle profile ID, trip ID, vehicle sensor log, and/or other sub-elements. The driver log may store data regarding various driving trips (e.g., time traveled, distance traveled, possible warning events, gasoline and/or electricity consumed, etc.).

Each curve data element 660 may include a curve ID, and/or other sub-elements. Each other data element 670 may include various other types of useful data, which may include a particular ID, and/or other sub-elements.

Figure 7:
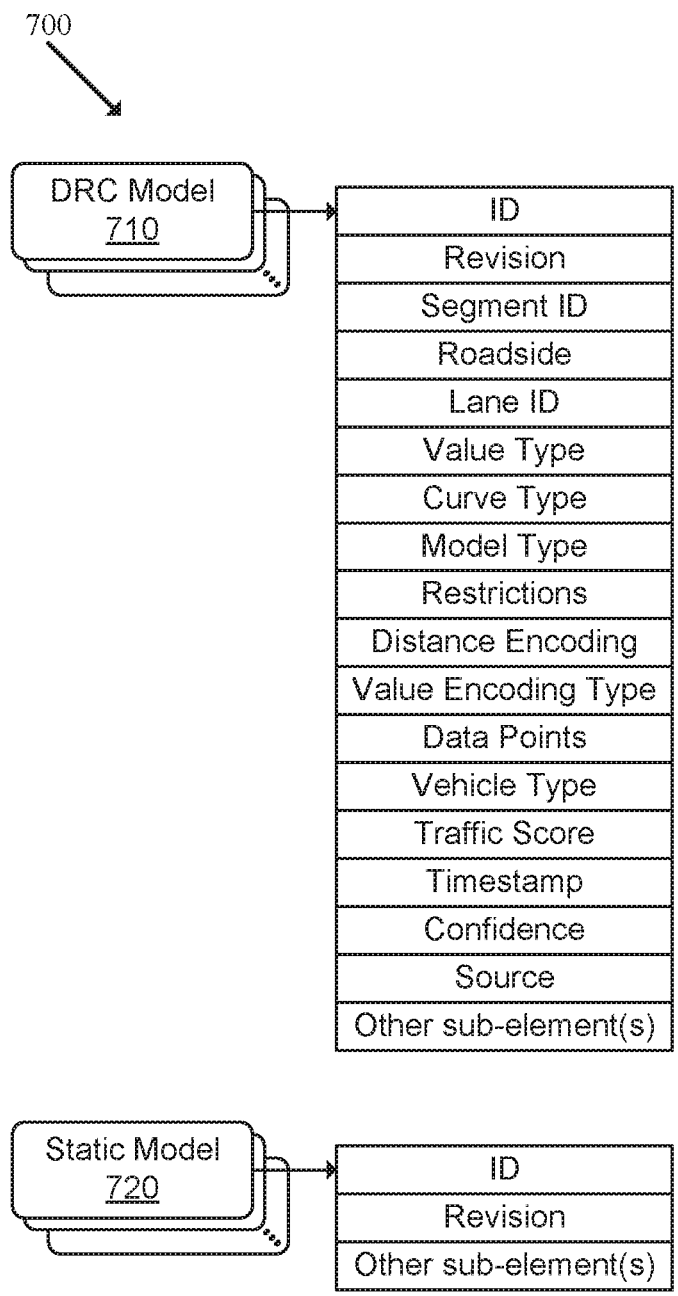
FIG. 7 illustrates a data structure diagram used for dynamic model management in some embodiments of the invention.

FIG. 7 illustrates a data structure diagram 700 used for dynamic model management in some embodiments of the invention. The data elements may augment the elements described above in reference to diagram 600.

As shown, the data structures may include dynamic reference curve models 710 and static curve models 720. Various elements are omitted from the static model for brevity. The static model may include some or all of the elements of model 710 described below, as appropriate.

The sub-elements may include, a "Model Identifier" (Model ID), "Model Revision" element, "Segment Identifier" (Segment ID), "Roadside" attribute, "Lane Identifier" (Lane ID), "Value Type" element, "Curve Type" element, "Model Type" element, "Restrictions" element, "Distance Encoding" parameter, "Value Encoding" element, data points, "Vehicle Type" element, "Traffic Score" element, "Timestamp" element, "Confidence" element, "Source" element, and/or other sub-elements.

The Revision element may include a unique identifier indicating the revision of the model. Such an identifier may be used to determine characteristics of the revision (e.g., date created, date modified, vehicle and/or driver attributes, etc.). The identifier also allows comparison of the revision with other versions. Each model revision may be associated with multiple vehicles, drivers, etc.

The Segment ID element may be a unique identifier associated with a particular map segment, to which the model is associated. The Segment ID may include permanent identifiers (or "pre-coded location references"). Such permanent identifiers may be managed by a map vendor or other map compiler. Such identifiers may be maintained across multiple revisions of a map database. In addition, such identifiers may be matched to multiple map compilers.

In some embodiments, the Segment ID may include dynamic location references. Such references may include information that allows a receiving system to match the reference to a local database. Such reference systems may be portable across different systems with different map compilers. Examples of such systems include OpenLR and ISO 17572-3.

The Roadside element may specify a side of the road to which a model applies (e.g., left, right, both, etc.). In some cases, the Roadside may be defined in terms of "from" and "to" directions associated with the segment. The map database may include a predefined rule for determining "from" and "to" direction. For example, the leftmost (or most west) point or the point with the least longitudinal value may be defined as the "from" location). If the segment is vertical (i.e., the start and end points have the same longitude), the point with the lowest latitudinal value (or the most south point) may be defined as the "from" point. Segments that form closed loops (i.e., where the start and end points are the same) may not be allowed. Such closed loop segments may be divided into two or more sub-segments. Such algorithms allow "from" and "to" sides to be identified for any given segment. In relation to a vehicle, the from side may be the side of the road on which the vehicle is able to drive from the "from" point to the "to" point.

The Lane ID element may be an optional field where a model is defined at a lane level. The identifier may indicate the lane number on a side of the road indicated by the "roadside" field. The lane identifier may be a lane sequence number from the outside of a road to the inside, regardless of the driving direction.

The Value Type element may indicate the type of value(s) stored in the model (e.g., speed, acceleration, lateral acceleration, etc.).

The Curve Type element may define the type of reference curve described by the model. For example, the type may be safety, critical safety, warning, fuel efficient, etc. Example models may include "unknown" curve types that may be defined at a later time.

The Model Type element may define the type of model stored in the data structure. Such Model types may include "example" (e.g., data collected from a single vehicle), aggregated, verified, etc. Some embodiments may also indicate a "strength" of the Model Type as defined by the confidence parameter discussed below.

The Restrictions element may be an optional parameter that defines various restrictions of the model (e.g., date, day of the week, and/or time). For example, a model may be associated with a specific holiday that has known traffic or restriction patterns. The Restrictions field allows for temporal models that reflect road construction, scheduled or unscheduled events, etc.

The Distance Encoding parameter may describe how the data points are represented along the distance of the map segment. Curves are two dimensional objects, where the "X"-axis may represent the distance along the map segment. Depending on the type of curve and data points, different ways of representing the X-coordinates can lead to more efficient representation. Several distance encoding options are described below. In addition to the type of encoding, the parameter may include the bit size of each value.

Absolute distance encoding may represent the X-coordinate of each data point as an absolute distance value (e.g., in meters, centimeters, miles, feet, etc.) from the beginning of the segment.

Relative distance encoding may represent the X-coordinate of each data point as a difference from the previous distance. Such an approach may reduce the number of bits needed to represent the distance value.

Fixed step encoding may include data points spaced at a predefined distance (e.g., ten meters).

The "Value Encoding" may be an attribute that specifies how the data points of the model (i.e., the Y-coordinates corresponding to the various types of X-coordinates described above) are encoded. The various value encoding types may be utilized with the various distance encoding types. Several value encoding options are described below. In addition to the type of encoding, the parameter may include the bit size of each value.

Absolute value encoding may represent the Y-coordinates as absolute values.

Delta value encoding may represent the Y-coordinates as a difference from the previous value. Such an approach may reduce the number of bits needed to represent the values. Polynomial encoding may represent the Y-coordinates using a polynomial. The data points described below may include parameters of the polynomial function, thus enabling more compact representation of curves.

The data points may include values that define the curve. Such data points may include values, such as X and Y coordinates, with structures and representations defined by the value encoding type and the distance encoding parameters.

The Vehicle Type may be an optional parameter that specifies the vehicle type that collected the data.

The Traffic Score may be an optional parameter that defines the surrounding traffic conditions for the current model. The score may be calculated for example models as described below, but also could be set for reference models to be used by the driver behavior engine to better determine how to use or match the reference model.

When looking at the reference driver behavior curves generated from real data, a big factor that governs the driver behavior is the traffic situation of the given road segment when the data was collected. In cases of heavy traffic, with many vehicles around the current subject vehicle, the speed and behavior of the current vehicle will be largely governed by the speed of the other vehicles. If the road is relatively open, the driver may have a wider range of control. Because of that, there needs to be a way to classify the traffic situation around the vehicle and store it in the model as the traffic score parameter.

One way of determining the traffic situation around the vehicle is to use some of the existing sensors in the vehicle to determine the number, frequency, and distance of the other vehicles around the current vehicle.

Many modern vehicles have additional sensors that can determine the presence and distance to other vehicles, such as ultrasonic sensors, radars, LIDAR, blind-spot sensors, cameras, etc. that are used for collision detection, parking assist and other advanced driver assistance systems (ADAS). In addition to sensors the vehicle might obtain such information from V2V infrastructure if such is available. If such sensor information is available, the current vehicle can calculate the traffic score that estimates how "heavy" the traffic is around the vehicle. The score can be calculated based on the measured distance from the current vehicle to the vehicle ahead, using a formula such as equation (1) below:

$$Stf = \text{average}(Stf\_point) \quad (1)$$

Where Stf is the front traffic score, average is a function that calculates the average value (mathematical mean) of point values and Stf_point is a single point traffic score at a point of time for the vehicle ahead and can be calculated using equations (2) and (3) below:

$$Stf\_point = (\text{safe\_dist}(speed) - d)/\text{safe\_dist}(speed) \quad (2)$$

$$\text{If } Stf\_point < 0 \text{ then } Stf\_point = 0 \quad (3)$$

Where safe_dist is a function that returns the safe distance threshold from the vehicle ahead based on the current vehicle speed and d is the measured distance from the current vehicle to the vehicle ahead. The threshold can be calculated based on a predefined react time value. In other words, the function returns the distance between the two vehicles that gives the driver the necessary time to react. The react time could be, for example, three seconds (based on the three second rule of thumb) and reflect a reasonable time zone around the vehicle that a typical driver will keep on a non-congested road.

The calculated traffic score may reflect the frequency with which vehicles are inside the safe react time zone for the stretch of the current map segment. Values larger than fifty percent will indicate traffic congestion and values larger than seventy-five percent will indicate heavy traffic congestion.

It is possible that a driver maintains the same distance with the vehicle ahead and thus generates a high traffic score. However, unless the vehicle is equipped with an automatic following system, such as adaptive cruise control, it is unlikely that a human driver can maintain a constant distance with the vehicle ahead that is less than the safe zone, unless there is traffic.

To further improve the relevance of the traffic score, the algorithm may include inputs from rear distance sensors (if available). A score for the traffic behind the vehicle ('Str'), may be calculated in a similar manner as the forward traffic ('Stf'). The two values can be averaged as shown below in equation (4):

$$St = (Stf + Str)/2 \quad (4)$$

Where St is the averaged traffic score for front and rear traffic.

Sensors on the side of the vehicle may also be used to more accurately assess traffic conditions. Such sensors may include sonar sensors for blind spot detection. A side traffic score can be calculated for each side of the vehicle as shown below in equation (5):

$$Sts = \text{time with vehicle detected}/\text{duration} \quad (5)$$

Where Sts is the side traffic score. If consistent traffic is detected on the side of the vehicle (e.g. Sts is greater than fifty percent) and there is high traffic detected ahead (e.g., Stf is greater than fifty percent), then the overall traffic score can be increased by using an addition factor (e.g., thirty percent), as shown in equation (6) below:

$$St = St + \text{factor} \quad (6)$$

Returning to the parameters of model 710, the model Timestamp may include the latest time and date when the model data was collected or updated. The Confidence may specify a confidence factor in the model, as generated by the model source.

The Source may specify where the model was generated. The source may identify a specific vehicle, driver behavior engine system, etc. The source, model type, and confidence may be used to determine how the driver behavior engine should utilize the model.

One of ordinary skill in the art will recognize that the data structure diagrams 600 and 700 are exemplary in nature and may be implemented in various different ways without departing from the scope of the disclosure. For instance, various elements may be removed and/or various other elements may be included. In addition, multiple elements may be combined into a single element and/or a single element may be divided into multiple elements.

II. Curve-Based Reporting and/or Analysis

Some embodiments use curve-based representation of various driver characteristics. Each such curve may be represented as a set of value points or equations. Storage and comparison among various curves may be performed by a common system component. Curves may be associated with paths, which are described in more detail in Section III below. Example curves are described in more detail in Section VI below. Each curve may include multiple sections. Each section may be defined by a set of direct values or expressed as parameterized equations. Some embodiments may include a curve comparator that is able to compare one or more curves to each other and return statistics related to the mathematical differences among the curves (e.g., minimum, maximum, average, etc.) as well as geometrical features of the difference.

Figure 8:
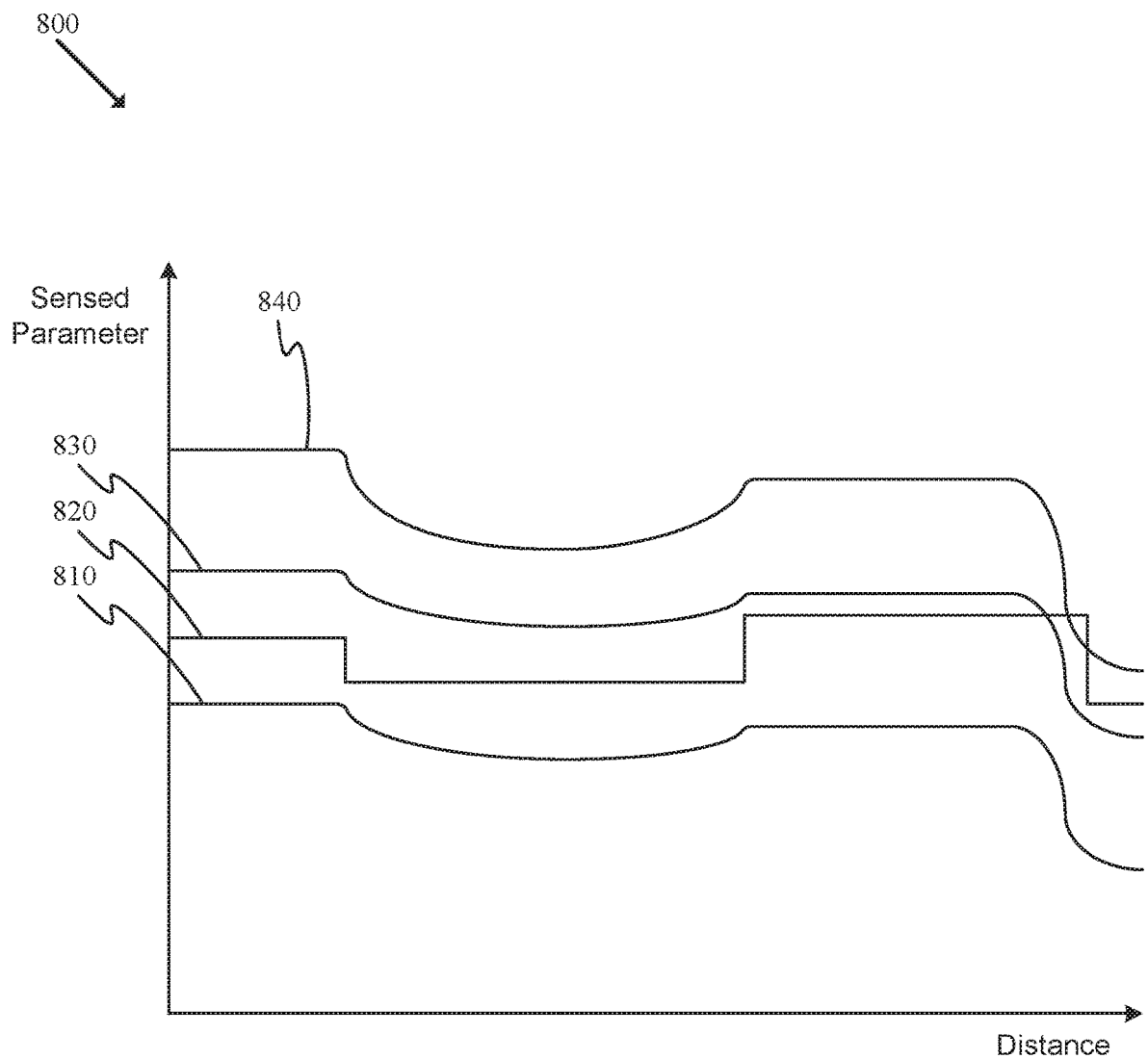
FIG. 8 illustrates an x-y plot with example performance evaluation curves according to some embodiments of the invention.

FIG. 8 illustrates an x-y plot 800 with example performance evaluation curves according to some embodiments of the invention. Specifically, this figure shows a set of reference curves that may be used to evaluate performance of a driver related to a specific sensed parameter. Such reference curves may be based on various factors such as posted, derived, average, or recommended speed attributes retrieved from a map database, vehicle characteristics, road curvature, intersections, traffic lights, and stop signs, weather conditions, slope, position of the accelerator control, learned dynamic model and/or other appropriate factors.

As shown in FIG. 8, the x-y plot may include an optimum curve 810, a speed limit curve 820, a warning level curve 830, and a critical warning level curve 840. In the x-y plot of FIG. 8, distance is represented by the x-axis, and a sensed parameter is represented by the y-axis.

The optimum curve 810 may represent an optimum level for various sensed parameters (e.g., speed, acceleration, braking, yaw rate, fuel efficiency, etc.). For instance, such an optimal curve may represent the speed at which fuel efficiency is maximized. The speed limit curve 820 may represent the actual speed limit for a driving path. The warning level curve 830 may represent a warning level for various sensed parameters. For instance, the warning level curve may indicate various unsafe levels of speed, acceleration, braking, yaw rate, etc. The warning level curve may indicate a bottom level of various unsafe driving behaviors.

The critical warning level curve 840 may represent a critical warning level for various sensed driving parameters. The critical warning level curve may indicate an upper level of various unsafe driving behaviors. For instance, the critical warning level curve may indicate a level of various sensed driving parameters at which a driver may lose control of a vehicle, fail to keep a vehicle in its current lane, fail to maintain a safe stopping distance between other vehicles, fail to maintain a safe turning speed, etc.

During operation, an actual behavior (driving) curve (not shown) may be generated (e.g., based on a measured parameter of the vehicle) and compared to one or more of the evaluation curves 810-840. Such comparison may result in identification and quantifications of various differences among the curves.

One of ordinary skill in the art will recognize that curves 810-840 are exemplary in nature and may be implemented and/or represented in various different ways without departing from the scope of the disclosure. For instance, various curves may have various parameters, limits, and/or other appropriate features. In addition, various other driving data may be utilized and/or included.

III. Path-Based Data and/or Analysis

Some embodiments may require accurate information regarding a current path and potential future path(s) of a vehicle. Thus, some embodiments provide a common and efficient way to represent such paths, while also reflecting probabilities associated with any future paths. Paths may be created for every deviation in a road network around a current position of the vehicle.

Figure 9:
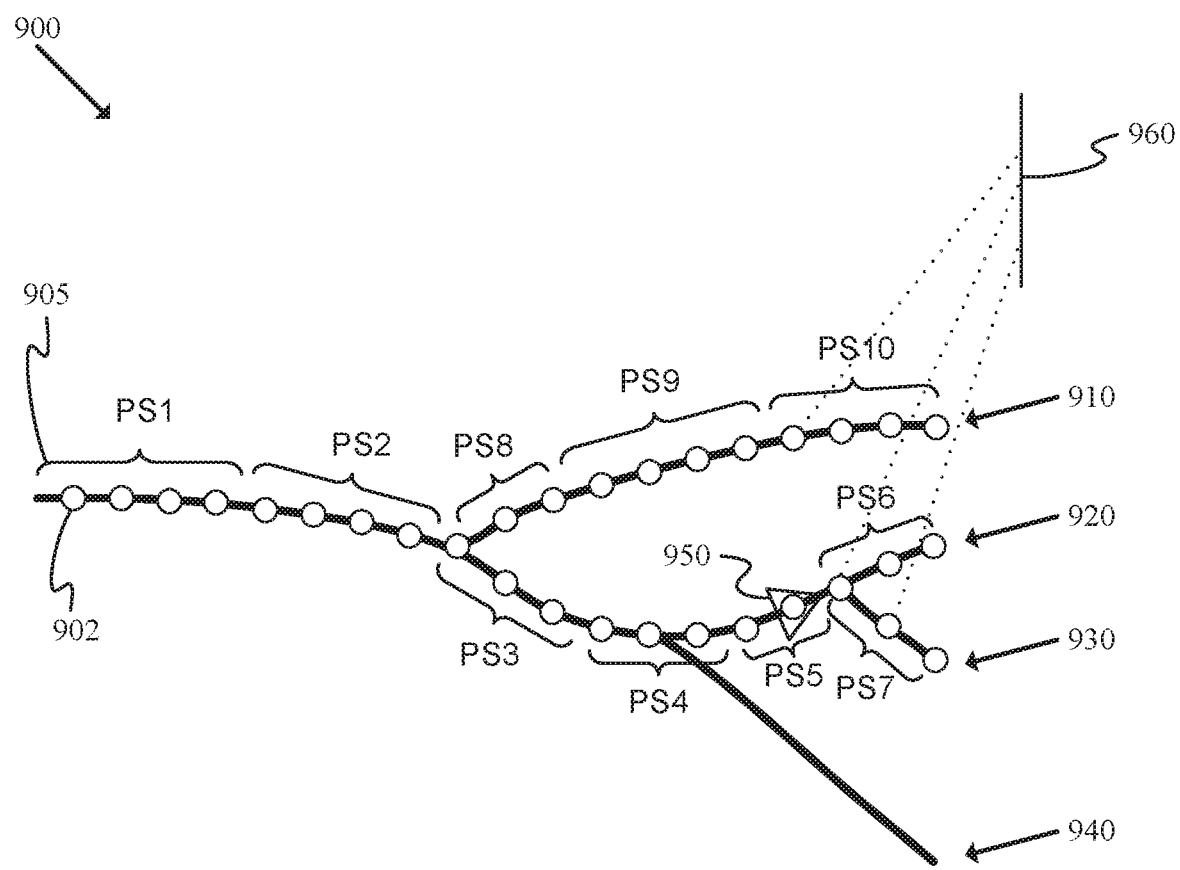
FIG. 9 illustrates an x-y plot with example vehicle paths according to some embodiments of the invention.

FIG. 9 illustrates an x-y plot 900 with example vehicle paths according to some embodiments of the invention. Specifically, this figure shows how a set of roadways (or waterways, or other navigable elements) may be defined as sets of points along the roadways. As shown, the plot includes multiple "points" 902, various "path sections" 905, several candidate paths 910-930, a non-candidate path 940, a current matched position 950, and possible future points 960, each with a different associated probability. In this diagram, paths are used to represent past vehicle positions and possible future positions.

Each path (e.g., each one of the example paths 910-940) represents a set of points 902 behind and ahead of the vehicle. Each path section 905 may include an associated set of points 902. In addition, each path (e.g., each one of the example paths 910-940) may include links to multiple path sections (e.g., a preceding section and multiple potential future sections). Common sections may be shared among paths. In some embodiments, each path section may include an equal number of points as each other path section. This allows for efficient storage in computer memory, because path sections may be shared among the paths and section objects may be quickly allocated and reused as the path sections are the same size. Paths may be generated for every deviation in a road network near the current vehicle position. For instance, a distinct path may be generated for each candidate path identified by a positioning engine. In addition, paths may be branched (i.e., new paths may be created) for upcoming roads that also have a high probability of being traveled over as determined by a path prediction engine. Certain vehicle paths may be dropped as the path prediction engine determines probabilities associated with various candidate paths decrease below a configurable threshold. At the end of a driving session, there may be one continuous path that represents the points 902 where the vehicle has driven.

In the example in FIG. 9, path 910 is the least probable path the vehicle may take, path 920 is the most probable path the vehicle may take, and path 930 is more probable than path 910, but less probable than path 920. The non-candidate path 940 is not included as a possible future driving path because the probability associated with the non-candidate path is below a threshold value due to a heading and location that is improbable based on the current vehicle position and heading. The vehicle's current matched position 950 may be determined by the positioning engine 225 based on information received from the vehicle sensor module 255 and map data access module 220. The possible future driving points 960 may be determined from the driver behavior engine 205, based on information received from the map data access module 220, positioning engine 225, path prediction engine 230, and vehicle sensor module 255.

Path 920 includes past driving points, current vehicle position 950, and future driving points. Path 930 is a future probable driving path that partially overlaps path 920. Path 910 is a probable driving path as determined from the driver behavior engine 205, based on information received from the map data access module 220, positioning engine 225, path prediction engine 230, and vehicle sensor module 255.

Driving points 902 may be grouped into various path sections 905. A vehicle path section may represent a fixed number of driving points 902 on the same map link. For any new link, a new path section 905 may be created. Also, if a maximum number of points 902 allowed per path section 905 is reached, a new path section may be created. A vehicle path may include multiple path sections, and different paths may share path sections between each other.

As illustrated in FIG. 9, for simplicity, path sections are limited to four points. Different paths may typically share many of the same points, which may allow minimization of memory usage and efficient processing. As shown, path 920 includes path sections PS1-PS6, path 930 includes path sections PS1-PS5, and PS7, and path 910 includes path sections PS1, PS2, PS8, PS9, and PS10. Section PS5 is incomplete with only two nodes because of the current matched position 950 of the vehicle, and the possible future points shown in sections PS6 and PS7. As the vehicle travels, new driving points may be added to the vehicle paths, which may result in points being added to the current path section and/or predicted path sections, and/or old driving points may be removed from the past path sections. If a given path section is full, a new section may be added. If the driver behavior engine 205 is used only for post-analysis the vehicle paths may not include any future driving points and sections.

One of ordinary skill in the art will recognize that the diagram 900 is exemplary in nature and may be implemented in various different ways without departing from the scope of the disclosure. For instance, different embodiments may include different numbers of points in each section, and/or different numbers of sections along each path. In addition, different embodiment may include different numbers of possible future paths depending on various relevant factors (e.g., features of the available roadway(s), driver history, etc.).

IV. Probabilistic Weighting of Events and Path Prediction

During operation, a vehicle may be presented with various different potential paths (e.g., a driver may leave one roadway to enter another roadway, a driver may change lanes along a roadway, etc.). Some embodiments may quantify the probability that any potential path will actually be followed. Such probabilities may be used to predict which potential path will be taken and/or to provide probabilistic weighting of potential events (e.g., a warning event).

Figure 10:
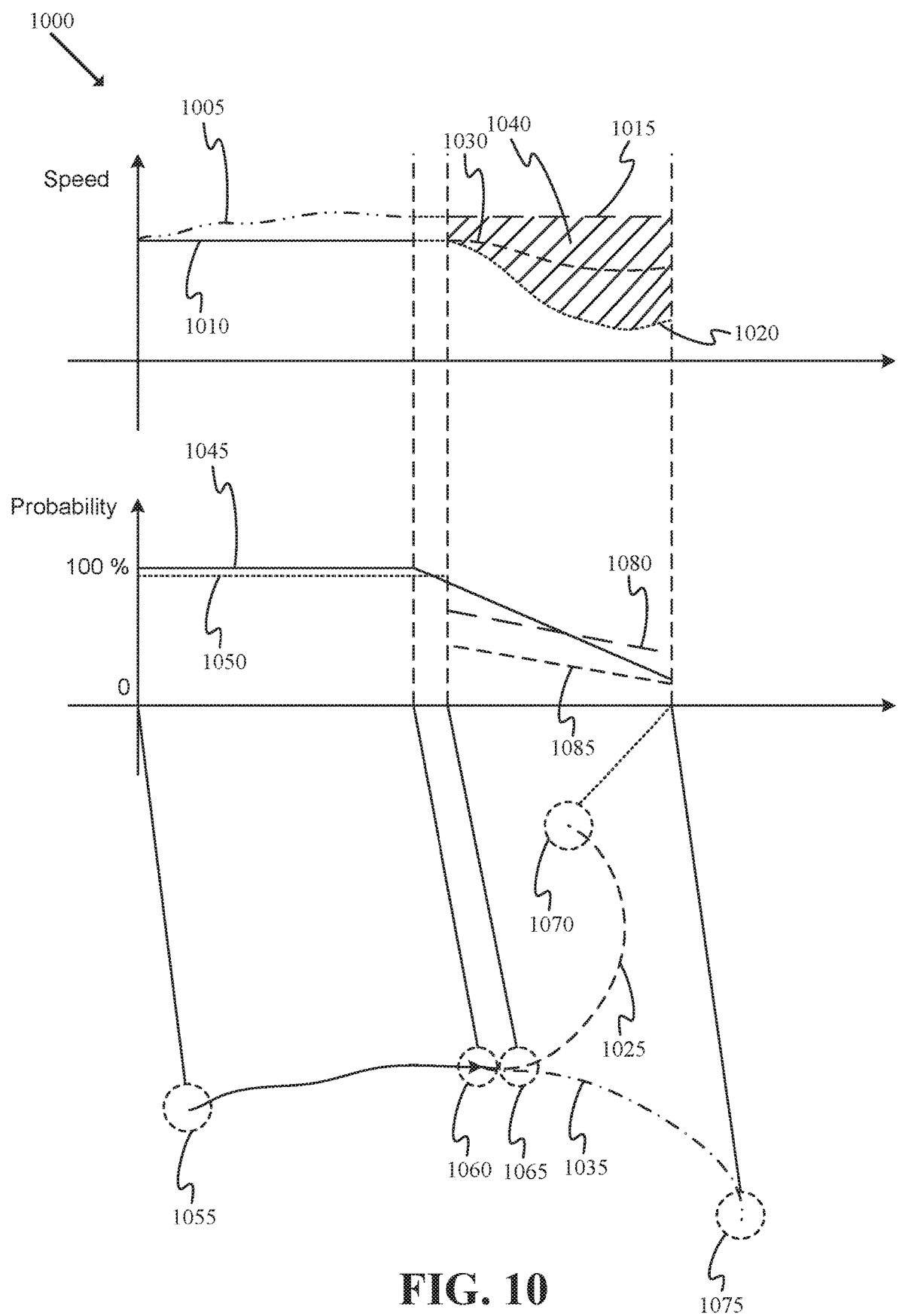
FIG. 10 illustrates an x-y plot with predicted paths and associated probability and speed curves provided by some embodiments of the invention.

FIG. 10 illustrates an x-y plot 1000 with predicted paths and associated probability and speed curves provided by some embodiments of the invention. Specifically, this figure shows how probabilistic weighting may be used to monitor and/or evaluate driver performance. As shown, the x-y plot includes an actual driving speed curve 1005, a safe speed curve 1010, a predicted driving speed curve 1015, a predicted safe speed curve 1020 for a first potential path 1025, a predicted safe speed curve 1030 for a second potential path 1035, an unsafe speed zone (area) 1040, a current speed probability curve 1045, a safe speed probability curve 1050, various points 1055-1075 along the potential driving paths 1025 and 1035, and predicted probability curve sections 1080 and 1085 associated with the potential paths 1025 and 1035, respectively.

The driving speed curve 1005 may indicate the actual speed of a vehicle. The data included in the actual speed curve may be measured by various appropriate elements (e.g., vehicle sensors 120). The safe speed curve 1010 may indicate a safe speed for a vehicle to travel based on the associated geographical location. The associated geographical location may be matched to road links, which may be retrieved from various appropriate components (e.g., map database 215 via positioning engine 225).

The predicted driving speed curve 1015 may indicate the predicted speed of a vehicle. The predicted driving speed curve may be at least partly based on various appropriate factors (e.g., current measured speed of the vehicle, acceleration/deceleration, map attributes, information received from various sensors, etc.). The predicted safe speed curve 1020 and the predicted safe speed curve 1030 may indicate predicted safe speeds for vehicles traveling on path 1025, and path 1035, respectively. The predicted safe speed curves for paths 1025 and 1035 may be determined at least partly based on vehicle characteristics, map attributes (including road curvatures, road inclines/declines, road tilt, road surface, etc.), posted speed limits, weather conditions, dynamic models associated with the road links and/or other appropriate factors.

The unsafe speed zone 1040 may indicate areas where the actual speed of the vehicle exceeds one or more safe speed thresholds defined by one or more safe speed curves (e.g., curves 1020 and 1030). The size of an unsafe speed zone (and/or any other characteristic that exceeds a threshold) may be determined and may be used to quantify various aspects of driver performance. For instance, an unsafe speed zone that is caused by a driver exceeding a threshold by a minimal amount for a long time (e.g., driving a few miles over a speed limit for an extended time) may be weighted less than an unsafe speed zone of the same size that is caused by a driver exceeding a threshold by a large amount for a short time (e.g., failing to recognize a stop sign at a reasonable distance and coming to a skidding stop past an associated stop line). The geometrical area between a safety curve and a behavior curve may indicate the severity of a driving event and based on the severity, the system may determine whether a warning signal should be issued. The severity of such a driving event may also be weighted with the probability of such occurrence when determining whether to issue a warning. For instance, a relatively high probability of a minor event (e.g., exceeding the speed limit by 2 mph) may not trigger a warning, while a relatively low probability of a major event (e.g., approaching a road with high curvature at high speed) may trigger a warning.

The current speed probability curve 1045 may indicate the probability of continuing to drive at the current speed based on one or more potential future paths of the vehicle (and/or other relevant factors). The current speed probability curve may be at least partly based on data received from various system elements (e.g., path prediction engine 230). For instance, one or more components may identify and retrieve possible paths from a map database (or data element) based on the current vehicle position. Such possible paths may be identified to a set distance (e.g., a default distance, a user-defined distance, a dynamically-calculated distance, and/or otherwise appropriately determined distance). The safe speed probability curve 1050 may indicate probabilities of driving at a safe speed depending on the potential paths a vehicle may take (and/or the probability associated with each path).

The various points 1055-1075 along the driving paths 1025 and 1035 may correlate with actual physical locations along a roadway, and associated with points along the actual speed curve 1005, safe speed curve 1010, predicted speed curve 1015, predicted safe speed curves 1020 and 1030, current speed probability curve 1045, and safe speed probability curve 1050. In this example, point 1055 represents a past position of the vehicle. Information related to this past position (e.g., vehicle speed, safe speed, etc.) may be used to determine various future characteristics of the vehicle (e.g., potential path probability, safe speed, etc.). Point 1060 represents a current position of the vehicle. Thus, vehicle characteristics such as actual speed are known up to point 1060 at least as far back as point 1055. Point 1065 represents a divergence to two potential paths 1025 and 1035. Such a point may be, for instance, an intersection, off-ramp, onramp, and/or other appropriate point where multiple future paths may be available. Points 1070 and 1075 represent potential future positions of the vehicle, depending on which path 1025 or 1035 the vehicle takes. The various potential future positions may be on different roadways, may be along different directions on the same roadway, and/or may otherwise include various potential locations available to the vehicle.

During operation, some embodiments may continuously and/or periodically evaluate multiple possible map paths based at least partly on the current vehicle position. As shown in the example in FIG. 10, there could be two potential paths 1025 and 1035 that a vehicle may travel. Each path may have an associated probability that may be determined based on the current vehicle position, information received from various vehicle sensors, and/or other relevant factors. For example, one or more vehicle sensors may determine that the driver of the vehicle has activated a left turn indicator, which may result in a determination of a higher probability of turning left than right. As another example, a vehicle may follow a route from a navigation system, which may result in a determination of a higher probability of taking a path which is along the route provided by the navigation system. As another example, the path prediction engine may use the knowledge of the current lane the vehicle is on to determine the probability of turning right or left.

One of ordinary skill in the art will recognize that the diagram 1000 is exemplary in nature and may be implemented in various different ways without departing from the scope of the disclosure. For instance, various parameters may be removed and/or various other parameters may be included. Furthermore, various other driving data may be utilized and/or included.

V. Methods of Operation

Figure 11:
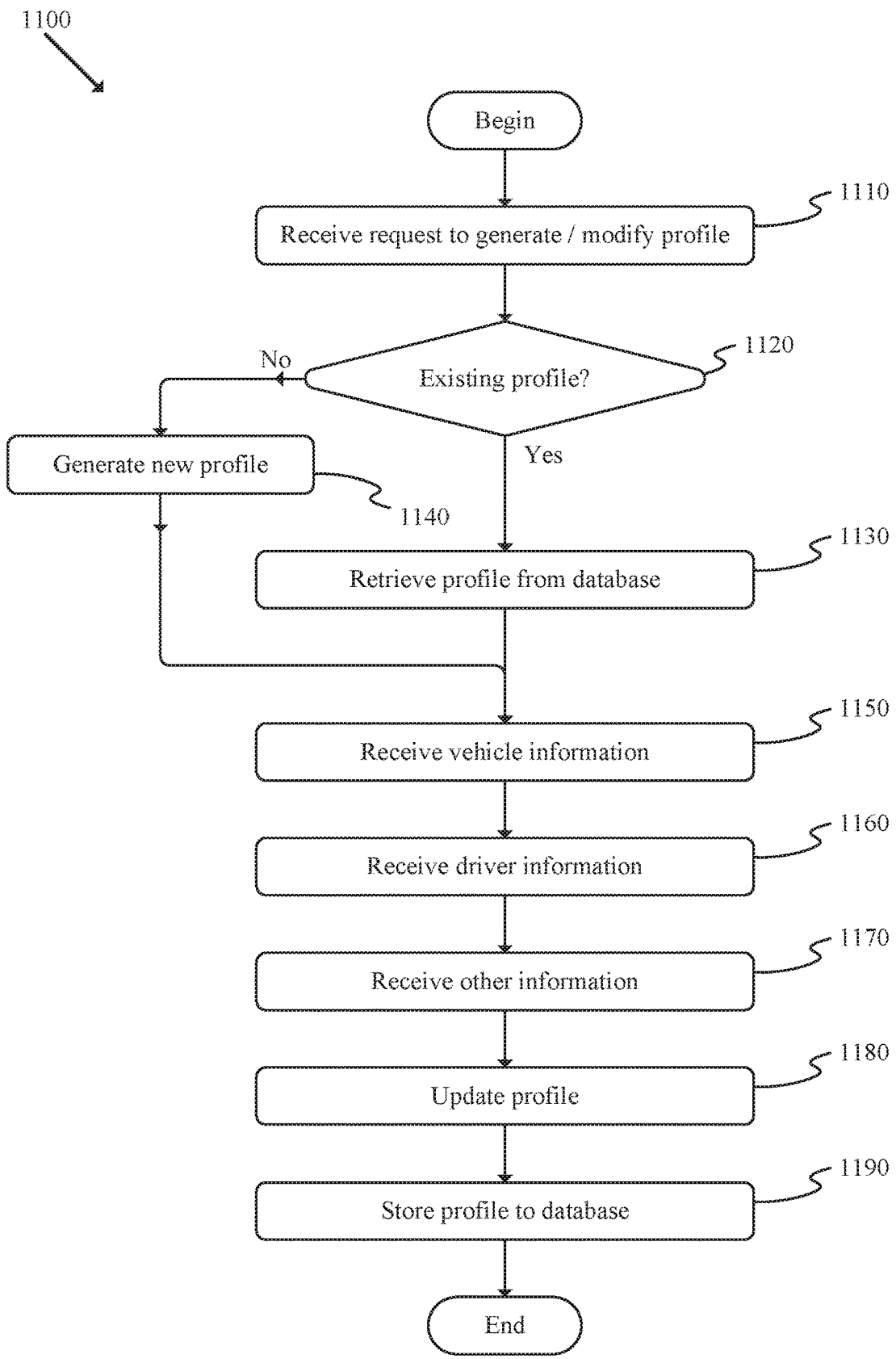
FIG. 11 illustrates a flow chart of an exemplary process used by some embodiments of the invention to generate and/or modify a profile.

FIG. 11 illustrates a flow chart of an exemplary process 1100 used by some embodiments of the invention to generate and/or modify a profile. The process may begin, for instance, when a user first configures the system, when a new driver is added to an existing vehicle, when a new vehicle is associated with an existing driver, and/or at other appropriate times.

Next, the process may receive (at 1110) a request to generate and/or modify a profile. Such a request may be received in various appropriate ways (e.g., a user may make a selection using a user interface, may update data associated with a system, etc.). Such a profile may include information about one or more vehicles, one or more drivers, and/or various driving applications. The process may then determine (at 1120) whether or not there is an existing profile. Such a determination may be made by retrieving data from a profile database of some embodiments. If the process determines (at 1120) that a profile already exists, the process may then retrieve (at 1130) the profile from the database. If the process determines (at 1120) that the requested profile does not exist, the process may generate (at 1140) a new profile.

After either retrieving (at 1130) the profile from the profile database, or generating (at 1140) a new profile, process 1100 may then receive (at 1150) vehicle information. Such information may include the vehicle type and various vehicle characteristics such as vehicle size, vehicle dimensions, turning radius, engine power, vehicle handling, braking power, tire type, etc. The process may then receive (at 1160) driver information. Such information may include driver age, driver size and weight, driving skills, previous driving events, etc. Next, the process may receive (at 1170) any other appropriate information. The information may be received at 1150-1170 in various appropriate ways (e.g., a user may enter data into a user interface, a file having a particular format may be uploaded to a server or database, etc.).

Process 1100 may then update (at 1180) the profile with the received information. The process may then store (at 1190) the profile to a database. After storing (at 1190) the profile to the database, the process may end.

One of ordinary skill in the art will recognize that process 1100 is exemplary in nature and may be implemented in various different ways without departing from the scope of the disclosure. For instance, the operations may be performed in different orders. As another example, various operations may be omitted and/or other operations may be included. Furthermore, the process may be executed as part of a larger macro-process, and/or divided into multiple sub-processes. Moreover, the process may be executed continuously, at regular intervals, based on certain criteria, and/or in other appropriate ways.

Figure 12:
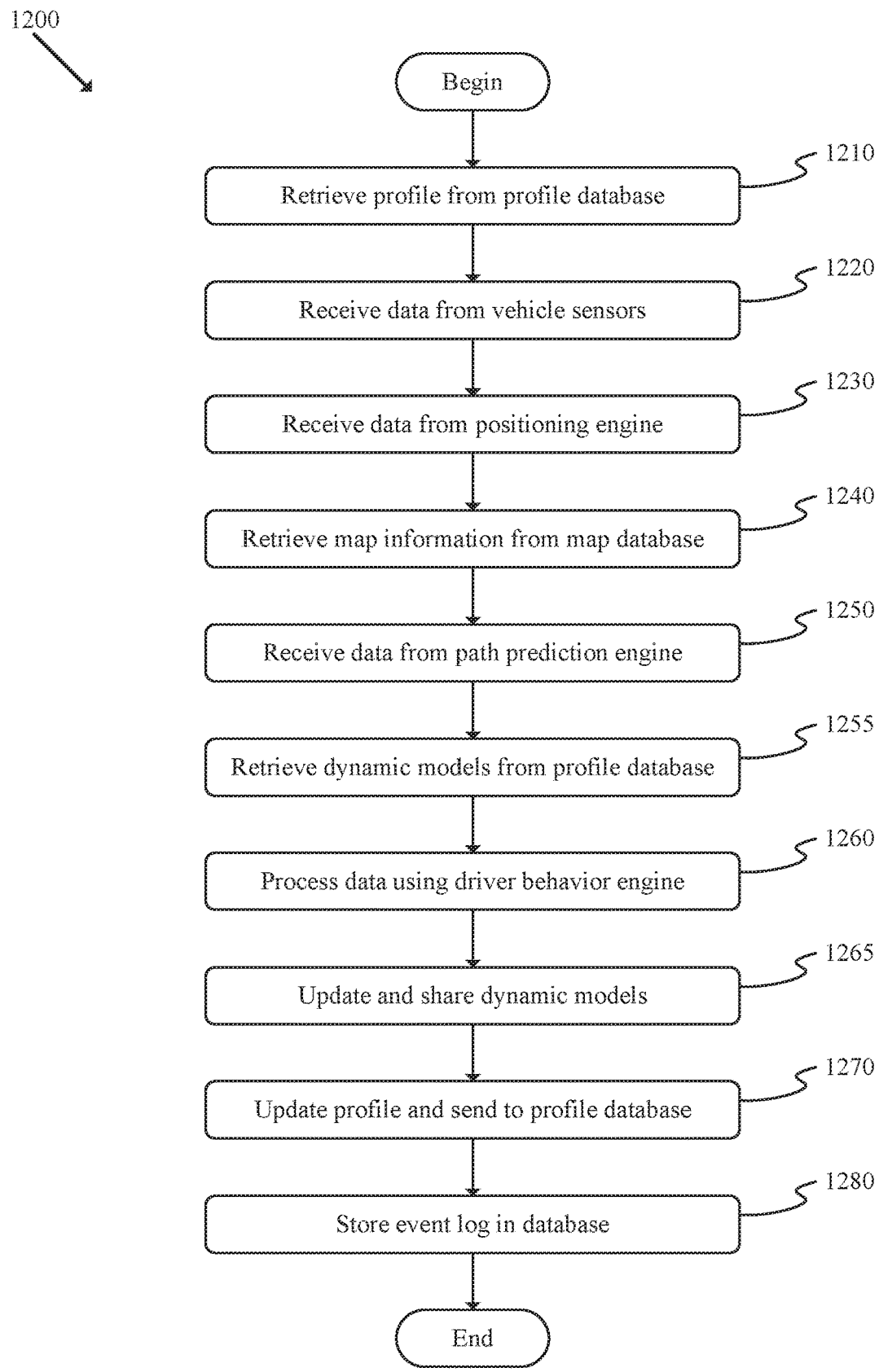
FIG. 12 illustrates a flow chart of an exemplary process used by some embodiments of the invention to collect and store data during vehicle operation.

FIG. 12 illustrates a flow chart of an exemplary process 1200 used by some embodiments of the invention to collect and store data during vehicle operation. The process may begin, for instance, when a vehicle with a driver behavior engine is turned on.

The process may then retrieve (at 1210) a profile from a profile database. Such a profile may include information about the vehicle, user, and/or the driving application (e.g., commuting, travel, commercial delivery, etc.). Next, process 1200 may receive (at 1220) data from various vehicle sensors. Such data may include speed, acceleration, yaw rate, etc. The process may then receive (at 1230) data from a positioning engine. Such data may include a vehicle position along a path and a list of potential paths associated with the current position. Such data may be at least partly based on the vehicle sensor data (e.g., GPS data) received at 1220. The process may then retrieve (at 1240) map information from a map database. Such map information may be at least partly based on the vehicle sensor data received at 1220 and/or the data received at 1230 from the positioning engine. Next, the process may receive (at 1250) data from a path prediction engine. Such data may include a probability associated with each potential path. Next, the process may retrieve (at 1255) dynamic models associated with the map segments (links) along the current and predicted future paths.

Process 1200 may then process (at 1260) the retrieved and/or received data using a driver behavior engine (and/or other appropriate system components). Such processing may include comparing the data to various thresholds (e.g., speed limits, safe operating speeds, etc.), evaluating the data relative to an optimal performance standard (e.g., determining deviations from a speed curve associated with optimal gas mileage), and/or other appropriate processing (e.g., data smoothing and/or filtering, gain adjustments, etc.).

The process may then generate (at 1265) example dynamic models based on the latest sensor data, store them in the profile database and optionally send them to the sharing module 265.

Next, the process may update (at 1270) the profile and send the updated profile to the profile database. The process may then store (at 1280) an event log in an event log database. The event log may include data related to driving events and driving characteristics such as position, speed, acceleration, yaw rate, etc. Such an event log may include sets of data points associated with particular positions, increments of time, etc. After storing (at 1280) the event log in the database, the process may end.

One of ordinary skill in the art will recognize that process 1200 is exemplary in nature and may be implemented in various different ways without departing from the scope of the disclosure. For instance, the operations may be performed in different orders. As another example, various operations may be omitted and/or other operations may be included. Furthermore, the process may be executed as part of a larger macro-process, and/or divided into multiple sub-processes. Moreover, the process may be executed continuously, at regular intervals, based on certain criteria, and/or in other appropriate ways.

Figure 13:
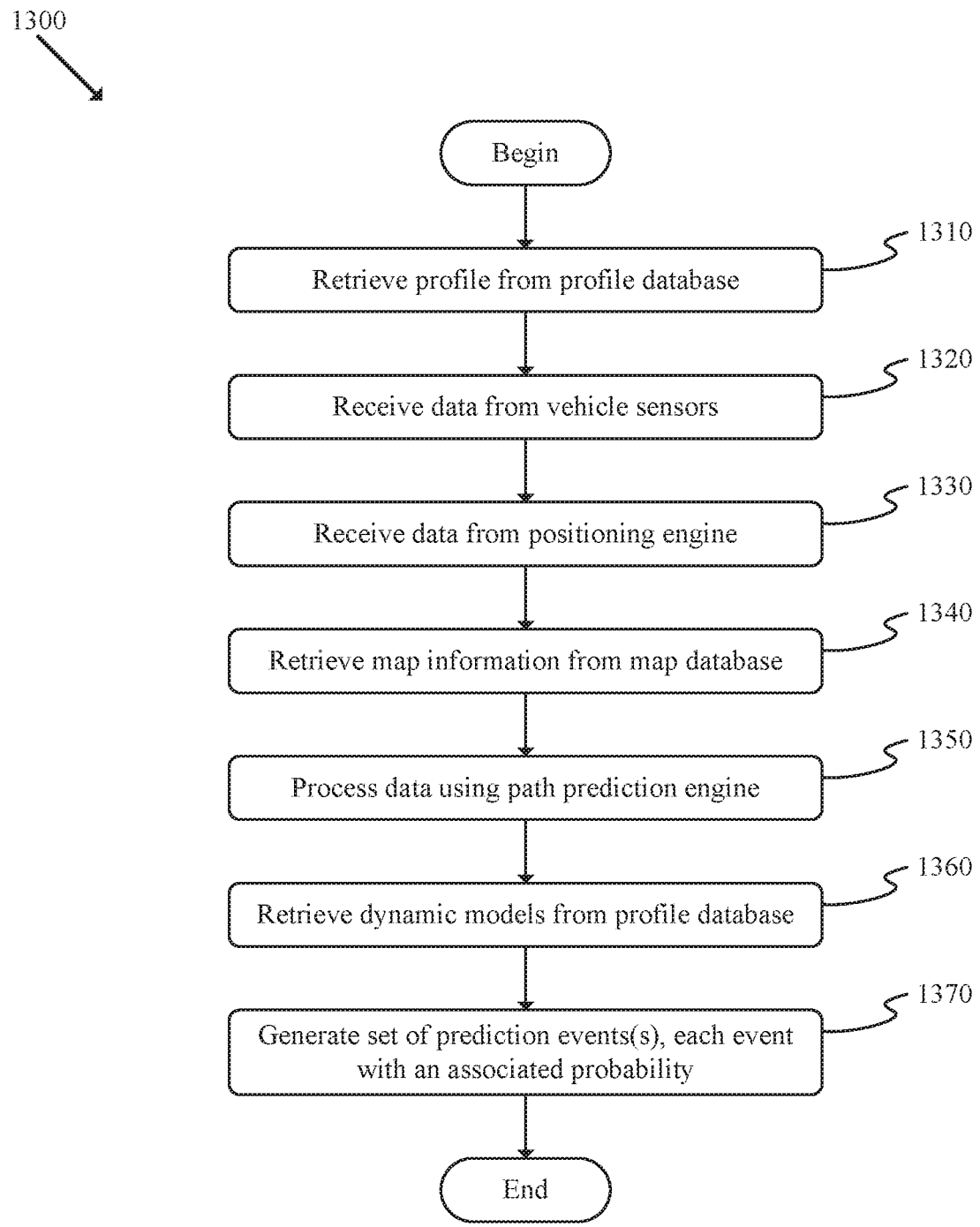
FIG. 13 illustrates a flow chart of an exemplary process used by some embodiments of the invention to generate a set of prediction events with associated probabilities.

FIG. 13 illustrates a flow chart of an exemplary process 1300 used by some embodiments of the invention to generate a set of prediction events with associated probabilities. The process may begin, for instance, when a vehicle with a driver behavior engine of some embodiments is turned on.

The process may then retrieve (at 1310) a profile from a profile database. Such a profile may include information about one or more vehicles, users, and/or driving applications. Process 1300 may then receive (at 1320) data from vehicle sensors. Such data may include speed, acceleration, yaw rate, etc. The process may then receive (at 1330) data from a positioning engine. Such data may include a vehicle's position on a road and may be based at least partly on the data received from one or more vehicle sensors. Next, the process may retrieve (at 1340) map information from a map database. The retrieved information may be at least partly based on data received from the vehicle sensors and/or from the positioning engine. Next, the process may process (at 1350) data using a path prediction engine to determine various prediction data. Such prediction data may include probabilities associated with different potential paths, probabilities of different driver behaviors, and/or other predicted data and may be based at least partly on the retrieved map information, received vehicle sensor data, and/or data received from the positioning engine. Next, the process may retrieve (at 1360) dynamic models associated with the map segments (links) along the current and predicted future paths.

Process 1300 may then generate (at 1370) a set of prediction events, with each event having an associated probability. Such events may include data related to predicted paths, speeds, potential collisions, unsafe driving maneuvers, etc. After generating (at 1370) the set of prediction events, the process may end.

One of ordinary skill in the art will recognize that process 1300 is exemplary in nature and may be implemented in various different ways without departing from the scope of the disclosure. For instance, the operations may be performed in different orders. As another example, various operations may be omitted and/or other operations may be included. Furthermore, the process may be executed as part of a larger macro-process, and/or divided into multiple sub-processes. Moreover, the process may be executed continuously, at regular intervals, based on certain criteria, and/or in other appropriate ways.

Figure 14:
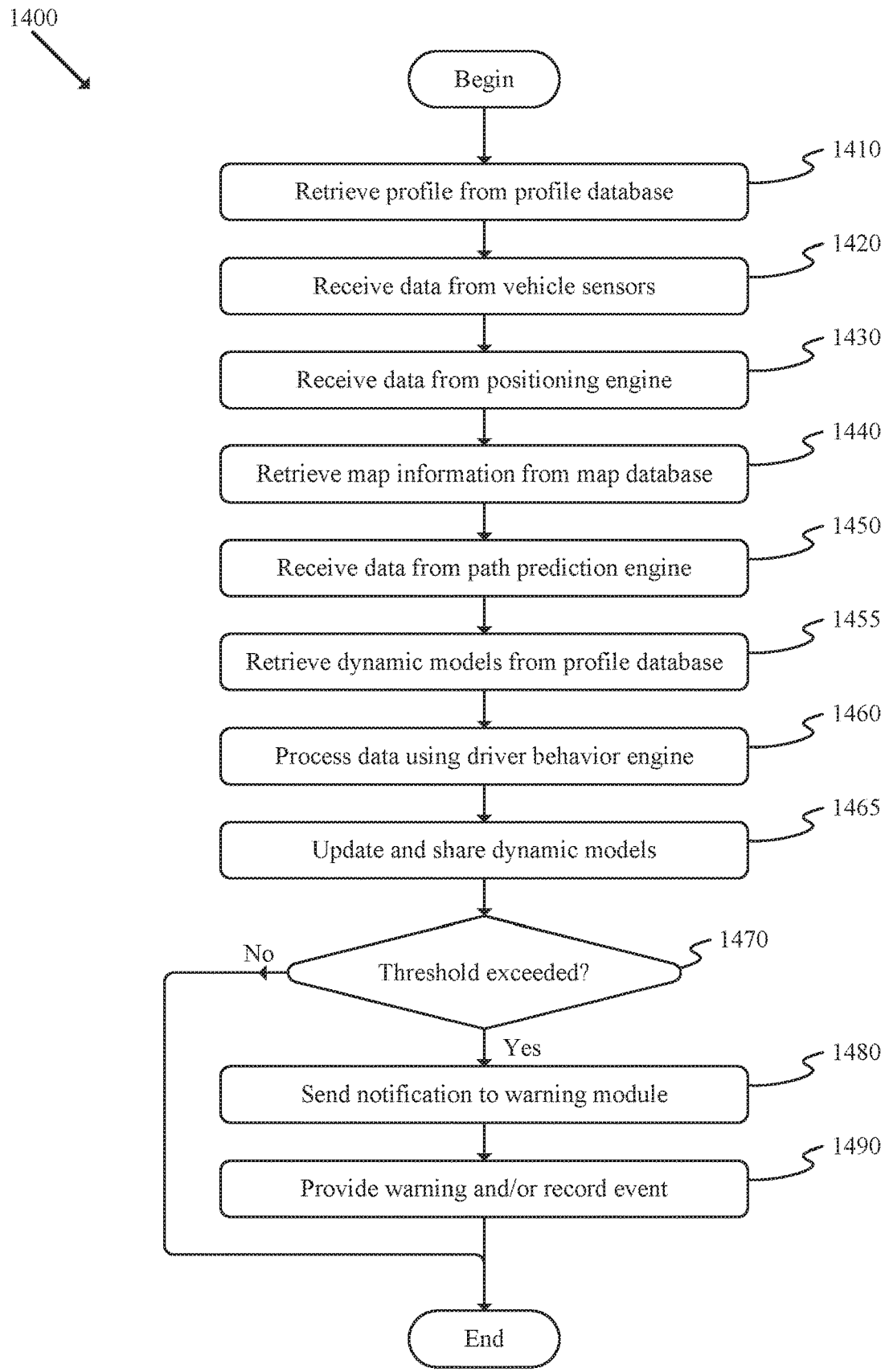
FIG. 14 illustrates a flow chart of an exemplary process used by some embodiments of the invention to provide a warning.

FIG. 14 illustrates a flow chart of an exemplary process 1400 used by some embodiments of the invention to provide a warning. The process may begin, for instance, when a vehicle with a driver behavior engine is turned on.

The process may then retrieve (at 1410) a profile from a profile database. Such a profile may include information about one or more vehicles, users, and/or driving applications. Process 1400 may then receive (at 1420) data from various vehicle sensors. Such data may include speed, acceleration, yaw rate, etc. Next, the process may receive (at 1430) data from a positioning engine. Such data may include a geographic position of the vehicle and may be based at least partly on the data received from the vehicle sensors.

The process may then retrieve (at 1440) map information from a map database. Such map information may be retrieved at least partly based on the relevance of the information to the geographic position of the vehicle and/or data received from the vehicle sensors. Next, the process may receive (at 1450) data from a path prediction engine. Such data may include probabilities of taking different paths, and probabilities of different driver behaviors. The process may then retrieve (at 1455) dynamic models associated with the map segments (links) along the current and predicted future paths.

Process 1400 may then process (at 1460) the received and/or retrieved data using a driver behavior engine. Such processing may include generation of behavior curves, predicted speed curves, actual speed curves, and/or any other appropriate data elements. Next, the process may generate (at 1465) example dynamic models based on the latest sensor data, store them in the profile database and optionally send them to the sharing module 265.

The process may then determine (at 1470) whether a threshold has been exceeded. Such a threshold may be associated with various appropriate elements (e.g., an optimum speed curve, a speed limit curve, an unsafe speed curve, a critical speed curve, etc.) based on various appropriate parameters (e.g., speed, acceleration, etc.). The determination of whether a threshold has been exceeded may be based on various mathematical comparisons between the received and/or retrieved data and a set of thresholds that may be associated with the retrieved profile.

If the process determines (at 1470) that a threshold has been exceeded, the process may then send (at 1480) a notification to a warning module. Next, the process may provide (at 1490) a warning to an operator of the vehicle (e.g., by sounding an alarm, activating a display element, etc.) and/or record (at 1490) the warning event to a server. After providing and/or recording (at 1490) the warning event, or after determining (at 1470) that a threshold has not been exceeded, the process may end.

One of ordinary skill in the art will recognize that process 1400 is exemplary in nature and may be implemented in various different ways without departing from the scope of the disclosure. For instance, the operations may be performed in different orders. As another example, various operations may be omitted and/or other operations may be included. Furthermore, the process may be executed as part of a larger macro-process, and/or divided into multiple sub-processes. Moreover, the process may be executed continuously, at regular intervals, based on certain criteria, and/or in other appropriate ways.

Figure 15:
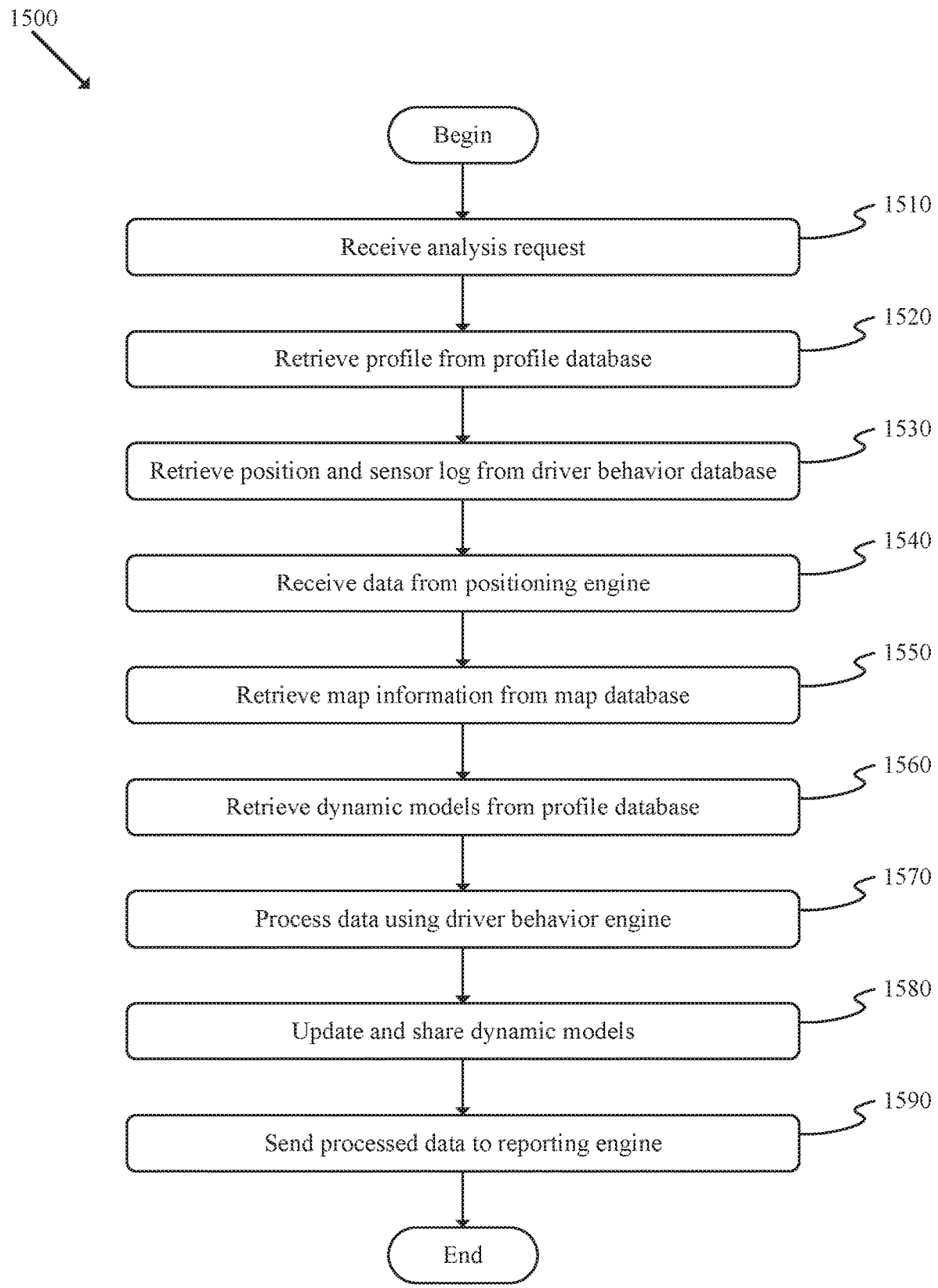
FIG. 15 illustrates a flow chart of an exemplary process used by some embodiments of the invention to allow offline analysis of driver behavior.

FIG. 15 illustrates a flow chart of an exemplary process 1500 used by some embodiments of the invention to allow offline analysis of driver behavior. The process may begin, for instance, when a user accesses a server of some embodiments (e.g., when a user launches an analysis application of some embodiments). Such a user may be a driver evaluating her own performance, a parent evaluating the performance of a teenage driver, a manager evaluating the performance of one or more drivers in a fleet of vehicles, an electronic entity capable of communicating with the system of some embodiments, and/or other appropriate entities.

The process may then receive (at 1510) an analysis request. Such a request may be received in various appropriate ways (e.g., from a user interface module, as sets of data and/or instructions that are able to be interpreted by the server and/or application, web services request, etc.). Next, the process may retrieve (at 1520) a profile from a profile database. Such a profile may include information about one or more vehicles, users, and/or driving applications that may be analyzed. Process 1500 may then retrieve (at 1530) position and sensor log data from a driver behavior database. Such log data may include information such as vehicle position, sensor readings, etc., where the data elements are associated with various points along a path of the vehicle.

Next, the process may receive (at 1540) data from a positioning engine. Such data may include a vehicle's position. The process may then retrieve (at 1550) map information from a map database. Such map information may be associated with the received position information (e.g., sections of a map that are within a particular radius of the position of the vehicle, as determined by the positioning engine, may be retrieved). The process may then retrieve (at 1560) dynamic models associated with the map segments (links) along the current path.

Process 1500 may then process (at 1570) data using a driver behavior engine. Next, the process may generate (at 1580) example dynamic models based on the input and output data. The process may then send (at 1590) the processed data to a reporting engine such that it is made available to the user analyzing the driver behavior. After the process sends (at 1590) processed data to the reporting engine, the process may end.

One of ordinary skill in the art will recognize that process 1500 is exemplary in nature and may be implemented in various different ways without departing from the scope of the disclosure. For instance, the operations may be performed in different orders. As another example, various operations may be omitted and/or other operations may be included. Furthermore, the process may be executed as part of a larger macro-process, and/or divided into multiple sub-processes. Moreover, the process may be executed continuously, at regular intervals, based on certain criteria, and/or in other appropriate ways.

Figure 16:
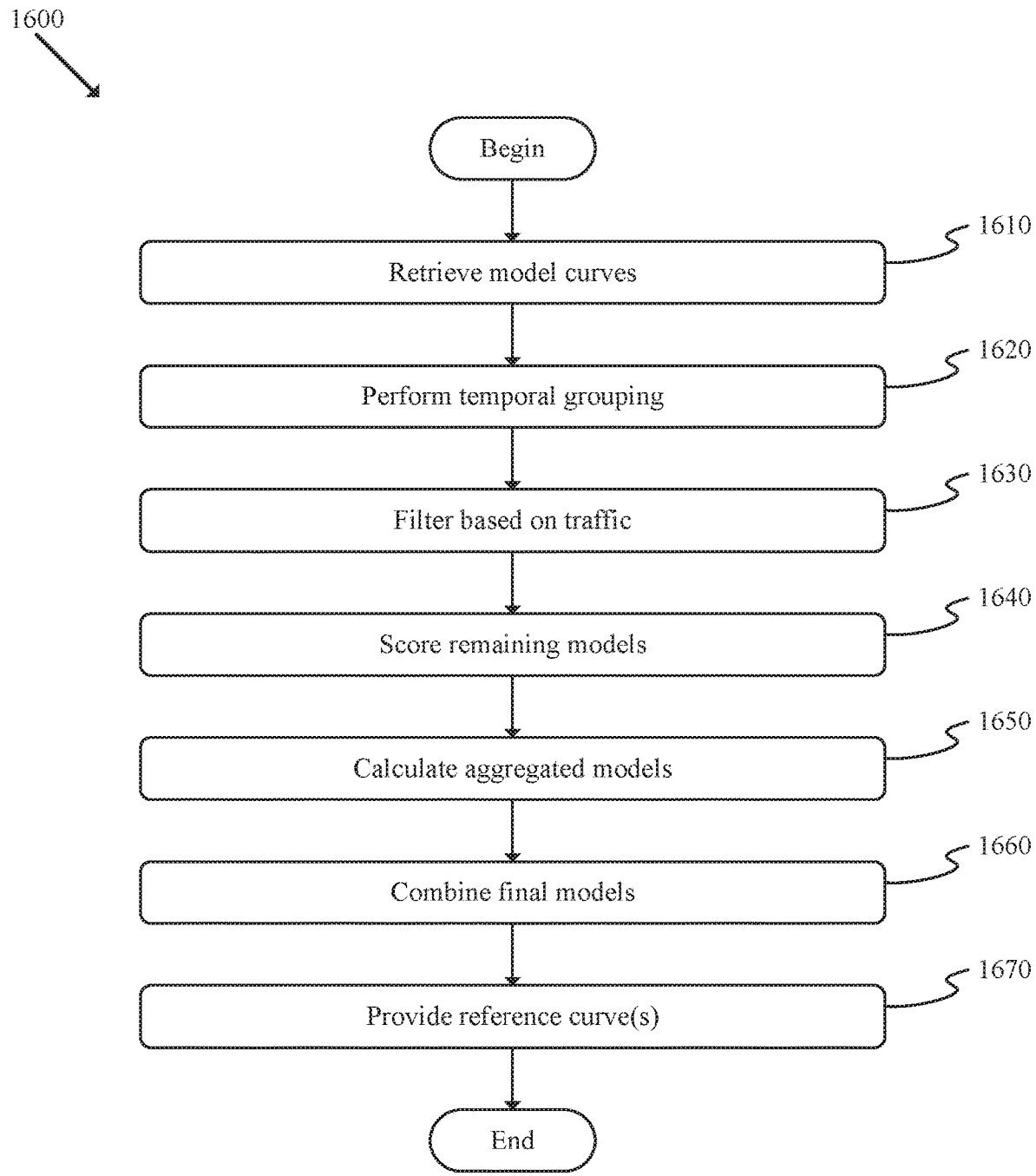
FIG. 16 illustrates a flow chart of an exemplary process used by some embodiments of the invention to generate dynamic reference curves.

FIG. 16 illustrates a flow chart of an exemplary process 1600 used by some embodiments of the invention to generate dynamic reference curves (models). Such a process may be performed by a resource such as driver behavior engine 130, server 190, other appropriate devices or systems, and/or a combination of such devices and/or systems. Specifically, the process may be performed by a resource such as aggregation module 470 at the back-end or learning module 260 at the vehicle. The process may begin, for instance, when a driver behavior engine application is launched, when a vehicle or navigation device is powered on, and/or under other appropriate circumstances. In addition to the machine learning approach described below, some embodiments may include feedback from human users, experts, etc. Such feedback may include review and scoring of models.

As shown, process 1600 may retrieve (at 1610) model curves. Such curves may be retrieved from a resource such as storage 140 or a storage associated with server 190. The curves may include data elements similar to those described above in reference to data structure diagrams 600 and 700.

Next, the process may perform (at 1620) temporal grouping. The easiest way to generate model curves is to take all example models and aggregate them together by averaging and weighting them. However, this might produce inaccurate overall model where different driving patterns based on time of day or day of week will be aggregated together. The system may calculate an overly conservative speed limit because a model was trained using data from rush hour. To avoid such inaccuracy, the algorithm may combine the models into time and/or day groups and find the average curve that best represents the example curves for that slot when calculating an aggregate model as described below. The grouping may be done for every hour or every two hours of the day and for every day of the week (and/or other appropriate intervals, specific dates, etc.). These aggregated curves may be analyzed and combined into a common model and the outliers may be represented as separate models with corresponding time restriction parameters set in the final model.

The process may then filter (at 1630) the available curves based on traffic. Such filtering may utilize a traffic score that is calculated as described above. For example, some embodiments may filter out example models that have a traffic score above a certain threshold (e.g., fifty percent). This way, examples that are collected during heavy traffic can be excluded, such that the heavy traffic examples don't distort the overall reference model.

Another option is to generate separate example groups of curves for medium and high-traffic conditions. For each of those groups an aggregate curve can be created. Such reference curves then may include a corresponding traffic score parameter that reflects the traffic conditions for which the model is applicable. As a result, the driver behavior engine may detect the current traffic condition and apply the correct model accordingly.

Process 1600 may then score (at 1640) the remaining models. Before the models may be aggregated, the models may be scored such that each model has a weight that may be used during aggregation. Depending on the type of reference curve, the scoring may be performed using various different algorithms. Several examples of such algorithms are presented below.

For fuel efficiency reference curves, the model may be scored based on measured fuel efficiency from the vehicle. To be able to compare examples from different vehicle types, the fuel efficiency may be normalized to a percentage value using official fuel efficiency (e.g. as defined by the car manufacturer or official agency) and then normalized to one hundred percent using equation (7) below:

$$Se = (FEm/Fen) \qquad (7)$$

Where FEm is the measured fuel efficiency and FEn—is the nominal fuel efficiency (as defined by the vehicle manufacturer or official agency). The resulting calculated efficiency score may be greater than one hundred percent.

For safety scoring, determining a safety score for an example model is more difficult as there is no clear measurement of how "safe" a given curve is. One possible way to calculate the safety score for a given model may use equations (8) and (9) below:

$$Ss = SDa*Wd + SDi*Wi + Cs*Wc \quad (8)$$

$$Wd + Wi + Wc = 1 \quad (9)$$

Where: SDa is the aggregated driver score. Curves generated by "good" drivers can be considered good. The driver score may be obtained from the driver behavior engine modules, as described below in more detail. Wd is the weight factor for the driver score, having a default value of three tenths or thirty percent.

SDi is the instant driver score. This score reflects if there are any "negative" events detected during the collection of the curve values. A value of zero may indicate that at least one critical driving event has occurred. Wi is the weight for the instant driver score. The default value may be four tenths or forty percent.

Cs is the clustering score. Wc is the clustering score weight. The default value may be three tenths or thirty percent. The clustering score may indicate how different the current curve is from the other curves in the example group. Clustering score may be calculated by first determining the average curve of all curves (by averaging all the points) and then calculating the area difference (Ad) between the current curve and the average curve. The score, Cs, may be calculated using the calculated area and dividing it by the maximum difference area (Am) from example group, as shown in equation (10) below:

$$Cs = Ad/Am \quad (10)$$

For driver safety scoring, the driver behavior engine may compare the measured driver behavior curves to the reference curves and, depending on the area difference, calculate a score in relation to the static curve models. The driver behavior engine may calculate an instant score for each map segment as the vehicle is traversing the segment. The instant score may be based on the amount by which the actual driving curve exceeds the reference safety curves. The algorithm may also monitor for significant safety related events. Events such as airbag deployment, crash detection, or sudden braking could set the instant score to zero and lower the overall score.

After scoring (at 1640) the models, process 1600 may calculate (at 1650) aggregated models. Once there is a set of example models (or curves) the models may be aggregated into a single curve model. The aggregation process may use weighted averaging of the points from each curve. Such a calculation may involve, taking each point in the curve, retrieving the corresponding points from all other curves (e.g., points with the same X-coordinate value), and calculating the weighted arithmetic mean using equation (11) below:

$$\bar{x} = \Sigma w_i x_i / \Sigma w_i \text{ (for } i=1 \text{ to } n\text{)} \quad (11)$$

Where $w_i$ is the weight of the curve and is the value of the curve score obtained by the model scoring performed at operation 1640. The calculated point may be stored as the new point of the model for the given value of X. The calculation may be repeated for each point in the curve.

As part of the aggregation process, the algorithm may calculate a confidence score. The score may reflect how different the average curve is from all the example curves, especially those with a high score. In other words, the closer the final curve it is to most curves with high scores, the higher the confidence in the model should be, as determined using equation (12) below:

$$Sc = \Sigma(Ad_i/Am)/n(\text{for } i \text{ where } w_i > W_t) \quad (12)$$

The process may calculate the area differences ($Ad_i$) from the average curve for all curves (n) whose score is above a threshold value ($W_t$), which could be set to a value of one half or fifty percent. The process may find the maximum area (Am) and calculate the score using equation (12).

Some embodiments may penalize the score if the number of high confidence example is low. For instance, if n is less than a threshold number of examples (e.g., five), equation (13) below may be used to penalize the score:

$$Sc = Sc*Ple \quad (13)$$

Where Ple is the penalty factor for a low number of examples. In some embodiments, Ple may be seven tenths or seventy percent.

After calculating (at 1650) the aggregated models for the various groups of example models, process 1600 may combine (at 1660) the aggregated models into final models. For example, models for various time slots may be combined as they should be similar for most of the cases. The fewer models there are for a given map segment, the less memory is required for storage, processing usage is reduced, and less bandwidth may be used to transfer the models. Combining the models may be done by using clustering algorithms such as k-nearest neighbor. Another approach is to use a process such as process 1700 described below.

Finally, the process may provide (at 1670) the combined reference curve(s) and then may end. Provision of the reference models may include delivering the curves to the driver behavior engine (or sub-module thereof) for use in evaluating driver behavior. In some embodiments, the reference models may be generated by the back-end server and sent to a vehicle-based driver behavior engine system.

One of ordinary skill in the art will recognize that process 1600 is exemplary in nature and may be implemented in various different ways without departing from the scope of the disclosure. For instance, the operations may be performed in different orders. As another example, various operations may be omitted and/or other operations may be included. Furthermore, the process may be executed as part of a larger macro-process, and/or divided into multiple sub-processes. Moreover, the process may be executed continuously, at regular intervals, based on certain criteria, and/or in other appropriate ways.

Figure 17:
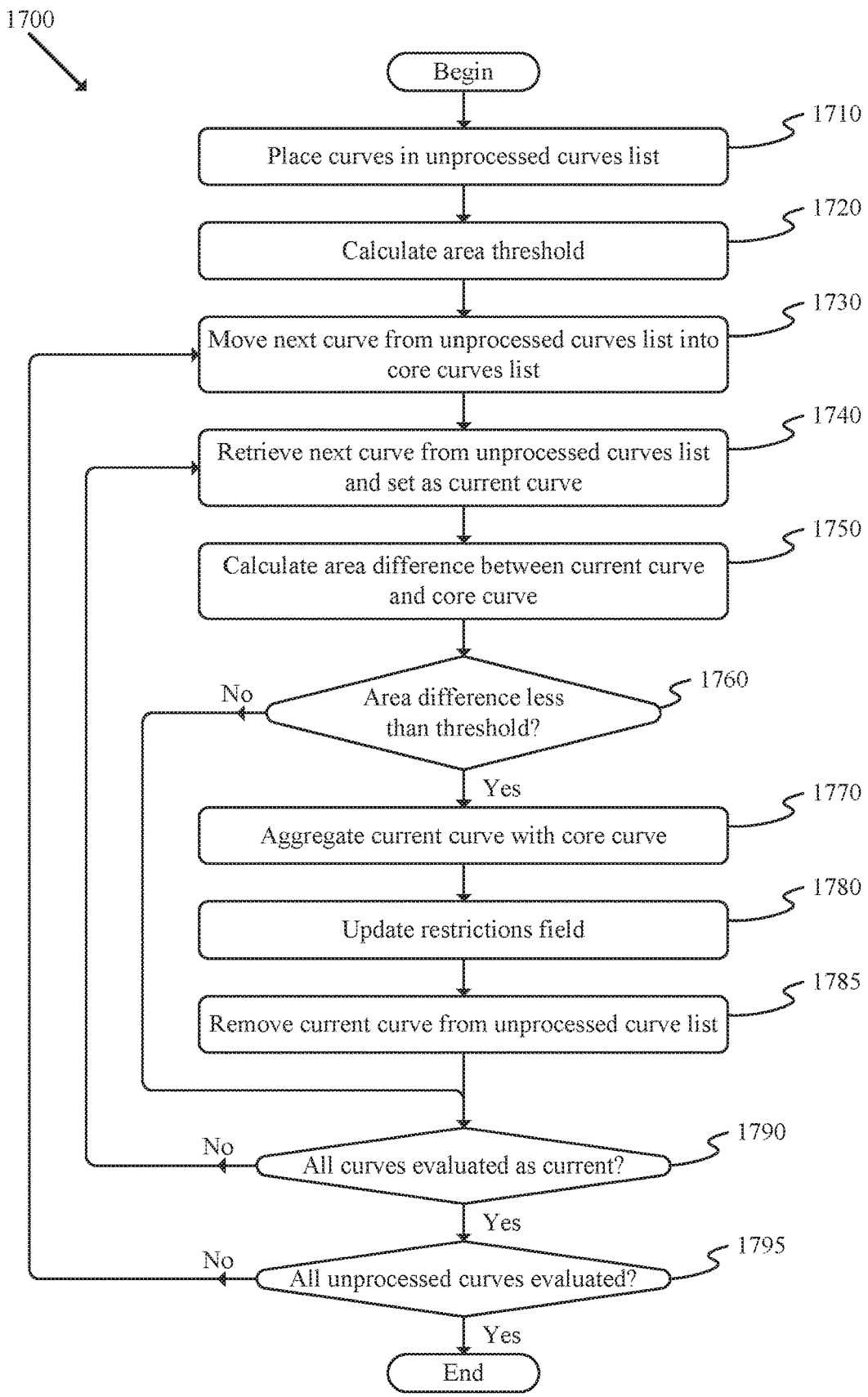
FIG. 17 illustrates a flow chart of an exemplary process 1700 used by some embodiments of the invention to combine model curves.

FIG. 17 illustrates a flow chart of an exemplary process 1700 used by some embodiments of the invention to combine model curves. Such a process may be performed by a resource such as driver behavior engine 130, server 190, aggregation modules 470 or 530, other appropriate devices or systems, and/or a combination of such devices and/or systems. The process may begin, for instance, after aggregated model are calculated as described above.

As shown, process 1700 may place (at 1710) available curves (e.g., the aggregated models calculated at 1650 above) in an unprocessed curves list.

Next, the process may calculate (at 1720) an area threshold. The area threshold may be calculated using equation (14) below:

$$At = Av*(Tp/100)*Ds \quad (14)$$

Where At is the area threshold, Av is the average value (mathematical mean of the Y-values) for the curve, Ds is the distance of the map segment in meters (or other appropriate unit), and Tp is the threshold as a percentage. The Tp parameter may be configurable and may define the acceptable variance in the models. A default starting value may be ten percent.

The process may then move (at 1730) the next curve from the unprocessed curves list and add the curve to the core curves list. That curve is also designated as the current core curve.

Next, process 1700 may retrieve (at 1740) the next curve from the unprocessed curves list and set the curve as the current curve.

The process may then calculate (at 1750) an area difference between the current curve and the core curve (or current core curve). The areas may be calculated using distance in meters (or other appropriate unit) and curve value limits.

Next, the process may determine (at 1760) whether the area difference is less than a specified threshold. If the process determines that the area difference is less than the specified threshold, the process may aggregate (at 1770) the current curve with the core curve (e.g., using calculations similar to operation 1650 described above, and update (at 1780) the restrictions field. The restrictions field may be updated to reflect the times covered by the combined curves. Next, the process may remove (at 1785) the current curve from the unprocessed curves list.

After removing (at 1785) the curve from the unprocessed curves list, or after determining (at 1760) that the area difference is not less than the threshold, the process may determine (at 1790) whether all curves from the unprocessed curves list have been evaluated as current curves. If the process determines that all curves have not been evaluated as current, the process may repeat operations 1740-1790 until the process determines (at 1790) that all curves have been evaluated as current.

After determining (at 1790) that all curves have been evaluated as current curves for the current core curve, the process may determine (at 1795) whether any curves are left in the unprocessed curves list. If the process determines that there are still curves in the unprocessed list, the process may repeat operations 1730-1795 until the process determines (at 1795) that there are no more curves in the unprocessed list.

If the process determines (at 1795) that there are no more curves in the unprocessed list, the process may end. After completion of algorithm 1700, the core curves list will include the combined aggregated curves.

One of ordinary skill in the art will recognize that process 1700 is exemplary in nature and may be implemented in various different ways without departing from the scope of the disclosure. For instance, the operations may be performed in different orders. As another example, various operations may be omitted and/or other operations may be included. Furthermore, the process may be executed as part of a larger macro-process, and/or divided into multiple sub-processes. Moreover, the process may be executed continuously, at regular intervals, based on certain criteria, and/or in other appropriate ways.

Figure 18:
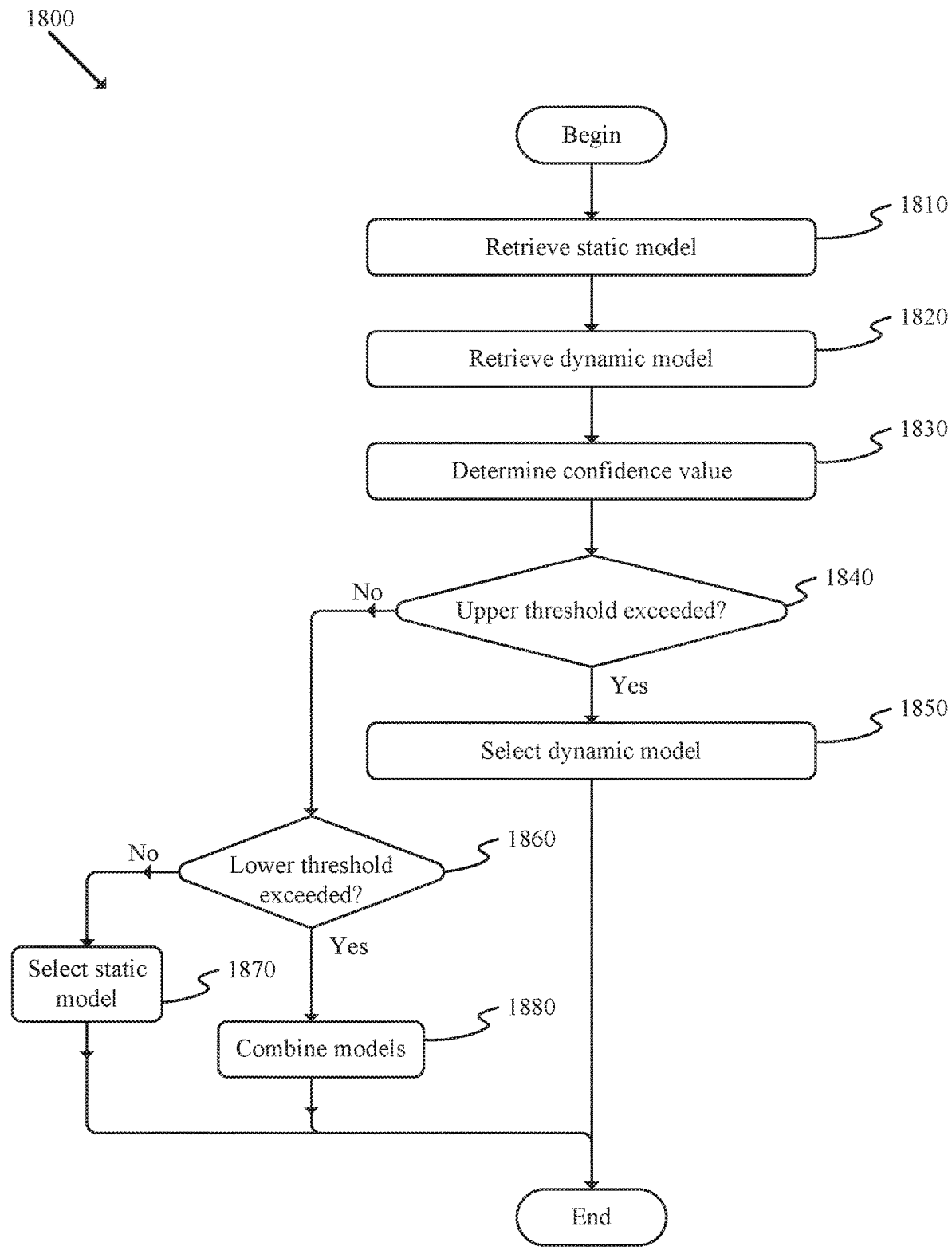
FIG. 18 illustrates a flow chart of an exemplary process used by some embodiments of the invention to select among available reference curves.

FIG. 18 illustrates a flow chart of an exemplary process 1800 used by some embodiments of the invention to select among available reference curves. Such a process may be performed by a resource such as driver behavior engine 130, server 190, other appropriate devices or systems, and/or a combination of such devices and/or systems. The process may begin, for instance, when a driver behavior engine evaluation is started, when a vehicle or navigation device is powered on, and/or under other appropriate circumstances.

Once the driver behavior engine has access to dynamic curve models, the models may be applied to processing by the engine. Generally, the models may be used in the same ways as "static" curves as described above and below.

As shown, the process may retrieve or calculate (at 1810) a static model and then retrieve (at 1820) a dynamic model. The models may be retrieved from a resource such as storage 140, profile database 210, a storage associated with server 190 such as database 480, and/or other appropriate resources. The dynamic model may be chosen based on closest date and/or time matching to the restrictions field of the model. The static model may be chosen based on vehicle matching and/or other relevant factors or maybe calculated based on the map attributes, vehicle profile, etc.

Next, the process may determine (at 1830) a confidence value for the dynamic model. The confidence value (or score) may be calculated as described above in reference to operation 1650 or retrieved from a data structure such as model 710 described above.

Process 1800 may then determine (at 1840) whether an upper confidence threshold has been exceeded by the confidence value associated with the dynamic curve. If the process determines that the upper threshold has been exceeded, the process may select (at 1850) the dynamic model and then may end.

If the process determines (at 1840) that the upper threshold has not been exceeded, the process may determine (at 1860) whether a lower confidence threshold has been exceeded. If the process determines that the lower confidence threshold has not been exceeded, the process may select (at 1870) the static model, ignoring the dynamic model, and then may end.

If the process determines (at 1860) that the lower confidence threshold has been exceeded, the process may combine (at 1880) the static and dynamic models and then may end. Some embodiments may combine the models by processing the measured driver values with both models and determine if action is needed by combining both results weighted by the confidence value of the associated dynamic curve.

One of ordinary skill in the art will recognize that process 1800 is exemplary in nature and may be implemented in various different ways without departing from the scope of the disclosure. For instance, the operations may be performed in different orders. As another example, various operations may be omitted and/or other operations may be included. Furthermore, the process may be executed as part of a larger macro-process, and/or divided into multiple sub-processes. Moreover, the process may be executed continuously, at regular intervals, based on certain criteria, and/or in other appropriate ways.

Figure 19:
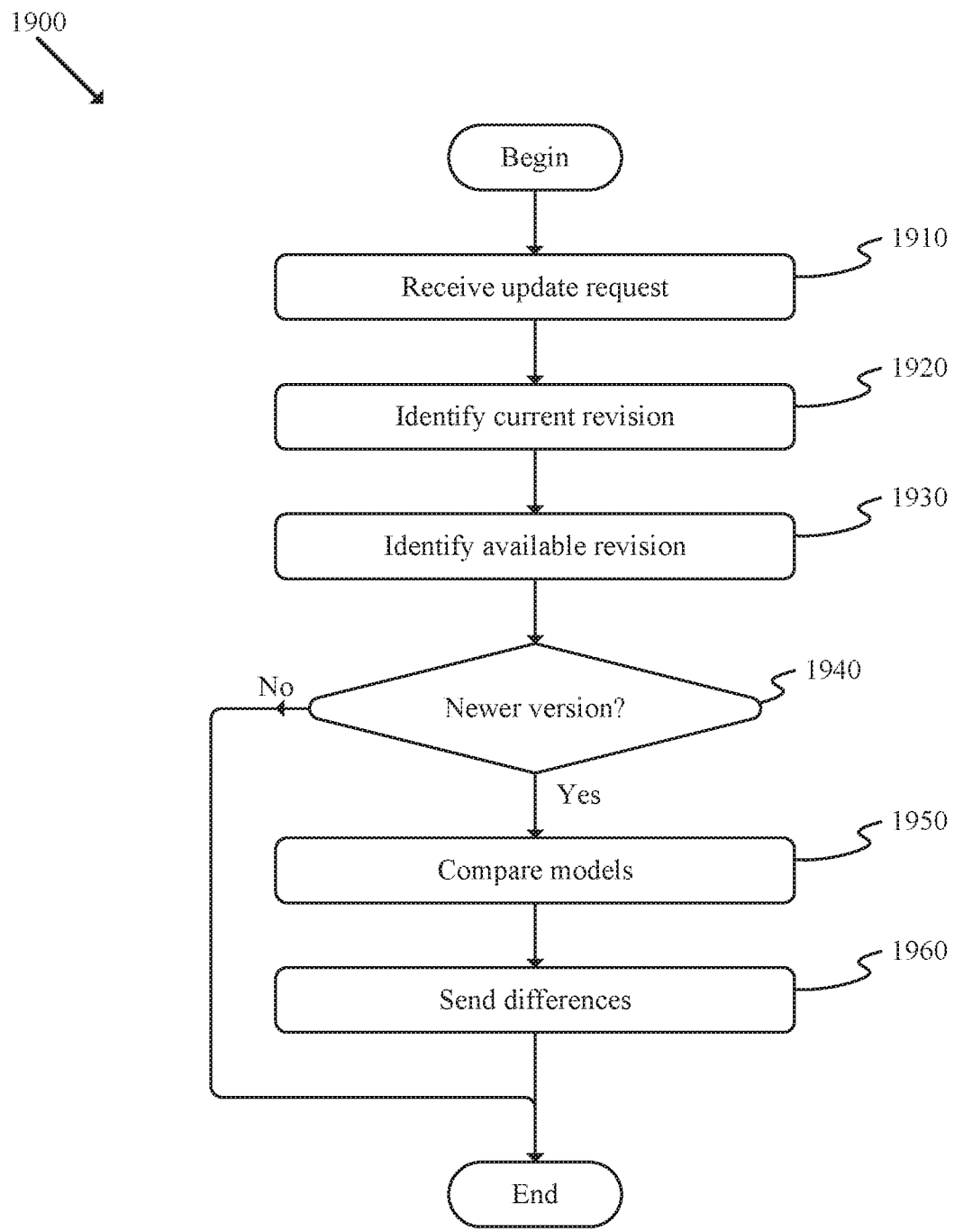
FIG. 19 illustrates a flow chart of an exemplary process used by some embodiments of the invention to share dynamic model data among system components.

FIG. 19 illustrates a flow chart of an exemplary process 1900 used by some embodiments of the invention to share dynamic model data among system components. Such a process may be performed by a resource such as driver behavior engine 130, server 190, other appropriate devices or systems, and/or a combination of such devices and/or systems. The process may begin, for instance, when a driver behavior engine application is launched, when a vehicle or navigation device is powered on, and/or under other appropriate circumstances.

As shown, process 1900 may receive (at 1910) an update request. The update request may be received at the vehicle (e.g., a user may initiate an update, a driver behavior engine may request updates at regular intervals or based on vehicle attributes such as location, etc.). The update request may be transmitted to a server of some embodiments. One of the challenges of sharing the curve models is that transmission of the models might consume a lot of bandwidth if such data is constantly sent. Various strategies described below may be used to share the curves more efficiently.

In some embodiments, the update request may be generated at the server itself in order to initiate an update to vehicles using the driver behavior engine. In such cases, the update may include an identification of each vehicle affected by the update (e.g., each vehicle known to have received a prior revision or static model). The server may then distribute the update to the appropriate vehicles using any of the algorithms described below.

Next, the process may identify (at 1920) a current revision of the model(s) specified by the update request and identify (at 1930) available revision(s). Such revision identification may be performed at the vehicle (current revision may be known to the vehicle and the vehicle may send a request for available revisions to the back-end server) or the back-end server (the server may have a list of available revisions and a database with vehicle information or be able to extract a current revision from an update request).

Process 1900 may then determine (at 1940) whether there is a newer version available. Such a determination may be made by comparing the revision numbers of the current and available revision. Such an approach avoids constant downloading of curve model data and allows the vehicle (or other resource) to quickly determine if there is a change to the model since the last update and only request download of models having a newer revision number.

If the process determines (at 1940) that there is not a newer version available, the process may end. If the process determines (at 1940) that there is a newer version available, the process may compare (at 1950) the current and available revisions in order to identify differences between the revisions, send (at 1960) the differences, and then end. Alternatively, some embodiments may omit the comparison and send (at 1960) the entire model.

The process may compare (at 1950) a previous known model that may be a static model or a known previous revision (associated with the receiving system) to the newest revision available. When sending (at 1960) the differences, the process may include the difference of the data points from the previous model and/or any updated attributes. Such data may be easily compressible.

Another approach to reduce unnecessary data transfer may include sending only models that are local to the current vehicle position and thus are likely to be used.

Still another approach is to rank map segments by popularity. As many vehicles are sending their models to the server, the server can rank map segments that are traversed most often and ensure that the most highly ranked models are sent to all local vehicles.

Of course, some embodiments may be implemented in systems with sufficient bandwidth to allow transmission of all models.

One of ordinary skill in the art will recognize that process 1900 is exemplary in nature and may be implemented in various different ways without departing from the scope of the disclosure. For instance, the operations may be performed in different orders. As another example, various operations may be omitted and/or other operations may be included. Furthermore, the process may be executed as part of a larger macro-process, and/or divided into multiple sub-processes. Moreover, the process may be executed continuously, at regular intervals, based on certain criteria, and/or in other appropriate ways.

VI. Example Behavior Curves

The following section describes various example behavior curves. Such curves may have different numbers of nodes, sections, and/or other attributes. The curves may be used to evaluate any measureable parameter related to operation of a vehicle.

Figure 20:
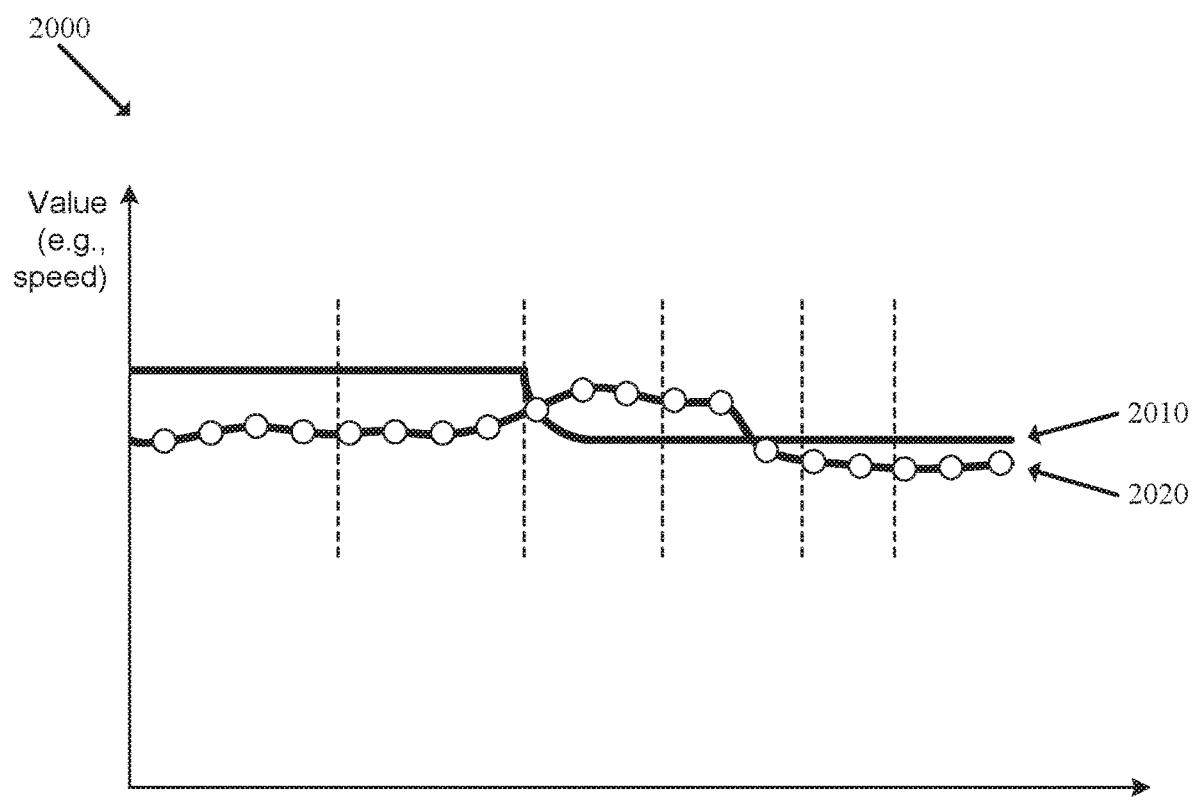
FIG. 20 illustrates an x-y plot with example behavior curves according to some embodiments of the invention.
Figure 20:
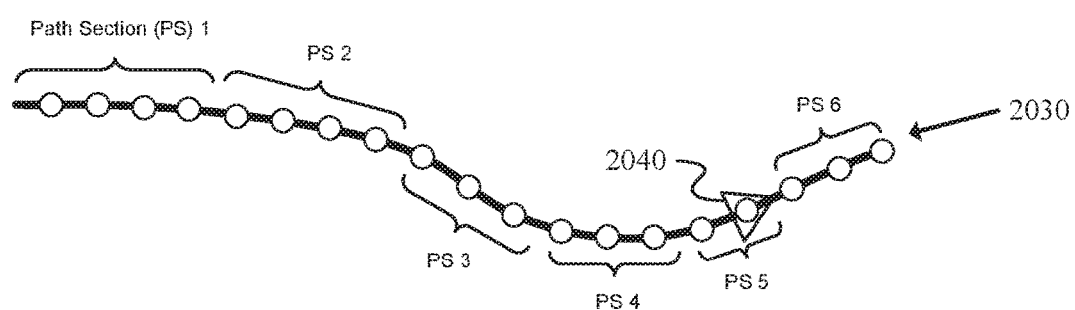

FIG. 20 illustrates an x-y plot 2000 of example behavior curves according to some embodiments of the invention. Specifically, this figure shows associations among driver evaluation curves and driving path(s). As shown, the plot includes a reference curve 2010, a driver behavior curve (drive curve) 2020 with actual and predicted points, and a vehicle driving path 2030 with actual and predicted points.

The reference curve 2010 and driver behavior curve 2020 are matched with the vehicle path 2030. In other words, the various points along curves 2010 and 2020 correspond to the nodes along path 2030. The curves 2010-2020 represent data points of some observable driver characteristic for every measured point along the associated vehicle path 2030. For instance, the example in FIG. 20 shows a behavior curve 2020 represented by data points for driving speed (other behavior curves may represent other driving characteristics such as braking, turning, acceleration, fuel efficiency, etc.).

Reference curve 2010 and behavior curve 2020 may include curve sections (indicated by vertical dashed lines) associated with vehicle path 2030 sections (indicated by groupings of points). The curves 2010-2020 may be divided into the same sections as the associated vehicle path 2030, and for every vehicle point there may be a corresponding actual or potential curve value. Curve section values may be stored differently in different embodiments. For instance, curves may include a point for every vehicle point, or the curve value may be represented via some equation (linear, Bezier, etc.).

Representation of various driving characteristics as behavior curves allows continuous, efficient monitoring, recording, and/or analysis of driver behavior. In different embodiments, there may be many different types of curves that may each be represented as a set of value points and/or equations. A common curve module may be used to store and compare different curves, and may provide a curve data management infrastructure to manage different types of curves.

Figure 21:
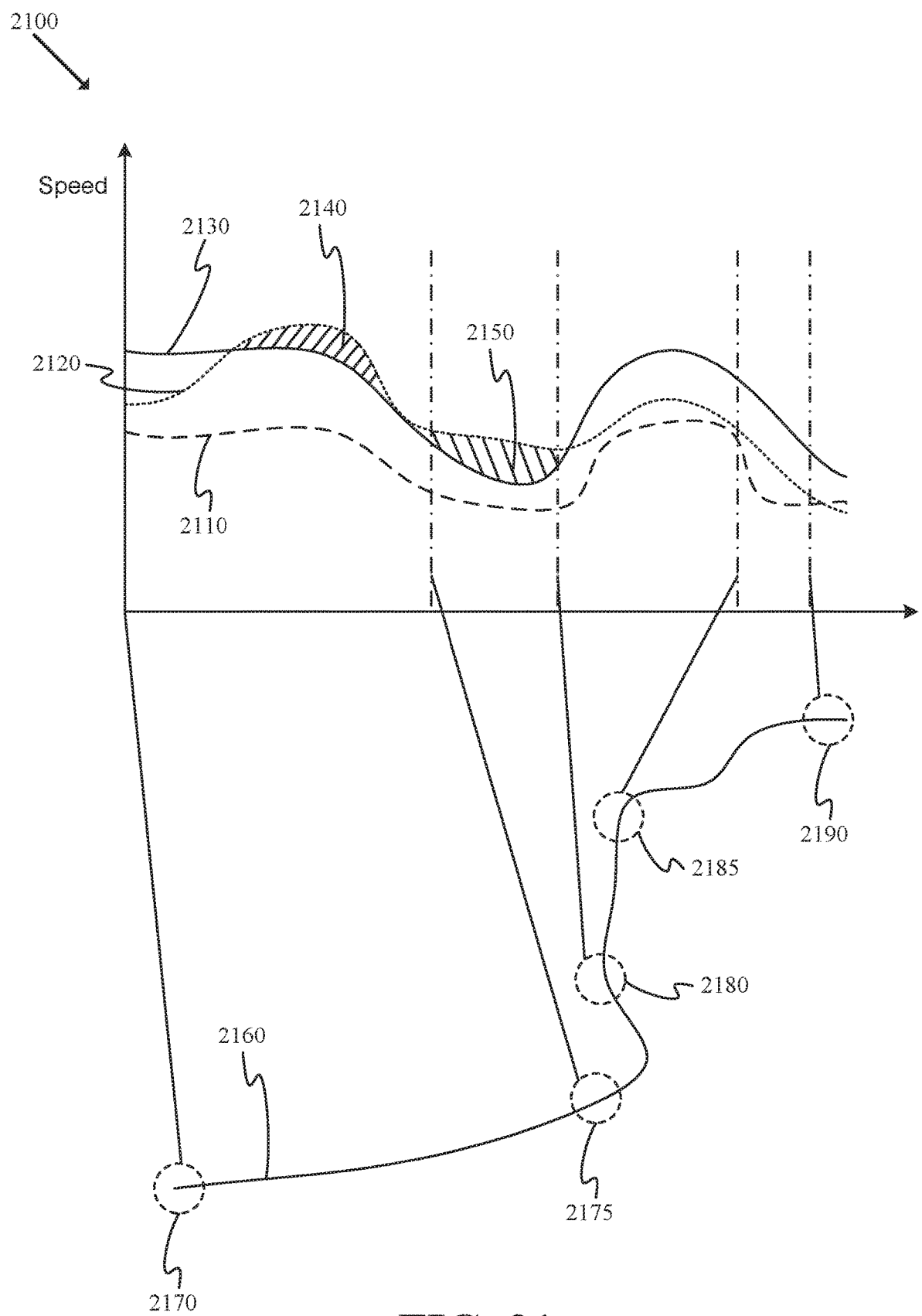
FIG. 21 illustrates an x-y plot with example speed curves according to some embodiments of the invention.

FIG. 21 illustrates an x-y plot of example speed curves 2100 according to some embodiments of the invention. Specifically, this figure shows speed curves over distance or time as a vehicle moves along a path. As shown, the x-y plot includes an optimal speed curve 2110, an actual speed curve 2120, a safe speed curve 2130, a speed violation zone 2140, an unsafe turning speed zone 2150, a vehicle path 2160, and various points 2170-2190 along the vehicle path 2160.

The optimal speed curve 2110 may indicate an optimal speed for a vehicle along the path 2160. The optimal speed curve 2110 may define the best expected values from monitored driving characteristics. Optimal speed curves may be used to guide driving performance over a range of conditions. Optimal speed curves may be used to optimize fuel efficiency, drive-time, etc. The actual speed curve 2120 may indicate the actual speed of a vehicle. The actual speed curve may be measured by appropriate vehicle sensors.

The safe speed curve 2130 may indicate a safe speed for a vehicle to travel based on geographic location, anticipated conditions and/or events, etc. The geographic location of the vehicle may be matched to road segments or path sections as determined by a component such as positioning engine 225 based on data retrieved from a component such as map database 215. The safe speed curve 2130 may define bounds for which a safety alert may be issued. For instance, if a given behavior curve crosses or exceeds a safety curve during operation of the vehicle, a warning may be given and/or recorded. Some embodiments of the invention may include multiple safety curves with different severity levels.

The speed violation zone 2140 may indicate unsafe speeds for a vehicle to travel based on a comparison of the actual speed curve 2120 to the safe speed curve 2130. Likewise, the unsafe turning speed zone 2150 may indicate unsafe turning speeds based on a comparison of the actual speed curve 2120 to the safe speed curve 2130 at a location along the path 2160 identified as a curve (and/or other appropriate feature which may depend on particular driver behavior(s) being evaluated). Driver behavior may be monitored, recorded, and/or analyzed at least partly based on specific shapes and/or sizes of such violation zones.

The vehicle path 2160 may be determined using various system resources (e.g., elements of the systems described above in reference to FIG. 1-FIG. 3). The path 2160 may be defined to include various elements such as the points and sections described above in reference to FIG. 9 and FIG. 20.

In the example in FIG. 21, speed values are shown for the given vehicle path 2160. Each point on the vehicle path may correspond to a speed value for reference curves such as an optimal speed curve 2110, an actual speed curve 2120, and/or a safe speed curve 2130. A geographic location of the vehicle may be matched to road segments from a map database using a positioning engine. The driver behavior engine may use data related to the path 2160 and/or selected profiles from a profile database to generate corresponding reference curves.

In the example of FIG. 21, the first point 2170 indicates a starting point for the current evaluation segment. Such a starting point may be based on various algorithms and/or parameters (e.g., distance from the current position, starting point of a navigation, etc.). In this example, the actual speed of the vehicle (as represented by actual speed curve 2120) exceeds the optimal speed (as represented by optimal speed curve 2110), but does not exceed the safe speed (as represented by safe speed curve 2130) at point 2170. As the vehicle moves along the path 2160 from point 2170 to point 2175, the actual speed exceeds the optimal speed and the safe speed, as represented by zone 2140. From point 2175 to point 2180, where the section is identified as a curve, the actual speed exceeds the optimal speed and the safe speed, as indicated by zone 2150. After the vehicle passes point 2180, the actual speed drops below the safe speed threshold, but still exceeds the optimal speed threshold. This condition is maintained as the vehicle passes points 2185 and 2190.

Figure 22:
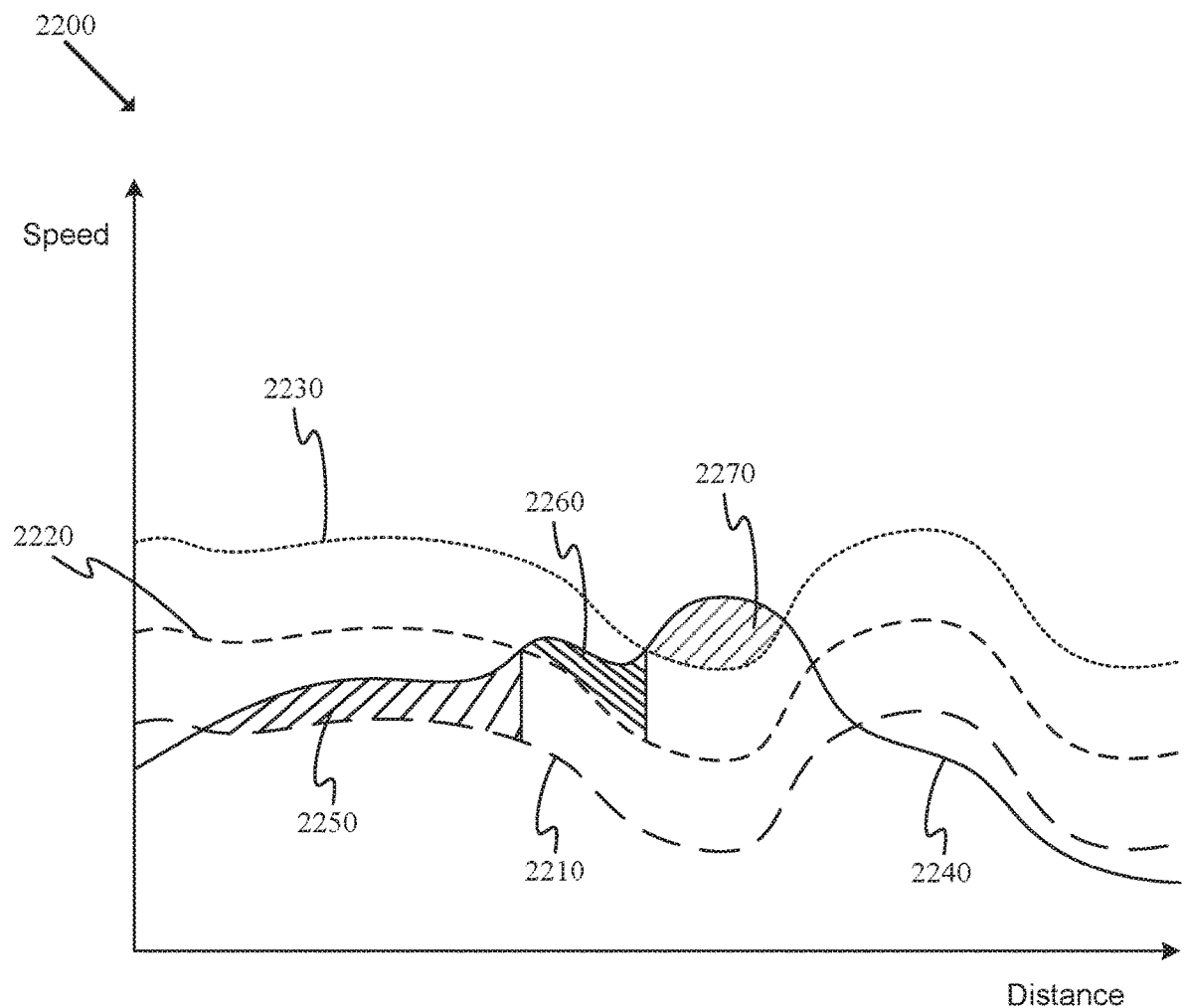
FIG. 22 illustrates an x-y plot with example safety curves according to some embodiments of the invention.

FIG. 22 illustrates an x-y plot 2200 with example safety curves according to some embodiments of the invention. Specifically, this figure shows graded analysis of various driver behaviors. As shown, the x-y plot may include a warning level curve 2210, a severe level curve 2220, a critical level curve 2230, an actual speed curve 2240, a violation warning event zone 2250, a severe violation warning event zone 2260, and a critical violation warning event zone 2270.

The warning level curve, 2210, severe level curve 2220, and critical level curve 2230 may indicate safety bounds for given characteristics beyond which driving behavior is unsafe. The actual speed curve 2240 may indicate the actual speed of the vehicle. The violation warning event zone 2250, severe violation warning event zone 2260, and critical violation warning event zone 2270 may be used to warn drivers of safety violations and/or unsafe driving behavior (and/or may be recorded for later analysis).

The safety curves may define safety thresholds for a given characteristic. For example, the safety curves in FIG. 22 may define the safety bounds for vehicle speed. As shown, the warning level curve 2210, severe level curve 2220, and critical level curve 2230 may indicate the level above which one or more warning events 2250, severe warning events 2260, and critical warning events 2270 may occur, respectively. The driver behavior engine 205 may be configured (via the profiles from the profile database 210) to have various different numbers of safety curve levels, to have different meanings for different safety curve levels, and/or different corresponding actions to execute in response. For example, some embodiments may be configured to record a violation above the warning level curve 2210 with a soft notification to the driver (e.g., an audio signal). A more prominent notification may be used for a violation above the severe warning level curve 2220 (e.g., an audio signal and visual indicator). For violations above the critical warning level curve 2230, the driver behavior engine 205 may provide the highest level of notification (e.g., loud audible reminder, flashing lights, etc.).

Figure 23:
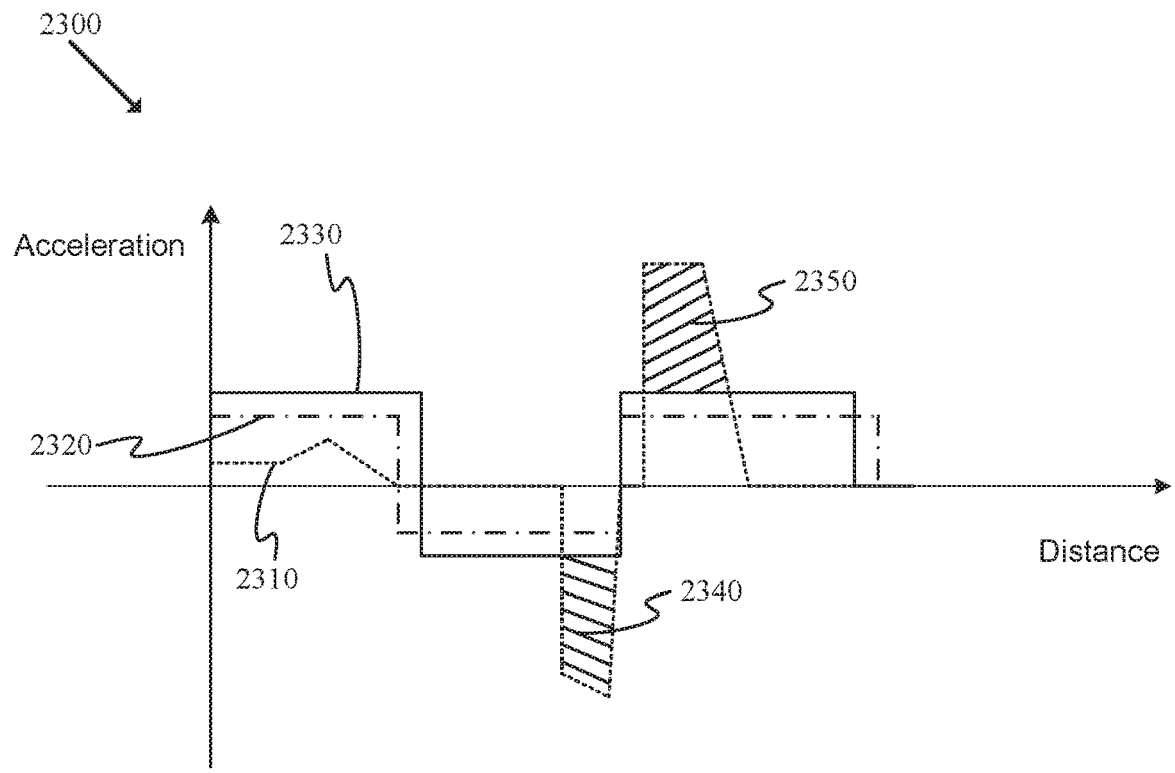
FIG. 23 illustrates an x-y plot with example acceleration curves according to some embodiments of the invention.

FIG. 23 illustrates an x-y plot 2300 with example acceleration/deceleration curves according to some embodiments of the invention. Specifically, this figure shows a set of curves that may be used to evaluate performance of a driver related to sensed acceleration. As shown, the x-y plot may include an actual acceleration curve 2310, an optimal acceleration curve 2320, a safe acceleration curve 2330, a sudden deceleration violation 2340, and a sudden acceleration violation 2350.

The actual acceleration curve 2310 may be determined using various appropriate vehicle sensors (e.g., GPS, wheel sensors, accelerometers, On-Board Diagnostics (OBD) data, CAN data, etc.). The optimal acceleration curve 2320 and safe acceleration curve 2330 may be determined based on known points of acceleration/deceleration (e.g., stop signs, traffic lights, "T" junctions, and/or other features identified from map data), and/or predicted future possible paths.

The sudden deceleration violation 2340 and sudden acceleration violation 2350 may indicate regions of unsafe deceleration and acceleration, respectively. A sudden deceleration violation 2340 occurs when actual deceleration is below the safe acceleration curve 2330. Similarly, a sudden acceleration violation 2350 occurs when actual acceleration exceeds the safe acceleration curve 2330.

Figure 24:
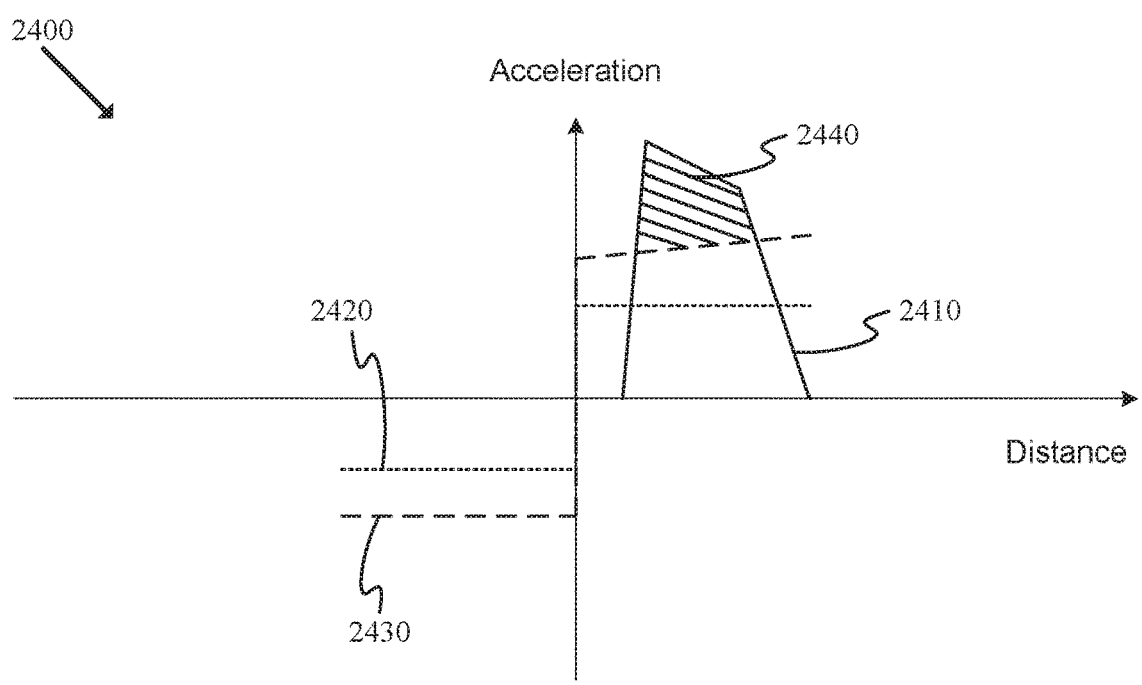
FIG. 24 illustrates an x-y plot with example static acceleration curves according to some embodiments of the invention.

FIG. 24 illustrates an x-y plot 2400 with example static acceleration curves according to some embodiments of the invention. Specifically, this figure shows a set of curves that may be used to evaluate performance of a driver related to sensed static acceleration. As shown, the x-y plot may include an actual acceleration curve 2410, an optimal static acceleration curve 2420, a safe static acceleration curve 2430, and a sudden static acceleration violation zone 2440.

In real-time driving systems, the exact location of acceleration/deceleration may be difficult to ascertain, and therefore, respective behavior curves may be difficult to generate. Instead, static acceleration curves may be used to provide real-time warnings and/or driving guidance.

The actual acceleration curve 2410 may be determined using various appropriate vehicle sensors. The optimal static acceleration curve 2420 and safe static acceleration curve 2430 may be determined based on vehicle characteristics (e.g., vehicle weight, size, etc.), weather conditions (which may be determined by temperature sensors, a barometric pressure sensor, windshield wiper data, head-light data, etc.), and/or position of the accelerator pedal (which may be determined by OBD-II, for example). The optimal static acceleration curve 2420 and safe static acceleration curve 2430 may also be determined based on known points of acceleration/deceleration, and predicted future possible points.

The sudden static acceleration violation zone 2440 may indicate a region of unsafe static acceleration. A sudden static acceleration violation 2440 occurs when actual static acceleration (as represented by curve 2410) exceeds the safe static acceleration (as represented by curve 2430).

Figure 25:
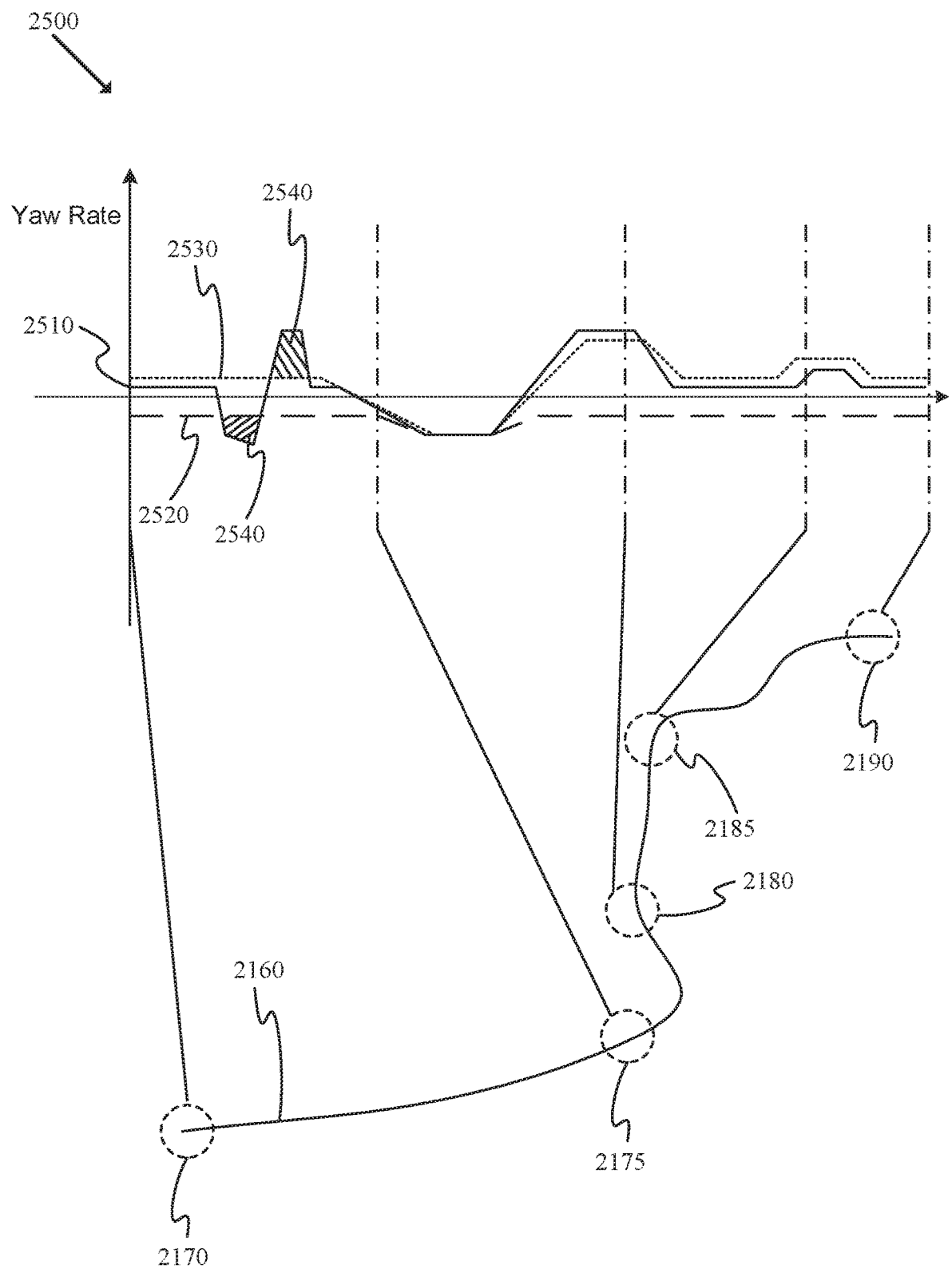
FIG. 25 illustrates an x-y plot with example yaw rate curves according to some embodiments of the invention.

FIG. 25 illustrates an example yaw rate curves diagram 2500 according to some embodiments of the invention. Specifically, this figure shows a set of curves that may be used to evaluate performance of a driver related to sensed yaw rate. As shown, the diagram may include an actual yaw rate curve 2510, a safe yaw rate curve 2520, an optimal yaw rate curve 2530, unsafe yaw rate zones 2540, driving path 2160, and various points 2170-2190 along the driving path 2160.

The actual yaw rate curve 2510 may be determined using elements such as gyroscopes, GNSS receivers (GPS, GLONASS, Galileo, Beidou system, etc.), differential wheel sensors, steering wheel angle sensors, etc. The yaw rate may be measured in degrees per second. The safe yaw rate curve 2520 and optimal yaw rate curve 2530 may be determined based on vehicle characteristics (e.g., vehicle weight, size, etc.), weather conditions (which may be determined by temperature sensors, a barometric pressure sensor, windshield wiper data, head-light data, etc.), map data (road shape, road curvature, lane information, road width, posted speed limit, road banking, etc.), speed, and/or position of the accelerator pedal. The safe yaw rate curve 2520 and optimal yaw rate curve 2530 may also be determined based on known driving points, and predicted future possible points.

The unsafe yaw rate zones 2540 may indicate an unsafe yaw rate region. An unsafe yaw rate violation occurs when yaw rate exceeds the safe yaw rate. The yaw rate may be used to detect sudden turns or lane changes. At high speeds large yaw rates may lead to vehicles rolling over and/or other traffic accidents. For example, sudden turns and lane changes might be an indicator of a distracted driver. The unsafe yaw rate zone may be used to avoid these types of accidents and/or unsafe lane changes.

The shape and features of the driving path 2160 may be determined using map data. Map data regarding the shape and features of the road may be used to calculate the safe yaw rate curve 2520, optimal yaw rate curve 2530, and unsafe yaw rate zones 2540. Unsafe lane changes may be detected by high yaw rate values that do not match expected yaw rates based on the road geometry.

Figure 26:
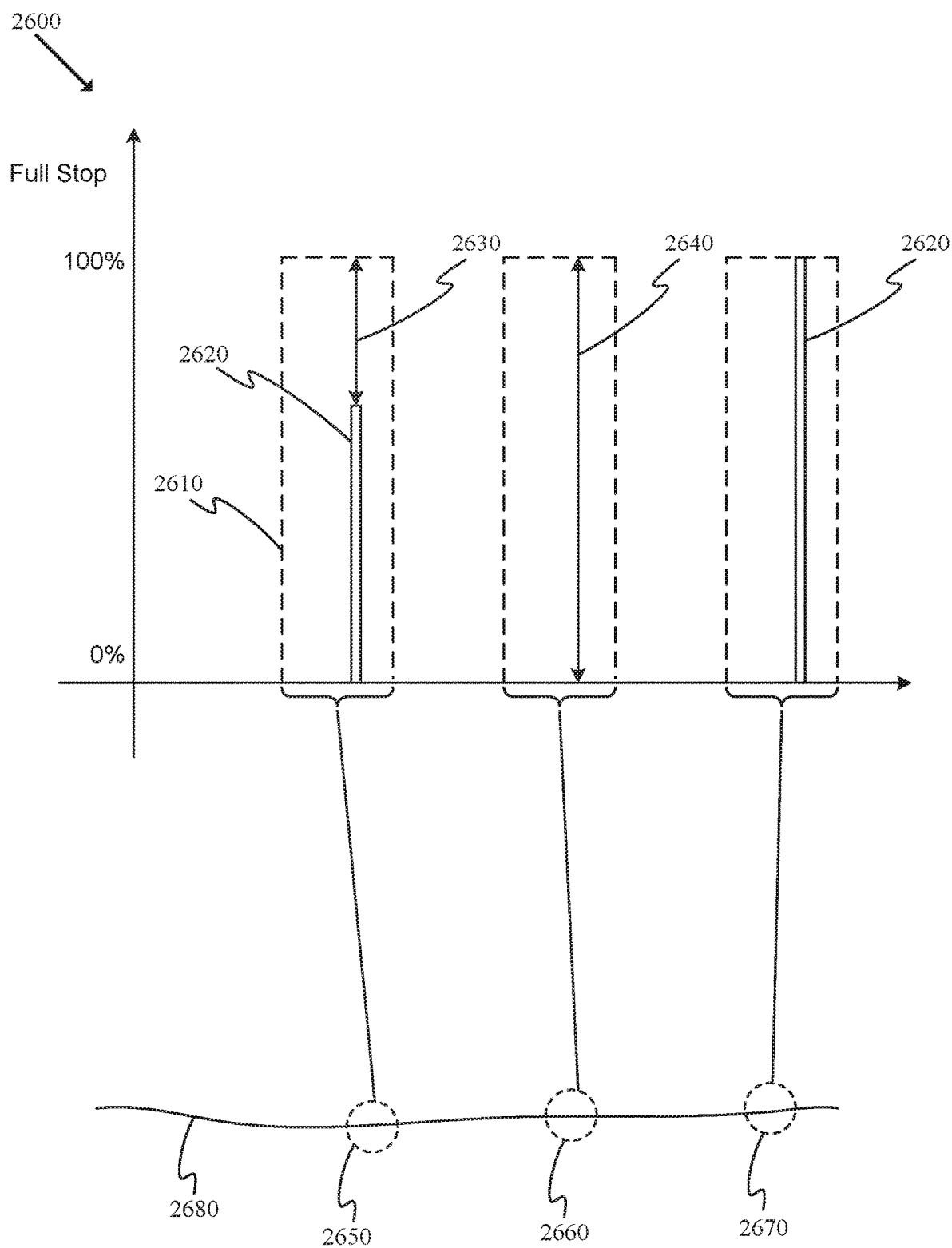
FIG. 26 illustrates an x-y plot with example stop curves according to some embodiments of the invention.

FIG. 26 illustrates an x-y plot 2600 with example stop curves according to some embodiments of the invention. Specifically, this figure shows a set of curves that may be used to evaluate performance of a driver related to sensed movement. As shown, the x-y plot includes a safe stop range curve 2610, an actual stop curve 2620, a rolling stop violation 2630, a non-stopping violation 2640, and corresponding points 2650-2670 along a path 2680 where respective stops are expected to occur.

Stopping behavior may be determined by measuring a vehicle's speed via various appropriate vehicle sensors. For example, a 100% stop may be determined if a vehicle stays at a speed of 0 mph for a predefined period of time (e.g., 1-2 seconds). Using this approach, stops may appear as spikes on a graph. The safe stop range curve 2610 may be determined using map information such as stop sign, intersection, traffic light, and/or other map attribute data. Because of potential traffic and/or road conditions, the exact place where a vehicle needs to stop may be undetermined. To account for such variability, the stop curves use ranges. For example, a vehicle may need to stop a certain distance before a stop sign and/or stop light if there are other vehicles ahead of it. Various frontal distance vehicle sensors (e.g., radar, camera systems, etc.) may be used to detect the presence of other vehicles, which may affect the safe stop range curve 2610.

The safe stop range curve may be determined from data regarding traffic lights (with additional vehicle sensors 120 for detecting red lights), stop signs, approaching/crossing a major road, railroad crossings, left turns at intersections without traffic lights, etc. The safe stop range curve 2610 may also be determined from speed and acceleration data, weather conditions (e.g., wet conditions may necessitate earlier stopping), road construction data, etc. The actual stop curve 2620 may indicate where and for how long a vehicle stops, and the whether or not a vehicle comes to a complete stop.

A rolling stop violation 2630, which corresponds to point 2650 representing a stop, may be determined if a vehicle does not reach 0 mph and/or does not remain at 0 mph for a predetermined period of time. A non-stopping violation 2640, which corresponds to point 2660, may indicate if a vehicle fails to stop at a required road stop. Point 2670 corresponds to a required stop where the vehicle performed a proper stop.

One of ordinary skill in the art will recognize that the diagrams 2000-2600 are exemplary in nature and may be implemented in various different ways without departing from the scope of the disclosure. For instance, various alternative paths and/or sets of points may be used. In a similar manner other behavior curves may be created for additional measurable driving characteristics such as frontal distance, driver alertness, shift gear position, etc. In addition, various other driving data may be utilized and/or included. Furthermore, various numbers of thresholds may be defined.

VII. Process for Defining a Driver Behavior Engine Application

Figure 27:
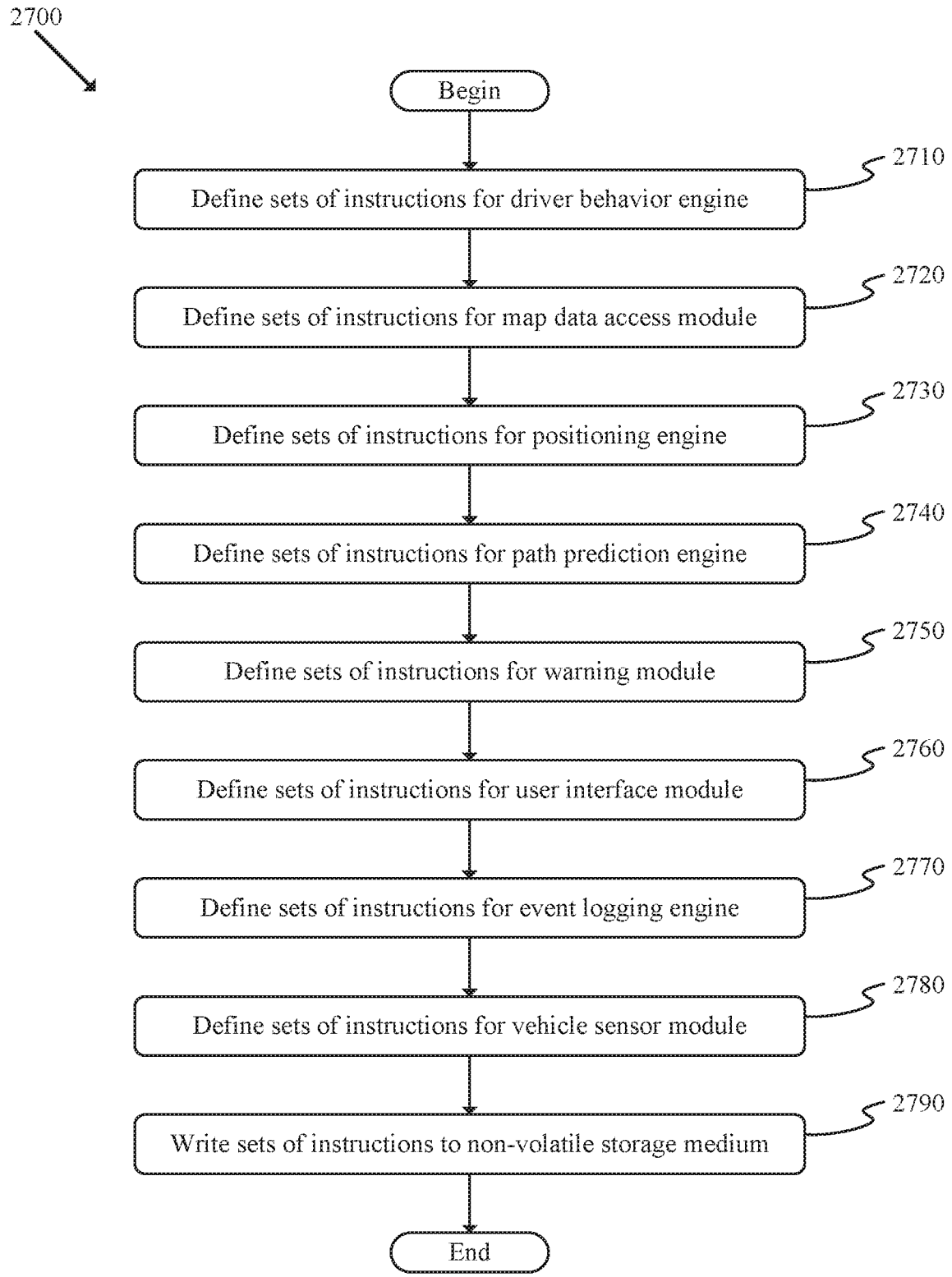
FIG. 27 illustrates a flow chart of an exemplary process used by some embodiments to define and store an application of some embodiments.

FIG. 27 illustrates a flow chart of a process 2700 of some embodiments for defining and storing a set driver behavior engine applications of some embodiments, such as the application provided by system 200 described above in reference to FIG. 2. Specifically, process 2700 illustrates the operations used to define sets of instructions for providing several of the elements shown in the driver behavior engine application system 200 and for performing various operations described above.

As shown, the process may define (at 2710) sets of instructions for providing a driver behavior engine. The process may then define (at 2720) sets of instructions for providing a map data access module. Next, the process may define (at 2730) sets of instructions for providing a positioning engine. Process 2700 may then define (at 2740) sets of instructions for providing a path prediction engine. The process may then define (at 2750) sets of instructions for providing a warning module. Next, the process may define (at 2760) sets of instructions for providing an optional user interface module. Process 2700 may then define (at 2770) sets of instructions for providing an event logging engine. The process may then define (at 2780) sets of instructions for providing a vehicle sensor module. Similar operations may be used to define sets of instructions for providing other appropriate modules (e.g., a learning module, a sharing module, etc.). The process may then write (at 2790) the sets of instructions defined at operations 2710-2780 to a non-volatile storage medium.

One of ordinary skill in the art will recognize that the various sets of instructions defined by process 2700 are not exhaustive of the sets of instructions that could be defined and established on a non-volatile storage medium for driver behavior engine applications incorporating some embodiments of the invention. In addition, process 2700 is an exemplary process, and the actual implementations may vary. For example, different embodiments may define the various sets of instructions in a different order, may define several sets of instructions in one operation, may decompose the definition of a single set of instructions into multiple operations, etc. In addition, process 2700 may be implemented as several sub-processes or combined with other operations within a macro-process.

VIII. Computer System

Many of the processes and modules described above may be implemented as software processes that are specified as at least one set of instructions recorded on a non-transitory storage medium. When these instructions are executed by one or more computational element(s) (e.g., microprocessors, microcontrollers, Digital Signal Processors (DSP), Application-Specific ICs (ASIC), Field Programmable Gate Arrays (FPGA), etc.) the instructions cause the computational element(s) to perform actions specified in the instructions.

Figure 28:
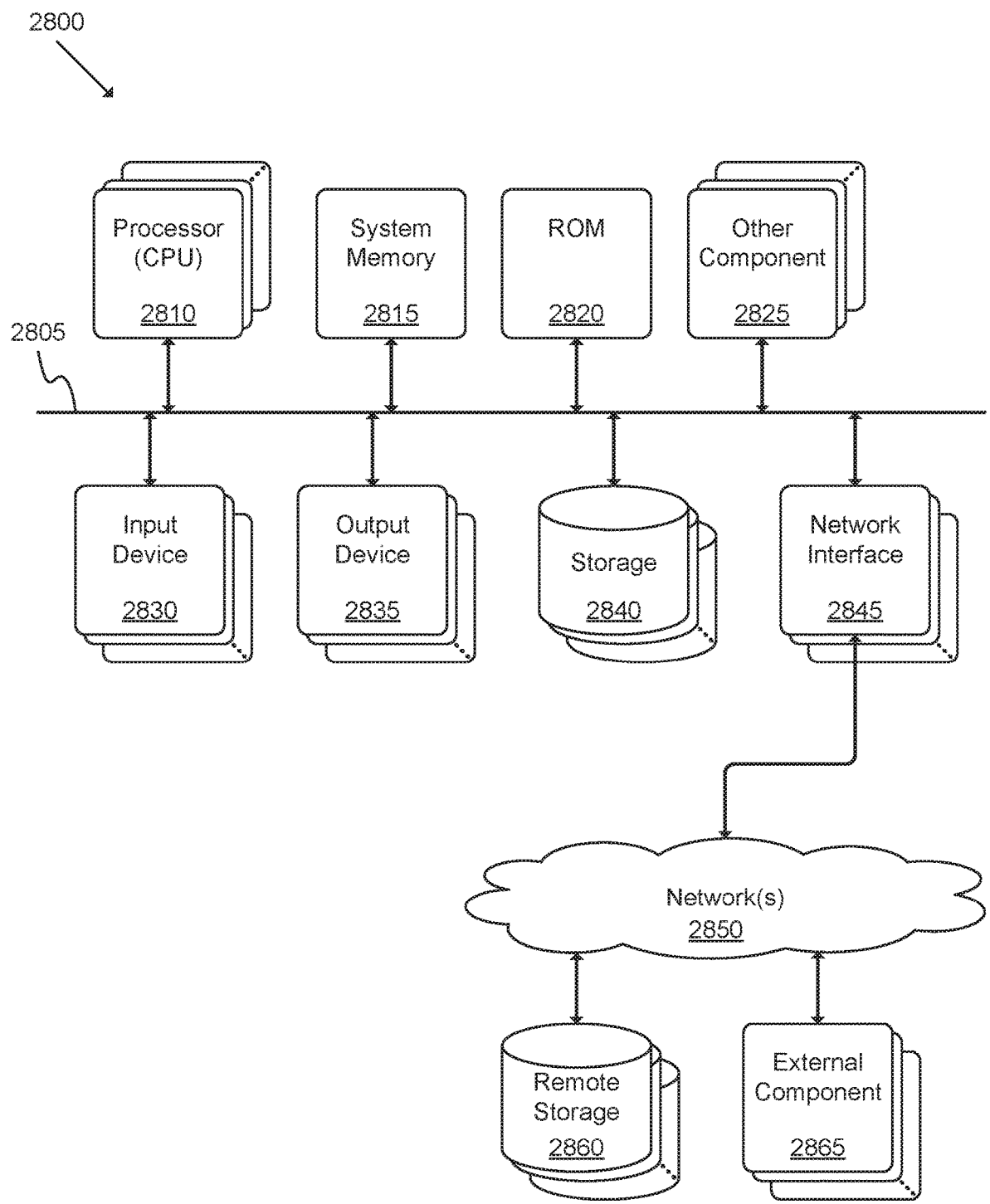
FIG. 28 illustrates a schematic block diagram of an exemplary computer system with which some embodiments of the invention may be implemented.

FIG. 28 illustrates a schematic block diagram of an exemplary computer system 2800 used to implement some embodiments. For example, the systems described above in reference to FIG. 1-FIG. 5 may be at least partially implemented using computer system 2800. As another example, the processes described in reference to FIG. 11-FIG. 19 may be at least partially implemented using sets of instructions that are executed using computer system 2800.

Computer system 2800 may be implemented using various appropriate devices. For instance, the computer system may be implemented using one or more personal computers (PCs), servers, mobile devices (e.g., a smartphone), tablet devices, and/or any other appropriate devices. The various devices may work alone (e.g., the computer system may be implemented as a single PC) or in conjunction (e.g., some components of the computer system may be provided by a mobile device while other components are provided by a tablet device).

As shown, computer system 2800 may include at least one communication bus 2805, one or more processors 2810, a system memory 2815, a read-only memory (ROM) 2820, permanent storage devices 2825, input devices 2830, output devices 2835, audio processors 2840, video processors 2845, various other components 2850, and one or more network interfaces 2855.

Bus 2805 represents all communication pathways among the elements of computer system 2800. Such pathways may include wired, wireless, optical, and/or other appropriate communication pathways. For example, input devices 2830 and/or output devices 2835 may be coupled to the system 2800 using a wireless connection protocol or system.

The processor 2810 may, in order to execute the processes of some embodiments, retrieve instructions to execute and/or data to process from components such as system memory 2815, ROM 2820, and permanent storage device 2825. Such instructions and data may be passed over bus 2805.

System memory 2815 may be a volatile read-and-write memory, such as a random access memory (RAM). The system memory may store some of the instructions and data that the processor uses at runtime. The sets of instructions and/or data used to implement some embodiments may be stored in the system memory 2815, the permanent storage device 2825, and/or the read-only memory 2820. ROM 2820 may store static data and instructions that may be used by processor 2810 and/or other elements of the computer system.

Permanent storage device 2825 may be a read-and-write memory device. The permanent storage device may be a non-volatile memory unit that stores instructions and data even when computer system 2800 is off or unpowered. Computer system 2800 may use a removable storage device and/or a remote storage device as the permanent storage device.

Input devices 2830 may enable a user to communicate information to the computer system and/or manipulate various operations of the system. The input devices may include keyboards, cursor control devices, audio input devices and/or video input devices. Output devices 2835 may include printers, displays, audio devices, etc. Some or all of the input and/or output devices may be wirelessly or optically connected to the computer system 2800.

Audio processor 2840 may process and/or generate audio data and/or instructions. The audio processor may be able to receive audio data from an input device 2830 such as a microphone. The audio processor 2840 may be able to provide audio data to output devices 2840 such as a set of speakers. The audio data may include digital information and/or analog signals. The audio processor 2840 may be able to analyze and/or otherwise evaluate audio data (e.g., by determining qualities such as signal to noise ratio, dynamic range, etc.). In addition, the audio processor may perform various audio processing functions (e.g., equalization, compression, etc.).

The video processor 2845 (or graphics processing unit) may process and/or generate video data and/or instructions. The video processor may be able to receive video data from an input device 2830 such as a camera. The video processor 2845 may be able to provide video data to an output device 2840 such as a display. The video data may include digital information and/or analog signals. The video processor 2845 may be able to analyze and/or otherwise evaluate video data (e.g., by determining qualities such as resolution, frame rate, etc.). In addition, the video processor may perform various video processing functions (e.g., contrast adjustment or normalization, color adjustment, etc.). Furthermore, the video processor may be able to render graphic elements and/or video.

Other components 2850 may perform various other functions including providing storage, interfacing with external systems or components, etc.

Finally, as shown in FIG. 28, computer system 2800 may include one or more network interfaces 2855 that are able to connect to one or more networks 2860. For example, computer system 2800 may be coupled to a web server on the Internet such that a web browser executing on computer system 2800 may interact with the web server as a user interacts with an interface that operates in the web browser. Computer system 2800 may be able to access one or more remote storages 2870 and one or more external components 2875 through the network interface 2855 and network 2860. The network interface(s) 2855 may include one or more application programming interfaces (APIs) that may allow the computer system 2800 to access remote systems and/or storages and also may allow remote systems and/or storages to access computer system 2800 (or elements thereof).

As used in this specification and any claims of this application, the terms "computer", "server", "processor", and "memory" all refer to electronic devices. These terms exclude people or groups of people. As used in this specification and any claims of this application, the term "non-transitory storage medium" is entirely restricted to tangible, physical objects that store information in a form that is readable by electronic devices. These terms exclude any wireless or other ephemeral signals.

It should be recognized by one of ordinary skill in the art that any or all of the components of computer system 2800 may be used in conjunction with some embodiments. Moreover, one of ordinary skill in the art will appreciate that many other system configurations may also be used in conjunction with some embodiments or components of some embodiments.

In addition, while the examples shown may illustrate many individual modules as separate elements, one of ordinary skill in the art would recognize that these modules may be combined into a single functional block or element. One of ordinary skill in the art would also recognize that a single module may be divided into multiple modules.

The foregoing relates to illustrative details of exemplary embodiments and modifications may be made without departing from the scope of the disclosure as defined by the following claims.

I claim:

1. An automated method of evaluating driver performance using adaptive models, the method comprising:
    receiving sensor data generated by a set of vehicle sensors associated with a vehicle;
    generating a set of predicted paths of the vehicle based at least partly on the received sensor data;
    retrieving map information from a map database, the map information including road links along the set of predicted paths of the vehicle;
    retrieving a set of evaluation curves associated with the road links, wherein inclusion in the set of evaluation curves is based at least partially on evaluation of dynamic models associated with the road links along the set of predicted paths;
    calculating mathematical differences between each evaluation curve from the set of evaluation curves and the received data and generating a driver score based on a calculated difference in area between the received data and each evaluation curve in the set of evaluation curves; and
    displaying a warning if at least one of the calculated mathematical differences exceeds a warning threshold.

2. The automated method of claim 1 further comprising generating the dynamic model by:
    retrieving a static model associated with the road links;
    retrieving a dynamic reference model from a plurality of available dynamic reference models associated with the road links, the dynamic reference model comprising a confidence value;
    selecting the dynamic reference model as the dynamic model if the confidence value exceeds a first threshold;
    selecting the static model as the dynamic model if the confidence value does not exceed a second threshold, wherein the first threshold is greater than the second threshold; and
    combining the static model and the dynamic model reference model to generate the dynamic model if the confidence value exceeds the second threshold and does not exceed the first threshold.

3. The automated method of claim 2, wherein at least one dynamic reference model in the plurality of available dynamic reference models is associated with a time of day.

4. The automated method of claim 3, wherein at least one dynamic reference model in the plurality of available dynamic reference models is associated with at last one of a date and a day of the week.

5. The automated method of claim 4, wherein at least one dynamic reference model in the plurality of available dynamic reference models is associated with a traffic score.

6. The automated method of claim 5, wherein retrieving a dynamic reference model from the plurality of available dynamic reference models comprises:
    retrieving the plurality of available dynamic reference models; and
    selecting a set of dynamic reference models from among the plurality of available dynamic reference models based on at least one of a current time of day, current date, and current day of the week.

7. The automated method of claim 6, wherein retrieving a dynamic reference model from the plurality of available dynamic reference models further comprises filtering the set of dynamic reference models based on a current traffic value.

8. A device comprising:
    one or more processors configured to:
        receive sensor data generated by a set of vehicle sensors associated with a vehicle;
        generate a set of predicted paths of the vehicle based at least partly on the received sensor data;
        retrieve map information from a map database, the map information including road links along the set of predicted paths of the vehicle;
        retrieve a set of evaluation curves associated with the road links, wherein inclusion in the set of evaluation curves is based at least partially on evaluation of dynamic models associated with the road links along the set of predicted paths;
        calculate mathematical differences between each evaluation curve from the set of evaluation curves and the received data and generating a driver score based on a calculated difference in area between the received data and each evaluation curve in the set of evaluation curves; and
        display a warning if at least one of the calculated mathematical differences exceeds a warning threshold.

9. The device of claim 8, wherein the one or more processors are further configured to:
    generate the dynamic model by:
        retrieving a static model associated with the road links;
        retrieving a dynamic reference model from a plurality of available dynamic reference models associated with the road links, the dynamic reference model comprising a confidence value;
        selecting the dynamic reference model as the dynamic model if the confidence value exceeds a first threshold;
        selecting the static model as the dynamic model if the confidence value does not exceed a second threshold, wherein the first threshold is greater than the second threshold; and
        combining the static model and the dynamic model reference model to generate the dynamic model if the confidence value exceeds the second threshold and does not exceed the first threshold.

10. The device of claim 9, wherein at least one dynamic reference model in the plurality of available dynamic reference models is associated with a time of day.

11. The device of claim 10, wherein at least one dynamic reference model in the plurality of available dynamic reference models is associated with at last one of a date and a day of the week.

12. The device of claim 11, wherein at least one dynamic reference model in the plurality of available dynamic reference models is associated with a traffic score.

13. The device of claim 12, wherein retrieving a dynamic reference model from the plurality of available dynamic reference models comprises:
retrieving the plurality of available dynamic reference models; and
selecting a set of dynamic reference models from among the plurality of available dynamic reference models based on at least one of a current time of day, current date, and current day of the week.

14. The device of claim 13, wherein retrieving a dynamic reference model from the plurality of available dynamic reference models further comprises filtering the set of dynamic reference models based on a current traffic value.

15. A non-transitory computer-readable medium, storing a plurality of processor-executable instructions to:
receive sensor data generated by a set of vehicle sensors associated with a vehicle;
generate a set of predicted paths of the vehicle based at least partly on the received sensor data;
retrieve map information from a map database, the map information including road links along the set of predicted paths of the vehicle;
retrieve a set of evaluation curves associated with the road links, wherein inclusion in the set of evaluation curves is based at least partially on evaluation of dynamic models associated with the road links along the set of predicted paths;
calculate mathematical differences between each evaluation curve from the set of evaluation curves and the received data and generating a driver score based on a calculated difference in area between the received data and each evaluation curve in the set of evaluation curves; and
display a warning if at least one of the calculated mathematical differences exceeds a warning threshold.

16. The non-transitory computer-readable medium of claim 15, wherein the plurality of processor-executable instructions are further to generate the dynamic model by:
retrieving a static model associated with the road links;
retrieving a dynamic reference model from a plurality of available dynamic reference models associated with the road links, the dynamic reference model comprising a confidence value;
selecting the dynamic reference model as the dynamic model if the confidence value exceeds a first threshold;
selecting the static model as the dynamic model if the confidence value does not exceed a second threshold, wherein the first threshold is greater than the second threshold; and
combining the static model and the dynamic model reference model to generate the dynamic model if the confidence value exceeds the second threshold and does not exceed the first threshold.

17. The non-transitory computer-readable medium of claim 16, wherein at least one dynamic reference model in the plurality of available dynamic reference models is associated with a time of day.

18. The non-transitory computer-readable medium of claim 17, wherein at least one dynamic reference model in the plurality of available dynamic reference models is associated with at last one of a date and a day of the week.

19. The non-transitory computer-readable medium of claim 18, wherein at least one dynamic reference model in the plurality of available dynamic reference models is associated with a traffic score.

20. The non-transitory computer-readable medium of claim 19, wherein retrieving a dynamic reference model from the plurality of available dynamic reference models comprises:
retrieving the plurality of available dynamic reference models;
selecting a set of dynamic reference models from among the plurality of available dynamic reference models based on at least one of a current time of day, current date, and current day of the week; and
filtering the set of dynamic reference models based on a current traffic value.

* * * * *